(12) United States Patent
Esenlik et al.

(10) Patent No.: US 12,149,680 B2
(45) Date of Patent: Nov. 19, 2024

(54) CODING METHOD, DEVICE, SYSTEM WITH MERGE MODE

(71) Applicant: HUAWEI TECHNOLOGIES CO., LTD., Shenzhen (CN)

(72) Inventors: Semih Esenlik, Munich (DE); Han Gao, Shenzhen (CN); Anand Meher Kotra, Munich (DE); Biao Wang, Munich (DE); Elena Alexandrovna Alshina, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 158 days.

(21) Appl. No.: 17/830,782

(22) Filed: Jun. 2, 2022

(65) Prior Publication Data
US 2022/0295048 A1   Sep. 15, 2022

Related U.S. Application Data

(63) Continuation of application No. PCT/CN2020/133368, filed on Dec. 2, 2020.

(30) Foreign Application Priority Data

Dec. 3, 2019 (WO) ................ PCT/EP2019/083555
Dec. 9, 2019 (WO) ................ PCT/EP2019/084279

(51) Int. Cl.
*H04N 19/159* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/96* (2014.11)

(58) Field of Classification Search
CPC .................................................. H04N 19/105
See application file for complete search history.

(56) References Cited

U.S. PATENT DOCUMENTS 10,306,235 B2 * 5/2019 Ikai ...................... H04N 19/587
11,159,793 B2 * 10/2021 Ahn ...................... H04N 19/147
(Continued)

FOREIGN PATENT DOCUMENTS

| CN | 104025601 A | 9/2014 |
|---|---|---|
| CN | 109644276 A | 4/2019 |
| WO | 2019174594 A1 | 9/2019 |

OTHER PUBLICATIONS

JVET-M0272, Li Zhang et al., "CE4-related: Restrictions on History-based Motion Vector Prediction", Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.
(Continued)

*Primary Examiner* — Irfan Habib
(74) *Attorney, Agent, or Firm* — Rimon PC

(57) ABSTRACT

Parallel processing of inter prediction of a current coding block and preceding coding blocks depending on the partition depth of the current coding block is disclosed. An apparatus comprises a processing circuitry configured for: obtaining a value of a parameter for the current coding block, wherein the value of the parameter indicates a partition depth of the current coding block, and performing an inter prediction process for the current coding block; wherein no Motion Vector Predictor candidate comprising a motion vector of a coded block of the picture that is not spatially adjacent to the current coding block for the current coding block is used in the inter prediction process or a merge mode inter prediction process comprised in the inter
(Continued)

prediction process, when the value of the parameter for the current coding block is greater than a threshold.

18 Claims, 22 Drawing Sheets

(51) Int. Cl.
*H04N 19/176* (2014.01)
*H04N 19/96* (2014.01)

(56) References Cited

U.S. PATENT DOCUMENTS

| | | | | |
|---|---|---|---|---|
| 11,172,204 | B2* | 11/2021 | Jeong | H04N 19/597 |
| 11,240,528 | B2* | 2/2022 | Choi | H04N 19/176 |
| 11,611,743 | B2* | 3/2023 | Zhang | H04N 19/70 |
| 11,711,520 | B2* | 7/2023 | Lee | H04N 19/52 |
| | | | | 375/240.16 |
| 11,870,998 | B2* | 1/2024 | Kurashige | H04N 19/176 |
| 2014/0153647 | A1* | 6/2014 | Nakamura | H04N 19/105 |
| | | | | 375/240.14 |
| 2017/0078697 | A1* | 3/2017 | Lee | H04N 19/70 |
| 2017/0142442 | A1* | 5/2017 | Tsukuba | H04N 19/96 |
| 2017/0214939 | A1* | 7/2017 | Lee | H04N 19/70 |
| 2017/0251224 | A1* | 8/2017 | Lee | H04N 19/187 |
| 2020/0374542 | A1* | 11/2020 | Zhang | H04N 19/52 |
| 2021/0195234 | A1* | 6/2021 | Zhang | H04N 19/70 |
| 2021/0392333 | A1* | 12/2021 | Paluri | H04N 19/188 |
| 2021/0409720 | A1* | 12/2021 | Meng | H04N 19/513 |
| 2022/0030226 | A1* | 1/2022 | Lee | H04N 19/593 |
| 2022/0132119 | A1* | 4/2022 | Zhang | H04N 19/176 |
| 2023/0247214 | A1* | 8/2023 | Zhao | H04N 19/132 |
| | | | | 375/240.25 |

OTHER PUBLICATIONS

JVET-Q0356, Semih Esenlik et al., "AHG16: Parallel Merge Estimation for VVC", Joint Video Experts Team (JVET) of ITU-T SG 16 WP 3 and ISO/IEC JTC 1/SC 29/WG 11, 17th Meeting: Brussels, BE, Jan. 7-17, 2020, 9 pages.

JVET-L0158, Naeri Park et al., "CE4-related: History-Based Motion Vector Prediction considering parallel processing", Joint Video Experts Team (JVET) of ITU-T SG 16 WP 3 and ISO/IEC JTC 1/SC 29/WG 11, 12th Meeting: Macau, CN, Oct. 8-12, 2018, 6 pages.

Document: JVET-M0289, Han Gao et al., "CE4: Parallel Merge Estimation for VVC (CE4.3.2)," Joint Video Experts Team (JVET) of ITU-T SG 16 WP 3 and ISO/IEC JTC 1/SC 29/WG 11, 13th Meeting: Marrakech, MA, Jan. 9-18, 2019, 11 total pages.

ITU-T H.223(Jul. 2001), Series H: Audiovisual and Multimedia Systems, Infrastructure of audiovisual services—Transmission multiplexing and synchronization, Multiplexing protocol for low bit rate multimedia communication; 74 total pages.

Document: JVET-M0024-v2, Haitao Yang et al., "CE4: Summary report on inter prediction and motion vector coding," Joint Video Experts Team (JVET) of ITU-T SG 16 WP 3 and ISO/IEC JTC 1/SC 29/WG 11, 13th Meeting: Marrakech, MA, Jan. 9-18, 2019; 21 total pages.

ITU-T H.263(Jan. 2005), Series H: Audiovisual and Multimedia Systems, Infrastructure of audiovisual services—Coding of moving video, Video coding for low bit rate communication; 226 total pages.

ITU-T H.264(Jun. 2019), Series H: Audiovisual and Multimedia Systems, Infrastructure of audiovisual services—Coding of moving video, Advanced video coding for generic audiovisual services; 836 total pages.

ITU-T H.265(Jun. 2019), Series H: Audiovisual and Multimedia Systems, Infrastructure of audiovisual services—Coding of moving video, High efficiency video coding; 696 total pages.

\* cited by examiner

CODING METHOD, DEVICE, SYSTEM WITH MERGE MODE

CROSS-REFERENCE TO RELATED APPLICATIONS

This application is a continuation of International Application No. PCT/CN2020/133368, filed on Dec. 2, 2020, which claims priority to International Patent Application No. PCT/EP2019/083555, filed on Dec. 3, 2019, and Patent Application No. PCT/EP2019/084279, filed on Dec. 9, 2019. All of the aforementioned patent applications are hereby incorporated by reference in their entireties.

TECHNICAL FIELD

The embodiments of the present application (disclosure) generally relate to the field of video coding and more particularly to the field of inter-prediction with merge mode.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in image quality are desirable. High Efficiency Video Coding is the latest video compression issued by ISO/IEC Moving Picture Experts Group and ITU-T Video Coding Experts Group as ISO/IEC 23008-2 MPEG-H Part 2 or called ITU-T H.265, and offers about twice the data compression ratio at the same level of video quality or substantially improved video quality at the same bit rate. Several coding tools were developed and adopted by HEVC, and one of them is merge mode that is used in the inter-prediction to estimate a proper motion vector (MV) for a current prediction block from spatial or temporal candidate blocks. Specifically, the merge mode in Merge mode in HEVC is composed of two parts:

First Part:

Merge list construction which includes (for a current block to be predicted):
  (1) inserting motion information of spatial candidates: up to four candidates are inserted in the merge list by sequentially checking candidates A1 (at the bottom of the left boundary of the current block), B1 (on the right side of the top boundary), B0 (diagonally adjacent at the top right), A0 (diagonally adjacent at the bottom left) and B2 (diagonally adjacent at the top left);
  (2) one temporal merge candidate is derived from two temporal, co-located blocks;
  (3) additional merge candidates including combined bi-predictive candidates; and
  (4) zero motion vector candidates.

Second Part:

Index signaling, one entry that in the merge list is selected as the motion information of the current block and signaled to a decoding side to deriving the MV of current prediction block correspondingly.

A parallel merge estimation level was introduced in HEVC that indicates the region in which merge candidate lists can be independently derived by checking whether a candidate block is located in that merge estimation region (MER). A candidate block that is in the same MER is not included in the merge candidate list. Hence, its motion data does not need to be available at the time of the list construction. When this level is e.g., 32, all prediction units in a 32×32 area can construct the merge candidate list in parallel since all merge candidates that are in the same 32×32 MER, are not inserted in the list.

As shown in FIG. 6, there is a CTU partitioning with seven CUs (square) and ten PUs (square or rectangular). All potential merge candidates for the first PU0 are available because they are outside the first 32×32 MER. For the second MER, merge candidate lists of PUs 2-6 cannot include motion data from these PUs when the merge estimation inside that MER should be independent. Therefore, when looking at a PU5 for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

In HEVC, quad tree (QT) partitions are used, that always result in partitions that satisfy one of the following conditions (where N is 4, 8, 16, 32 or 64). All of the samples of a coding block are contained in an N×N region. All of the samples of an N×N region are contained in a coding block. However, in the newest developing of Versatile Video Coding (VVC), those conditions the merge mode relays on are not always satisfied because new partition patterns are used, for instance, Binary-Tree (BT) and Triple-Tree (TT) partitions are allowed with which non-square partition is allowed, and the checking of whether a candidate block belongs to a MER is not accurately applicable anymore and the coding performance is degenerated, especially the parallel processing the merge estimation will be severely impacted.

Therefore, it is an object of the present disclosure to offer solutions that alleviate the problem that parallel processing of a current block and a preceding coding block is not allowed when inter prediction of the current block depends on the coding of the preceding coding block.

SUMMARY

Embodiments of the disclosure are defined by the features of the independent claims, and further advantageous implementations of the embodiments by the features of the dependent claims.

Throughout the present disclosure, the terms candidate block, potential candidate block, candidate coding block, potential candidate prediction block and potential candidate coding block are used synonymously. Similar applies for the terms current block, current prediction block and current coding block. Similar applies for the terms Coding Tree Unit (CTU) and Coding Tree Block (CTB).

The embodiments of the present application (or the present disclosure) provide inter prediction apparatuses and methods for encoding and decoding an image which can mitigate even eliminate the problem mentioned above.

According to one aspect in order to address the above-mentioned object it is provided an apparatus for inter prediction of a current coding block of a picture, wherein the apparatus comprises a processing circuitry that is configured for:

obtaining a value of a parameter for the current coding block, wherein the value of the parameter indicates a partition depth of the current coding block; and performing an inter prediction process for the current coding block; and wherein no Motion Vector Predictor candidate comprising a motion vector of a coded block of the picture that is not spatially adjacent (i.e., not directly neighbored) to the current coding block for the current coding block is used (i.e., the processing circuitry is configured for not using any Motion Vector Predictor candidate comprising a motion vector of a coded block of the picture that is not spatially adjacent to the current coding block) in the inter prediction process or a merge mode inter prediction process comprised in the inter prediction process, when the value of the parameter for the current coding block is greater than a threshold.

The partition depth is given by the number of (in particular, quad-tree) splitting operations (starting from the biggest coding block) that are performed to obtain said current coding block.

Thus, when a Motion Vector Predictor candidate for the current coding block comprises a motion vector of a coded block of the picture that is not spatially adjacent to the current coding block it is not used at least for a merge mode inter prediction process and it may not be used in the inter prediction process for the current block at all. Thereby, parallel processing of the current coding block and preceding coding blocks in coding order can be performed when the partition depth of the current coding block is greater than a threshold, since in this case using a Motion Vector Predictor candidate comprising a motion vector of a coded block of the picture that is not spatially adjacent to the current coding block is prohibited to be used for the current coding block.

On the other hand, according to an embodiment, at least one Motion Vector Predictor candidate comprising a motion vector of a coded block of the picture that is not spatially adjacent to the current coding block for the current coding block is used in the inter prediction process, when the value of the parameter for the current coding block is smaller than or equal to the threshold. In particular, this at least one Motion Vector Predictor candidate comprising a motion vector of a coded block of the picture that is not spatially adjacent to the current coding block is not used, when the value of the parameter for the current coding block is greater than the threshold.

In the above-described embodiments the threshold may be in the range from 0 to 5.

The apparatus according to one of the above-described embodiments of the apparatus may be configured to perform the steps of a method for inter prediction of a current coding block of a picture as described in the following. Further, these methods may be performed by means of the above-described embodiments of the apparatus.

According to a second aspect it is provided a method for inter prediction of a current coding block of a picture, wherein the method comprises the steps of:

obtaining a value of a parameter for the current coding block, wherein the value of the parameter indicates a partition depth of the current coding block; and performing an inter prediction process for the current coding block; and wherein no Motion Vector Predictor candidate comprising a motion vector of a coded block of the picture that is not spatially adjacent to the current coding block for the current coding block is used in the inter prediction process or a merge mode inter prediction process comprised in the inter prediction process, when the value of the parameter for the current coding block is greater than a threshold.

At least one Motion Vector Predictor candidate comprising a motion vector of a coded block of the picture that is not spatially adjacent to the current coding block for the current coding block may be used in the inter prediction process, when the value of the parameter for the current coding block is smaller than or equal to the threshold.

Again, the threshold may be in the range from 0 to 5.

According to a third aspect, in order to address the above-mentioned object it is provided an apparatus for inter prediction of a current coding block of a picture, wherein the apparatus comprises a processing circuitry configured for:

obtaining a value of a parameter for the current coding block, wherein the value of the parameter indicates a partition depth of the current coding block; and performing an inter prediction process for the current coding block; and wherein the processing circuitry is further configured for:

after performing the inter prediction process, not updating a Motion Vector Predictor candidates list comprising Motion Vector Predictor candidates from previously coded blocks of the picture that are not spatially adjacent to the current coding block, when the value of the parameter for the current coding block is greater than a threshold. Other Motion Vector Predictor candidates lists may be updated in this case.

Thus, the updating process can be skipped when the value of the parameter for the current coding block is greater than a threshold in order to safe processing time and load.

The processing circuitry may be further configured for updating the Motion Vector Predictor candidates list after performing the inter prediction process, when the value of the parameter for the current coding block is smaller than or equal to the threshold.

The updating may comprise checking whether a motion vector used for the inter prediction of the current coding block is already included in the Motion Vector Predictor candidates list. It might be added to the list if it is not already included in the list.

Particularly, the inter prediction process performed by the processing circuitry may be a merge mode inter prediction process using a Motion Vector Predictor selected from a list comprising the Motion Vector Predictor candidates list.

Moreover, the processing circuitry may be further configured for using the Motion Vector Predictor candidates list (updated or not) for inter prediction of one or more subsequent coding block in coding order.

The apparatus according to one of the above-described embodiments of the apparatus according to the third aspect may be configured to perform the steps of a method for inter prediction of a current coding block of a picture as described in the following. Further, these methods may be performed by means of the above-described embodiments of the apparatus.

According to fourth aspect, it is provided a method for inter prediction of a current coding block of a picture, wherein the method comprises:

obtaining a value of a parameter for the current coding block, wherein the value of the parameter indicates a partition depth of the current coding block; and performing an inter prediction process for the current coding block; and wherein after performing the inter prediction process, not updating a Motion Vector Predictor candidates list comprising Motion Vector Predictor candidates from previously coded blocks of the picture that are not spatially adjacent to the current coding block, when the value of the parameter for the current coding block is greater than a threshold. Other Motion Vector Predictor candidates lists may be updated in this case.

The method may further comprise updating the Motion Vector Predictor candidates list after performing the inter prediction process, when the value of the parameter for the current coding block is smaller than or equal to the threshold (pMQTTreshold).

The inter prediction process may be a merge mode inter prediction process using a Motion Vector Predictor selected from a list comprising the Motion Vector Predictor candidates list.

The method may further comprise performing inter prediction of a subsequent coding block using the Motion Vector Predictor candidates list.

In all of the above-described embodiments of the inventive method the partition depth may be a partition depth of a quad tree partitioning and the inter prediction process may comprise a merge estimation process.

In all of the above-described embodiments of the inventive apparatus the partition depth may be a partition depth of a quad tree partitioning and the inter prediction process may comprise a merge estimation process.

Furthermore, it is provided a video encoding or decoding device comprising the apparatus according to one of the above-described embodiments.

Furthermore, it is provided a video encoding or decoding device comprising processing circuitry configured for performing the method according to one of the above-described embodiments.

Further, it is provided a computer-readable non-transitory medium storing a program, including instructions which when executed on a processor cause the processor to perform the method according to one of the above-described embodiments.

It is noted that in the VVC standard the Motion Vector Predictor candidate comprising a motion vector of a coded block of the picture that is not spatially adjacent to the current coding block of al of the above-described embodiments may be a History-based Motion Vector Predictor (see also detailed description below).

By the present disclosure provided above, more coding blocks can be parallel processed during the merge estimation, therefore improving the performance of coding/decoding technology, especially, the VVC.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 15 is applied.

FIG. 17 is applied.

DETAILED DESCRIPTION OF THE EMBODIMENTS

Figure 1A:
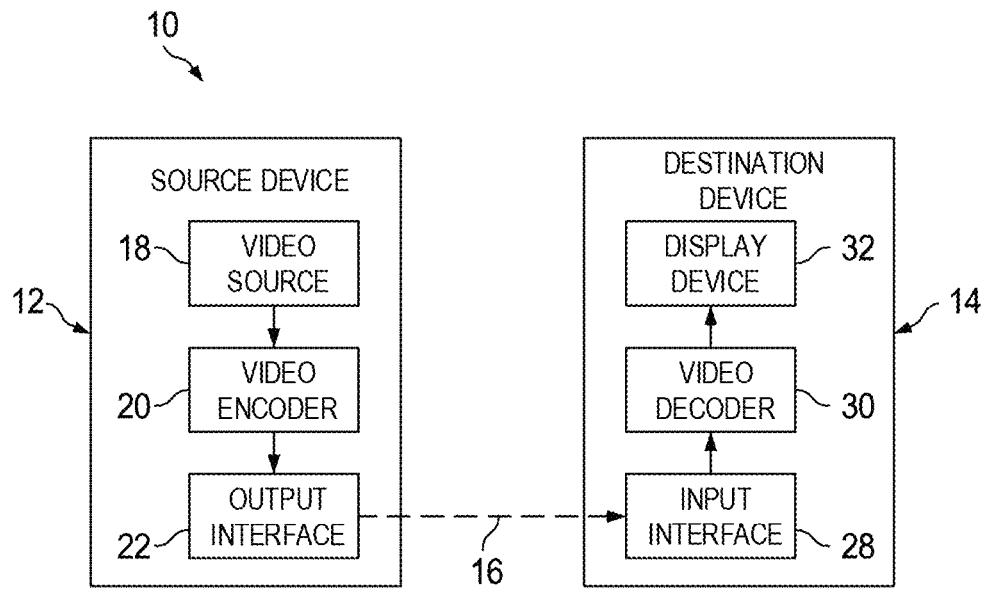
FIG. 1A is a block diagram illustrating an example coding system that may implement embodiments of the application.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As mentioned before, when a coding block is no longer partitioned based on QT partitions as in HEVC, but rather on BT or TT as in VVC, the HEVC conditions for merge mode may be no longer suitable and/or may not be satisfied because the new partition patterns of the coding block resulting from the use of BT and/or TT are no longer consistent with the HEVC conditions which rely on square pattern partition of the coding block. In other words, the HEVC conditions are inconsistent with the non-square patterns, so that a check whether or not a candidate block (i.e., a candidate coding block) belongs to a MER can no longer be performed accurately or in the worst case may even be impossible. As a result, the coding performance may degenerate severely, in particular the parallel processing of the merge estimation.

In order to illustrate the above conflict in applying HEVC conditions in VVC in conjunction with BT and/or TT partitions, three different scenarios are chosen to show exemplarily how the MER-based merge estimation in HEVC impacts the parallelism of the merge estimation in Versatile Video Coding (VVC).

Figure 7:
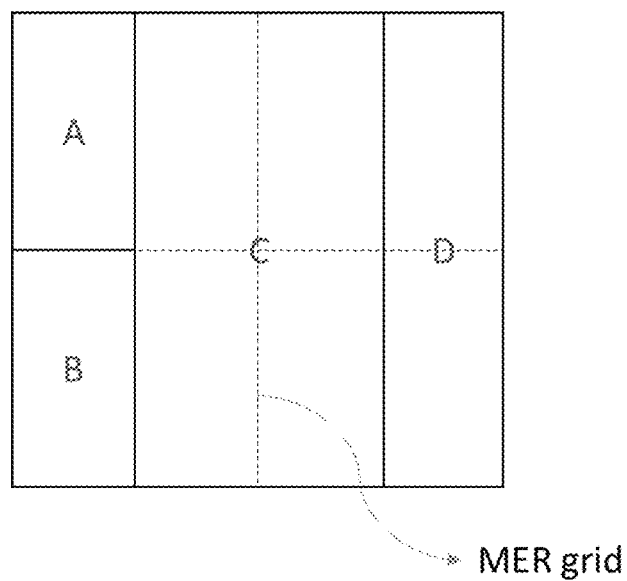
FIG. 7 to FIG. 9 are partition resulted based on the partition modes allowed in VVC.

Scenario 1:

FIG. 7 illustrates a partition result based on partition modes allowed in VVC. If a top-left sample of blk1 (A) and a top-left sample of blk2 (B) are in the same MER (N×N grid), then motion information of blk1 is set as unavailable for the prediction by blk2 with a processing order blk1→blk2. Based on the MER based estimation in HEVC, the four prediction dependencies of coding blocks A, B, C, and D are:

C can be predicted from B.
D can be predicted from C.
B can be predicted from A.
C cannot be predicted from A.

However, based on HEVC, none of the pair of those coding blocks can be processed in parallel with the proceeding order A→B→C→D.

According to the HEVC rule, two blocks are considered to be in the same MER if their top-left coordinates are in the same MER. Block B can be predicted from block A, since they are in different MER. Therefore, block B needs to wait for block A to be available, so that they cannot be processed in parallel. Block D can be predicted from block C, since they are in different MER. Hence they cannot be processed in parallel. Block C cannot be predicted from block A, since they are in the same MER. However, C and A still cannot be processed in parallel since block C can be predicted from block B, and block B can be predicted from block A. Therefore, in Scenario 1, a parallel processing of those coding block is impossible which will cost more coding time to do the merge estimation for each of those coding blocks.

Figure 8:
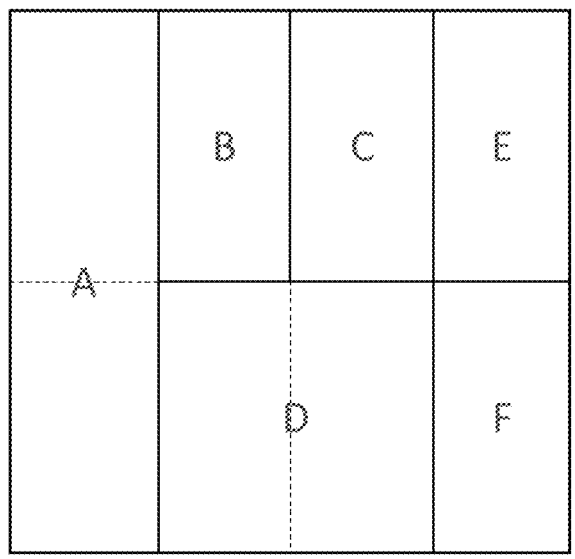

Scenario 2:

FIG. 8 illustrates anther partition result based on partition modes allowed in VVC, where only coding blocks A and B can be processed in parallel with a processing order A→B→C→D→E→F. According to the HEVC rule, two blocks are considered to be in the same MER if their top-left coordinates are in the same MER. Therefore, coding blocks C and E are supposed to be processed in parallel. As contrast, in this scenario 2, coding blocks C and E cannot be processed in parallel although they are in the same MER because coding block E can be predicted from coding block D, and coding block D can be predicted from coding block C which results the later one coding block waiting until the prior one's MV according to the processing order is available. Therefore, in Scenario 2, a parallel processing of those coding blocks is limited which will still cost more coding time to do the merge estimation for those coding blocks.

Figure 9:
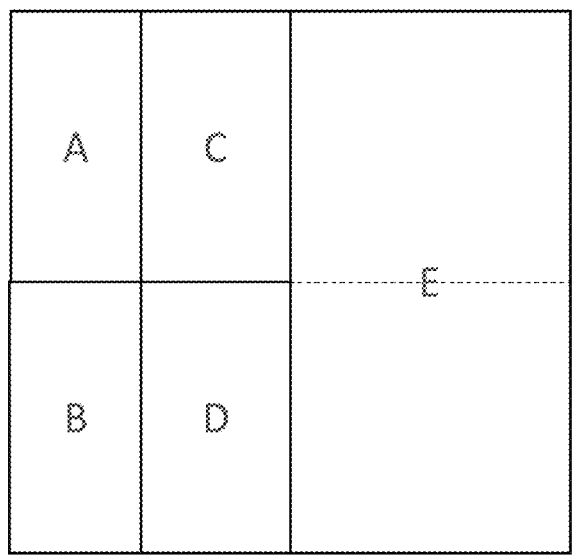

Scenario 3:

FIG. 9 illustrates another partition result based on partition modes allowed in VVC, where none of the pair of coding blocks can be processed in parallel. Based on the HEVC rule, coding block C cannot be predicted from coding block A, but coding block C and coding block A still cannot be processed in parallel, since coding block C can be predicted from coding block B and coding block B can be predicted from coding block A. Based on the HEVC rule, coding block D cannot be predicted from coding block B, but coding block B and coding block D still cannot be processed in parallel, since coding block C can be predicted from coding block B and coding block D can be predicted from coding block C. Therefore, similar to Scenario 2, in Scenario 3, parallel processing of those coding block is impossible which will cost more coding time to do the merge estimation for each of those coding blocks.

The present disclosure provides a method of coding implemented by a decoding device for marking the availability of a potential candidate coding block for merge estimation of a current coding block. The method includes, obtaining the coordination of a specific point in the potential candidate coding block, and the coordination of the left-top pixel of the current coding block; determining if the coordination of the specific point in the potential candidate coding block is located within a merge estimation region (MER) where the top-left pixel of the current coding block is located, by comparing the coordination of a specific point in the potential candidate coding block and the coordination of the left-top pixel of the current coding block, wherein the coordination is consisting of horizontal axis directing to right hand direction and labelled as X and a vertical axis directing to gravity direction and labelled as Y, the coordination of the specific point in the potential candidate coding block is indicated as (X2, Y2), and the coordination of the top-left pixel of the current coding block is indicated as (X, Y); and if the coordination of the specific point in the potential candidate coding block is located within the merge estimation region (MER), marking the potential candidate coding block is unavailable.

The specific point in the potential candidate coding block is the top-left pixel or the bottom-right pixel of the potential candidate coding block, and the determining if the coordination of the specific point in the potential candidate coding block is located within the MER is performed on any of the following rules: if [X−1,Y] and [X,Y] are in the MER, and if X2<X and Y2>=Y, the potential candidate coding block is set unavailable; if [X,Y−1] and [X,Y] are in the MER, and if Y2<Y and X2>=X, the potential candidate coding block is set unavailable; and if [X−1,Y−1] and [X,Y] are in the MER, and if Y2<Y and X2<X, the potential candidate coding block is set unavailable.

The present disclosure further provides a method of coding implemented by a decoding device for marking the availability of a potential candidate coding block for merge estimation of a current coding block, and the method comprises, incrementally labelling coding blocks based on a processing order; applying a slid window with a length of K to the coding blocks to form a group of coding blocks; determining if the potential candidate coding block and the current coding block belong to the same one group of coding blocks; and marking the potential candidate coding block as unavailable when the potential candidate coding block and the current coding block belong to the same one group of coding blocks. Alternatively, the incrementally labelling coding blocks can be performed by using natural number from Zero based on a processing order or by using the spanning area of the coding blocks based on a processing order, and the spanning area of the coding blocks is counted based on the number of pixels the coding blocks contain.

The present disclosure provides an apparatus and a method for marking the availability of a potential candidate coding block for merge estimation of a current coding block.

The method includes, based on a predefined principle which is made based on the closeness of two respective points within the potential candidate coding block and the current coding block, adaptively obtaining the coordinates (x, y) of the current coding block, and the coordinates of a specific point in the potential candidate coding block, wherein the coordinates of the specific point in the potential candidate coding block is (x1, y1), marking the potential candidate coding block as unavailable, if floor (x1/mer_width) is equal to floor(x/mer_width), or if floor (y1/mer_height) is equal to floor(y/mer_height), where the mer_width and mer_height are the width and height of a merge estimation region (MER), and the function that takes as input a real number X and gives as output the greatest integer less than or equal to X.

Specifically, the method comprises: obtaining the coordinates (x, y) of a corner of the current coding block, and the coordinates of a specific point in the potential candidate coding block, wherein the coordinates of the specific point in the potential candidate coding block is (x+a, y+b), a∈(−1,0,1),b∈(−1,0,1), and a and b are selected depending on the relationship of the relative position between the potential candidate coding block and the current coding block, and for one potential candidate coding block, one value from (−1, 0,1) is selected as the a, and one value from the (−1,0,1) is selected as the b; marking the potential candidate coding block as unavailable, if floor((x+a)/mer_width) is equal to floor(x/mer_width), or if floor((y+b)/mer_height) is equal to floor(y/mer_height), where the mer_width and mer_height are the width and height of a merge estimation region (MER), and the function that takes as input a real number X and gives as output the greatest integer less than or equal to X.

Alternatively, the present disclosure further provides a method of coding implemented by a decoding device for marking the availability of a potential candidate coding block for merge estimation of a current coding block. The method includes, obtaining the coordinates (x, y) of a corner of the current coding block, and the coordinates of a specific point in the potential candidate coding block, wherein the coordinates of the specific point in the potential candidate coding block are the coordinates (x1, y1) of the bottom right corner of the potential candidate coding block or the top-left corner of the potential candidate coding block; marking the potential candidate coding block as unavailable, if floor(x1/mer_width) is equal to floor(x/mer_width), or if floor(y1/mer_height) is equal to floor(y/mer_height), where the mer_width and mer_height are the width and height of a merge estimation region (MER), and the function that takes as input a real number X and gives as output the greatest integer less than or equal to X.

Alternatively, the condition used for marking the unavailability of the potential candidate coding block could be extended as if floor((x+a)/mer_width) is equal to floor(x/mer_width) and floor((y+b)/mer_height)>= floor(y/mer_height) or if floor((y+b)/mer_height) is equal to floor(y/mer_height) and floor((x+a)/mer_width)>=floor(x/mer_width).

Alternatively, the condition used for marking the unavailability of the potential candidate coding block could be extended as if floor(x1/mer_width) is equal to floor(x/mer_width) and floor(y1/mer_height)>=floor(y/mer_height) or if floor(y1/mer_height) is equal to floor(y/mer_height) and floor(x1/mer_width)>=floor(x/mer_width).

Alternatively, the present disclosure further provides a method of coding, implemented by an encoding/decoding device for marking the availability of a potential candidate coding block for merge estimation of a current coding block. The method includes, obtaining the coordinates (x, y) of a corner of the current coding block, and the coordinates of a specific point in the potential candidate coding block, wherein the coordinates of the specific point in the potential candidate coding block is (x+a, y+b), a$\in$(−1,0,1),b$\in$(−1,0,1), and a and b are selected depending on the relationship of the relative position between the potential candidate coding block and the current coding block, and for one potential candidate coding block, one value from (−1,0,1) is selected as the a, and one value from the (−1,0,1) is selected as the b; marking the potential candidate coding block as unavailable, when the (x, y) and the (x+a, y+b) are located within one merge estimation region (MER), and the cqtDepth of the current coding block is greater or equal to a threshold, where the cqtDepth is a parameter that decide the quad-tree partition depth of a coding tree block to which the current coding block belongs. Alternatively, if the potential candidate coding block comes from a history list, then the coordinates of the specific point in the potential candidate coding block are the coordinates (x1, y1) of the top-left corner of the potential candidate coding block, or the bottom-right corner of the potential candidate coding block.

FIG. 1A is a block diagram illustrating an example coding system 10 that may utilize bidirectional prediction techniques. As shown in FIG. 1A, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVDs), Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1A, source device 12 includes video source 18, video encoder 20, and output interface 22. Destination device 14 includes input interface 28, video decoder 30, and display device 32. In accordance with this disclosure, video encoder 200 of source device 12 and/or the video decoder 300 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1A is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor.

The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 200 and video decoder 300 may operate according to a video coding standard, such as the High Efficiency Video Coding (HEVC) standard presently under development, and may conform to the HEVC Test Model (HM). Alternatively, video encoder 200 and video decoder 300 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1A, in some aspects, video encoder 200 and video decoder 300 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Figure 1B:
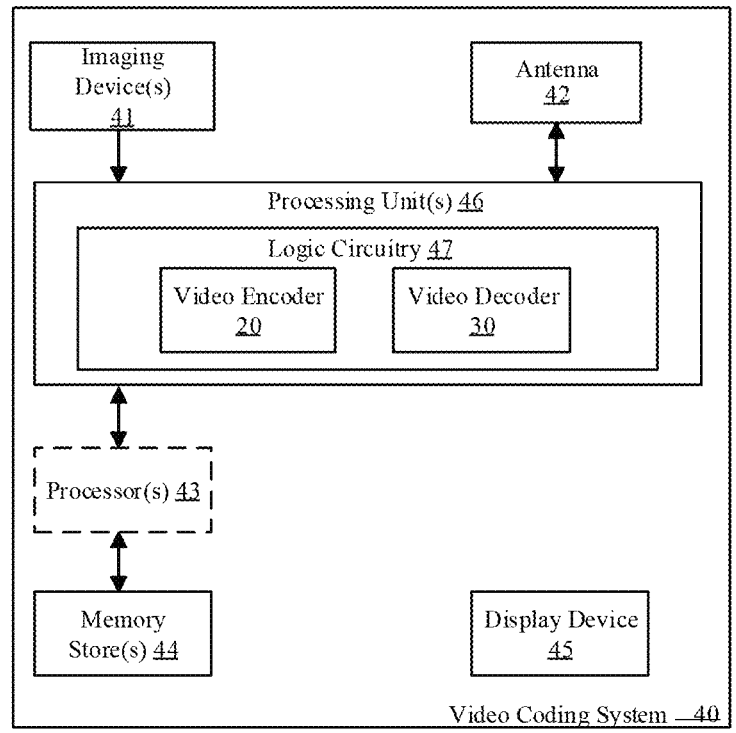
FIG. 1B is a block diagram illustrating another example coding system that may implement embodiments of the application.
Figure 2:
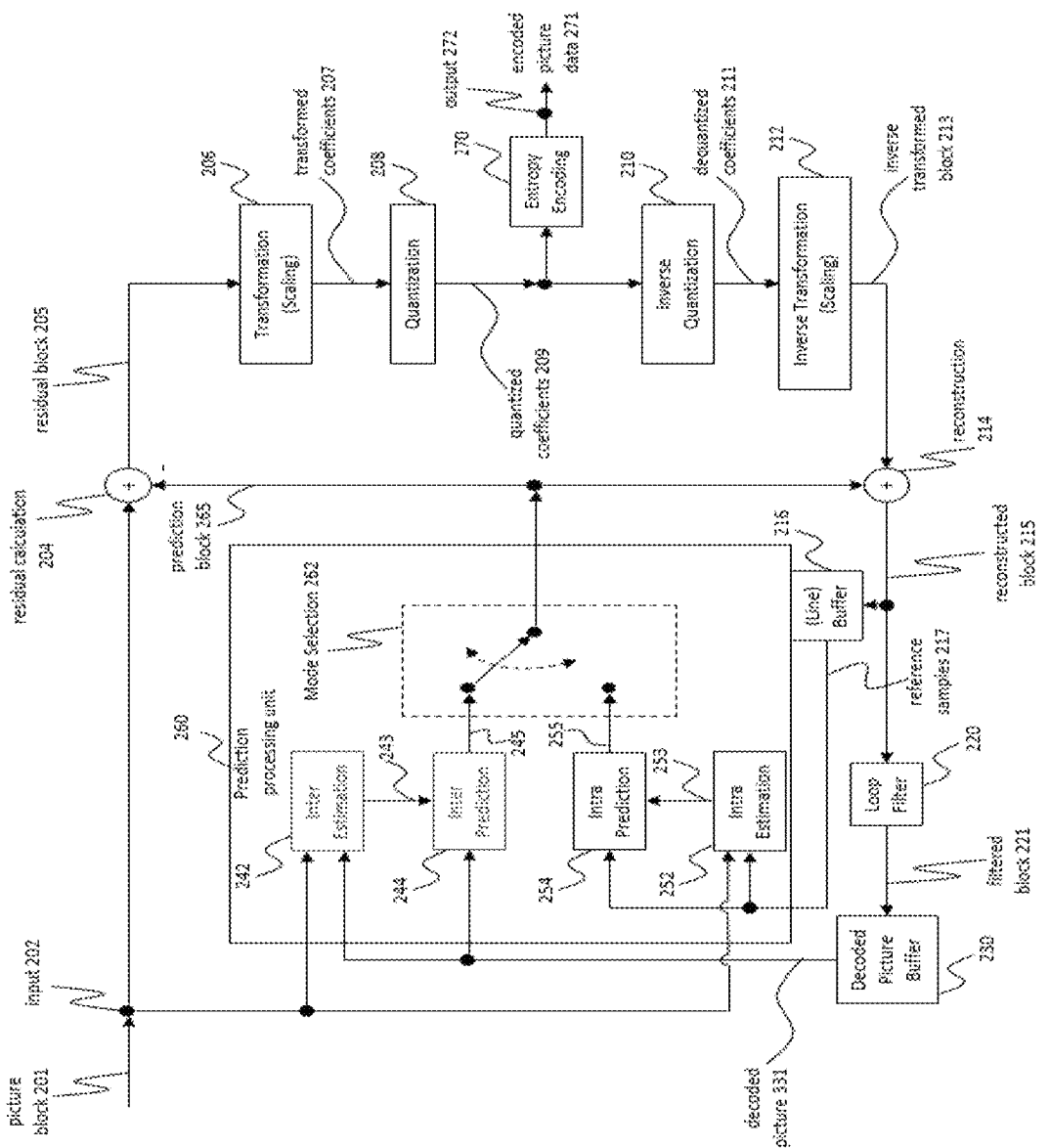
FIG. 2 is a block diagram illustrating an example video encoder that may implement embodiments of the application.
Figure 3:
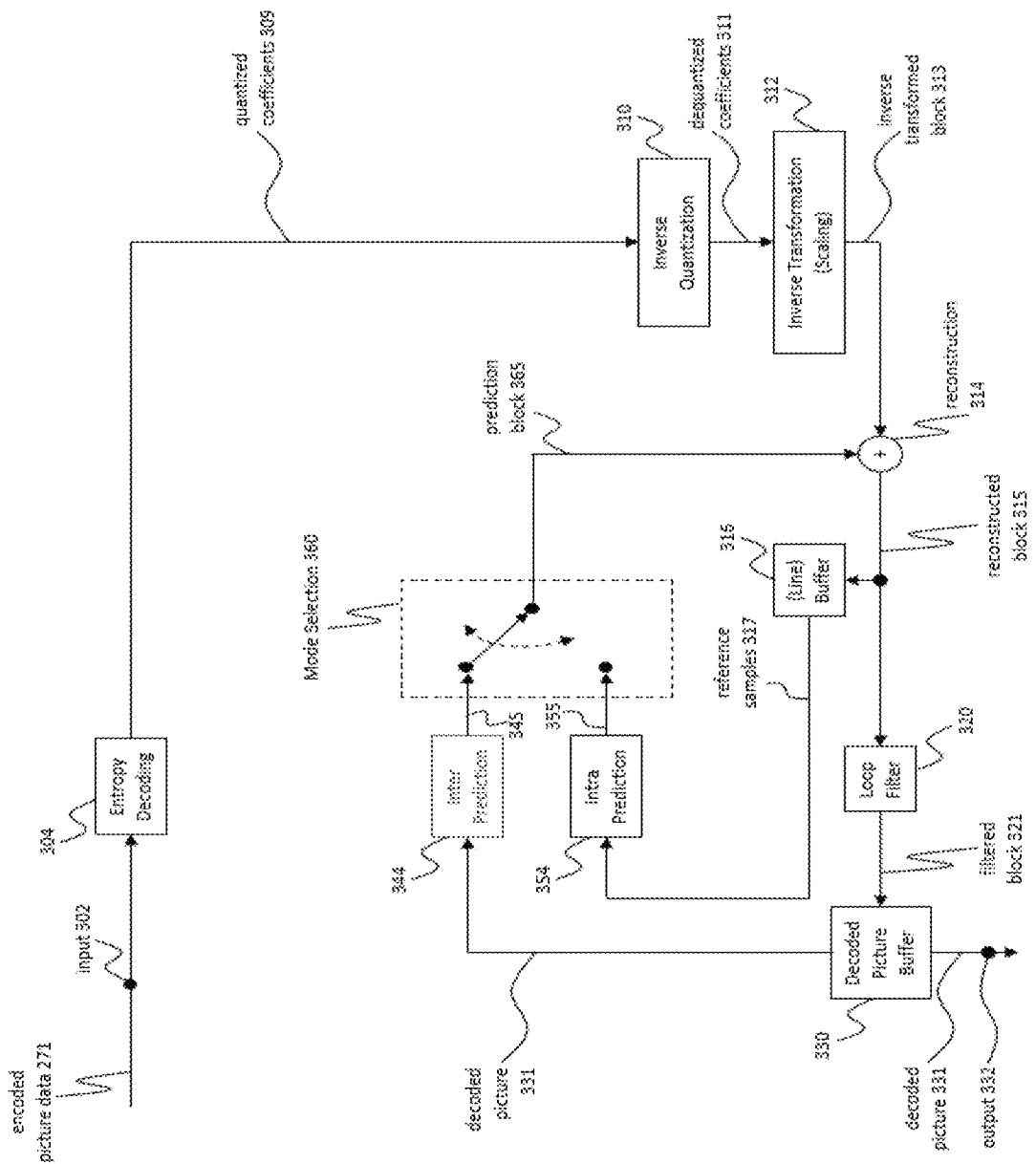
FIG. 3 is a block diagram illustrating an example of a video decoder that may implement embodiments of the application.

FIG. 1B is an illustrative diagram of an example video coding system 40 including encoder 200 of FIG. 2 and/or decoder 300 of FIG. 3 according to an exemplary embodiment. The system 40 can implement techniques of this present application, e.g., the merge estimation in the inter prediction. In the illustrated implementation, video coding system 40 may include imaging device(s) 41, video encoder 20, video decoder 300 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 200 and video decoder 30, video coding system 40 may include only video encoder 200 or only video decoder 300 in various practical scenario.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 54 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 54 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 54 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 200 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 200 as implemented via logic circuitry 47 to embody the various modules as discussed with respect to FIG. 2 and/or any other encoder system or subsystem described herein. The logic circuitry may be configured to perform the various operations as discussed herein.

Video decoder 300 may be implemented in a similar manner as implemented via logic circuitry 47 to embody the various modules as discussed with respect to decoder 300 of FIG. 3 and/or any other decoder system or subsystem described herein. In some examples, video decoder 300 may be implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 300 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 300 coupled to antenna 42 and configured to decode the encoded bitstream. The display device 45 configured to present video frames.

FIG. 2 is a block diagram illustrating an example of video encoder 200 that may implement the techniques of the present application. Video encoder 200 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

FIG. 2 shows a schematic/conceptual block diagram of an example video encoder 200 that is configured to implement the techniques of the present disclosure. In the example of FIG. 2, the video encoder 200 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter estimation 242, inter prediction unit 244, an intra estimation 252, an intra prediction unit 254 and a mode selection unit 262. Inter prediction unit 244 may further include a motion compensation unit (not shown). A video encoder 200 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 200, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 300 in FIG. 3).

The encoder 200 is configured to receive, e.g., by input 202, a picture 201 or a block 203 of the picture 201, e.g., picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g., previously encoded and/or decoded pictures of the same video sequence, i.e., the video sequence which also comprises the current picture).

Partitioning

Embodiments of the encoder 200 may comprise a partitioning unit (not depicted in FIG. 2) configured to partition the picture 201 into a plurality of blocks, e.g., blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In HEVC and other video coding specifications, to generate an encoded representation of a picture, a set of coding tree units (CTUs) may be generated. Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

In HEVC, a CTU is split into CUs by using a quad-tree structure denoted as coding tree to adapt to various local characteristics. The decision whether to code a picture area using inter-picture (temporal) or intra-picture (spatial) prediction is made at the CU level. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A coding block is an N×N block of samples. In some examples, a CU may be the same size of a CTU. Each CU is coded with one coding mode, which could be, e.g., an intra coding mode or an inter coding mode. Other coding modes are also possible. Encoder 200 receives video data. Encoder 200 may encode each CTU in a slice of a picture of the video data. As part of encoding a CTU, prediction processing unit 260 or another processing unit (Including but not limited to unit of encoder 200 shown in FIG. 2) of encoder 200 may perform partitioning to divide the CTBs of the CTU into progressively-smaller blocks 203. The smaller blocks may be coding blocks of CUs.

Syntax data within a bitstream may also define a size for the CTU. A slice includes a number of consecutive CTUs in coding order. A video frame or image or picture may be partitioned into one or more slices. As mentioned above, each tree block may be split into coding units (CUs) according to a quad-tree. In general, a quad-tree data structure includes one node per CU, with a root node corresponding to the treeblock (e.g., CTU). If a CU is split into four sub-CUs, the node corresponding to the CU includes four child nodes, each of which corresponds to one of the sub-CUs. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. For each respective non-root node of the plurality of nodes, the respective non-root node corresponds to a sub-CU of a CU corresponding to a parent node in the tree structure of the respective non-root node. Each respective non-leaf node has one or more child nodes in the tree structure.

Each node of the quad-tree data structure may provide syntax data for the corresponding CU. For example, a node in the quad-tree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. As shown in FIG. 2, each level of partitioning is a quad-tree split into four sub-CUs. The black CU is an example of a leaf-node (i.e., a block that is not further split).

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). The term "block" is used to refer to any of a CU, PU, or TU, in the context of HEVC, or similar data structures in the context of other standards (e.g., macroblocks and sub-blocks thereof in H.264/AVC).

In HEVC, each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. One of key feature of the HEVC structure is that it has the multiple partition conceptions including CU, PU, and TU. PUs may be partitioned to be non-square in shape. Syntax data associated with a CU may also describe, for example, partitioning of the CU into one or more PUs. A TU can be square or non-square (e.g., rectangular) in shape, syntax data associated with a CU may describe, for example, partitioning of the CU into one or more TUs according to a quad-tree. Partitioning modes may differ between whether the CU is skip or direct mode encoded, intra-prediction mode encoded, or inter-prediction mode encoded.

While VVC (Versatile Video Coding) removes the separation of the PU and TU concepts, and supports more flexibility for CU partition shapes. A size of the CU corresponds to a size of the coding node and may be square or non-square (e.g., rectangular) in shape. The size of the CU may range from 4×4 pixels (or 8×8 pixels) up to the size of the tree block with a maximum of 128×128 pixels or greater (for example, 256×256 pixels).

After encoder 200 generates a predictive block (e.g., luma, Cb, and Cr predictive block) for CU, encoder 200 may generate a residual block for the CU. For instance, encoder 100 may generate a luma residual block for the CU. Each sample in the CU's luma residual block indicates a difference between a luma sample in the CU's predictive luma block and a corresponding sample in the CU's original luma coding block. In addition, encoder 200 may generate a Cb residual block for the CU. Each sample in the Cb residual block of a CU may indicate a difference between a Cb sample in the CU's predictive Cb block and a corresponding sample in the CU's original Cb coding block. Encoder 100 may also generate a Cr residual block for the CU. Each sample in the CU's Cr residual block may indicate a difference between a Cr sample in the CU's predictive Cr block and a corresponding sample in the CU's original Cr coding block.

In some examples, encoder 100 skips application of the transforms to the transform block. In such examples, encoder 200 may treat residual sample values in the same way as transform coefficients. Thus, in examples where encoder 100 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), encoder 200 may quantize the coefficient block to possibly reduce the amount of data used to represent the coefficient block, potentially providing further compression. Quantization generally refers to a process in which a range of values is compressed to a single value. After encoder 200 quantizes a coefficient block, encoder 200 may entropy encode syntax elements indicating the quantized transform coefficients. For example, encoder 200 may perform Context-Adaptive Binary Arithmetic Coding (CABAC) or other entropy coding techniques on the syntax elements indicating the quantized transform coefficients. Encoder 200 may output a bitstream of encoded picture data 271 that includes a sequence of bits that forms a representation of coded pictures and associated data. Thus, the bitstream comprises an encoded representation of video data.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 10:
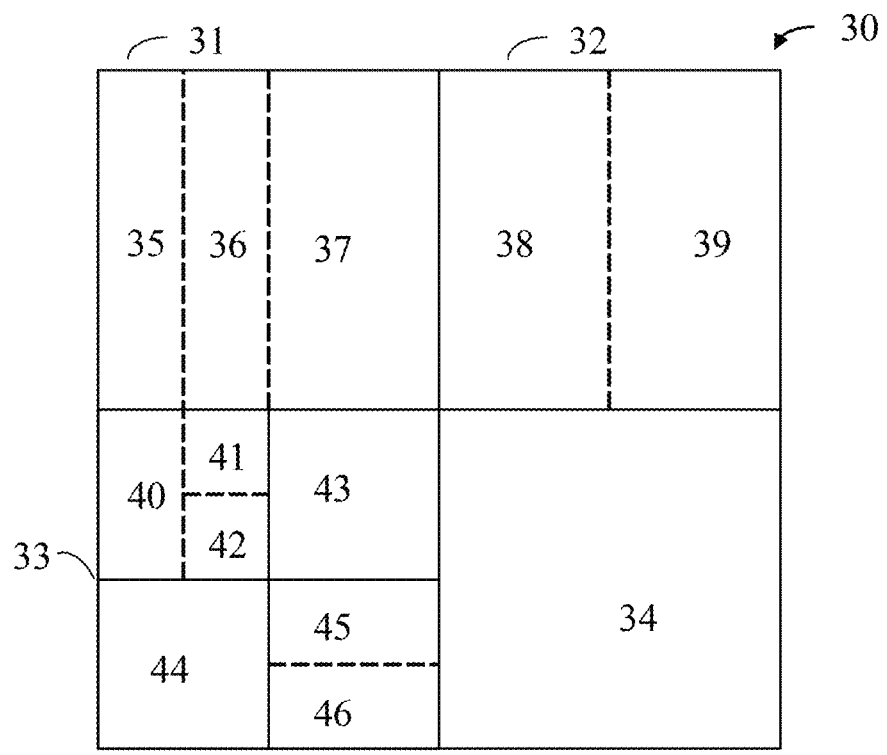
FIG. 10 illustrates a diagram of an example of block partitioning using a quad-tree-binary-tree (QTBT) structure.

In the QTBT, a CU can have either a square or rectangular shape. As shown in FIG. 10, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). When the quadtree node has size equal to MinQTSize, no further quadtree is considered. If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

FIG. 10 illustrates an example of a block 30 (e.g., a CTB) partitioned using QTBT partitioning techniques. As shown in FIG. 10, using QTBT partition techniques, each of the blocks is split symmetrically through the center of each block.

Figure 11:
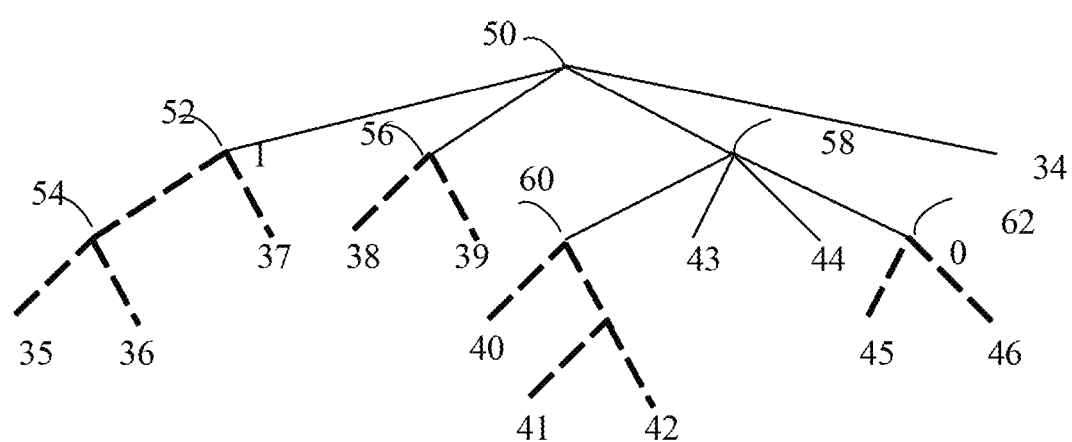
FIG. 11 illustrates a diagram of an example of tree structure corresponding to the block partitioning using the QTBT structure of FIG. 10.

FIG. 11 illustrates the tree structure corresponding to the block partitioning of FIG. 11. The solid lines in FIG. 11 indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 11, at node 50, block 30 is split into the four blocks 31, 32, 33, and 34, shown in FIG. 10, using QT partitioning. Block 34 is not further split, and is therefore a leaf node. At node 52, block 31 is further split into two blocks using BT partitioning. As shown in FIG. 11, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical binary-tree splitting resulting in block 40 and a right vertical block. The right vertical block is then split using horizontal binary-tree splitting into blocks 41 and 42. The lower right block created from the quad-tree splitting at node 58, is split at node 62 using horizontal binary-tree splitting into blocks 45 and 46. As shown in FIG. 11, node 62 is marked with a 0, indicating horizontal splitting.

In addition, the QTBT scheme supports the ability for the luma and chroma to have a separate QTBT structure. Currently, for P and B slices, the luma and chroma CTBs in one CTU may share the same QTBT structure. However, for I slices, the luma CTB is partitioned into CUs by a QTBT structure, and the chroma CTBs may be partitioned into chroma CUs by another QTBT structure. This means that a CU in an I slice consists of a coding block of the luma component or coding blocks of two chroma components, and a CU in a P or B slice consists of coding blocks of all three colour components.

The encoder 200 applies a rate-distortion optimization (RDO) process for the QTBT structure to determine the block partitioning.

In addition, a block partitioning structure named multi-type-tree (MTT) is proposed in U.S. Patent Application Publication No. 20170208336 to replace QT, BT, and/or QTBT based CU structures. The MTT partitioning structure is still a recursive tree structure. In MTT, multiple different partition structures (e.g., three or more) are used. For example, according to the MTT techniques, three or more different partition structures may be used for each respective non-leaf node of a tree structure, at each depth of the tree structure.

The depth of a node in a tree structure may refer to the length of the path (e.g., the number of splits) from the node to the root of the tree structure. A partition structure may generally refer to in how many different blocks a block may be divided into. A Partition structure may be, for example, a quad-tree partitioning structure with a block being divided into four blocks, a binary-tree partitioning structure with a block being divided into two blocks, or a triple-tree partitioning structure with a block being divided into three blocks. Furthermore, a triple-tree partitioning structure may be without dividing the block through the center. A partition structure may have multiple different partition types. A partition type may additionally define how a block is divided, including symmetric or asymmetric partitioning, uniform or non-uniform partitioning, and/or horizontal or vertical partitioning.

In MTT, at each depth of the tree structure, encoder 200 may be configured to further split sub-trees using a particular partition type from among one of three more partitioning structures. For example, encoder 100 may be configured to determine a particular partition type from QT, BT, triple-tree (TT) and other partitioning structures. In one example, the QT partitioning structure may include square quad-tree or rectangular quad-tree partitioning types. Encoder 200 may partition a square block using square quad-tree partitioning by dividing the block, down the center both horizontally and vertically, into four equal-sized square blocks. Likewise, encoder 200 may partition a rectangular (e.g., non-square) block using rectangular quad-tree partition by dividing the rectangular block, down the center both horizontally and vertically, into four equal-sized rectangular blocks.

The BT partitioning structure may include at least one of horizontal symmetric binary-tree, vertical symmetric binary-tree, horizontal non-symmetric binary-tree, or vertical non-symmetric binary-tree partition types. For the horizontal symmetric binary-tree partition type, encoder 200 may be configured to split a block, down the center of the block horizontally, into two symmetric blocks of the same size. For the vertical symmetric binary-tree partition type, encoder 200 may be configured to split a block, down the center of the block vertically, into two symmetric blocks of the same size. For the horizontal non-symmetric binary-tree partition type, encoder 100 may be configured to split a block, horizontally, into two blocks of differing size. For example, one block may be ¼ the size of the parent block and the other block may be ¾ the size of the parent blocks, similar to the PART_2N×nU or PART_2N×nD partition type. For the vertical non-symmetric binary-tree partition type, encoder 100 may be configured to split a block, vertically, into two blocks of differing size. For example, one block may be ¼ the size of the parent block and the other block may be ¾ the size of the parent blocks, similar to the PART_nL×2N or PART_nR×2N partition type. In other examples, an asymmetric binary-tree partition type may divide a parent block into different size fractions. For example, one sub-block may be ⅜ of the parent block and the other sub-block may be ⅝ of the parent block. Of course, such a partition type may be either vertical or horizontal.

The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric triple-tree, vertical even/uniform symmetric triple-tree, horizontal uneven/non-uniform symmetric triple-tree, vertical uneven/non-uniform symmetric triple-tree, horizontal uneven/non-uniform asymmetric triple-tree, or vertical uneven/non-uniform asymmetric triple-tree partition types.

In general, an uneven/non-uniform symmetric triple-tree partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric triple-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric triple-tree partition type is a partition type that is not symmetric about a center line of the block, and where at least one of the resultant blocks is not the same size as the other two.

Figure 11A:
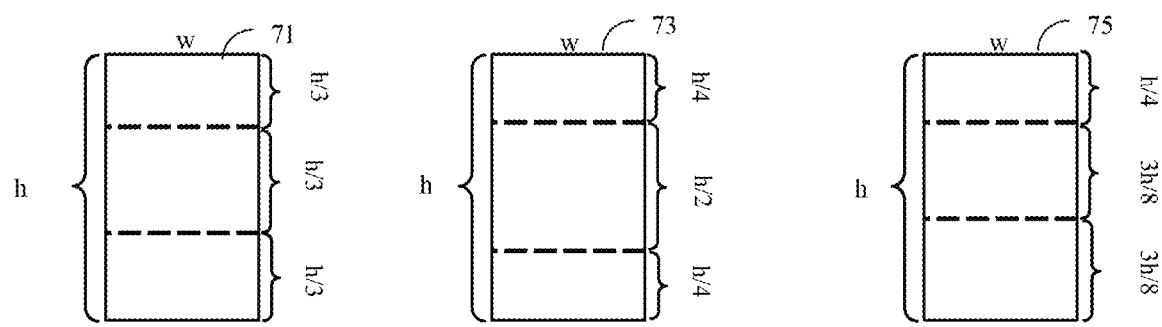
FIG. 11a illustrates a diagram of an example of horizontal triple-tree partition types.
Figure 11B:
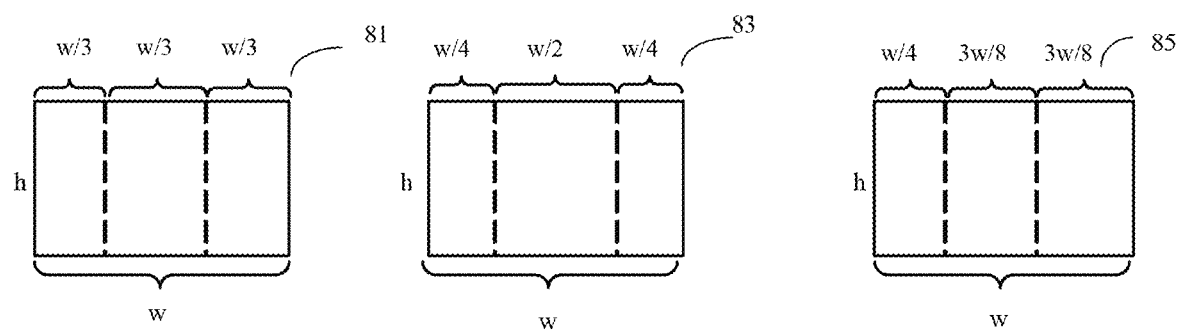
FIG. 11b illustrates a diagram of an example of vertical triple-tree partition types.

FIG. 11a is a conceptual diagram illustrating example horizontal triple-tree partition types. FIG. 11b is a conceptual diagram illustrating example vertical triple-tree partition types. In both FIG. 11a and FIG. 11b, h represents the height of the block in luma or chroma samples and w represents the width of the block in luma or chroma samples.

Note that the respective center line of a block does not represent the boundary of the block (i.e., the triple-tree partitions do not spit a block through the center line). Rather, the center line is used to depict whether or not a particular partition type is symmetric or asymmetric relative to the center line of the original block. The center line is also along the direction of the split.

As shown in FIG. 11a, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 11A, the horizontal uneven/non-uniform asymmetric partition type produces a top block a with height of h/4, a center block with a height of 3h/8, and a bottom block with a height of 3h/8. Of course, other asymmetric arrangements may be used.

As shown in FIG. 11b, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 8, the vertical uneven/non-uniform asymmetric partition type produces a left block with width of w/4, a center block with width of 3w/8, and a bottom block with a width of 3w/8. Of course, other asymmetric arrangements may be used.

In examples where a block (e.g., at a sub-tree node) is split to a non-symmetric triple-tree partition type, encoder 200 and/or decoder 300 may apply a restriction such that two of the three partitions have the same size. Such a restriction may correspond to a limitation to which encoder 200 must comply when encoding video data. Furthermore, in some examples, encoder 200 and decoder 300 may apply a restriction whereby the sum of the area of two partitions is equal to the area of the remaining partition when splitting according to a non-symmetric triple-tree partition type.

In some examples, encoder 200 may be configured to select from among all of the aforementioned partition types for each of the QT, BT, and TT partition structures. In other examples, encoder 200 may be configured to only determine a partition type from among a subset of the aforementioned partition types. For example, a subset of the above-discussed partition types (or other partition types) may be used for certain block sizes or for certain depths of a quadtree structure. The subset of supported partition types may be signaled in the bitstream for use by decoder 200 or may be predefined such that encoder 200 and decoder 300 may determine the subsets without any signaling.

In other examples, the number of supported partitioning types may be fixed for all depths in all CTUs. That is, encoder 200 and decoder 300 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, encoder 200 and/or decoder 300 may apply preconfigured constraints on supported partitioning types in order to avoid duplicated partitioning for a certain region of a video picture or region of a CTU. In one example, when a block is split with non-symmetric partition type, encoder 200 and/or decoder 300 may be configured to not further split the largest sub-block that is split from the current block. For example, when a square block is split according to a non-symmetric partition type (similar to the PART_2N×nU partition type), the largest sub-block among all sub-blocks (similar to the largest sub-block of PART_2N×nU partition type) is the noted leaf node and cannot be further split. However, the smaller sub-block (similar to the smaller sub-block of PART_2N×nU partition type) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split with a non-symmetric partition type (similar to the PART_2N×nU partition type), encoder 200 and/or 3ecoder 200 may be configured to not split the large sub-block among all sub-blocks (similar to the largest sub-block of PART_2N×nU partition type) in the horizontal direction.

As another example where constraints on supported partitioning types may be applied to avoid difficulty in further splitting, encoder 200 and/or decoder 300 may be configured to not split a block, either horizontally or vertically, when the width/height of a block is not a power of 2 (e.g., when the width height is not 2, 4, 8, 16, etc.).

The above examples describe how encoder 200 may be configured to perform MTT partitioning. Decoder 300 may also then apply the same MTT partitioning as was performed by encoder 200. In some examples, how a picture of video data was partitioned by encoder 200 may be determined by applying the same set of predefined rules at decoder 300. However, in many situations, encoder 200 may determine a particular partition structure and partition type to use based on rate-distortion criteria for the particular picture of video data being coded. As such, in order for decoder 300 to determine the partitioning for a particular picture, encoder 200 may signal syntax elements in the encoded bitstream that indicate how the picture, and CTUs of the picture, are to be partitioned. Decoder 200 may parse such syntax elements and partition the picture and CTUs accordingly.

In one example, the prediction processing unit 260 of video encoder 200 may be configured to perform any combination of the partitioning techniques described above, especially, for the motion estimation, and the details will be described later. Like the picture 201, the block 203 again is or can be regarded as a two-dimensional array or matrix of samples with intensity values (sample values), although being of smaller dimension than the picture 201. In other words, the block 203 may comprise, e.g., one sample array (e.g., a luma array in case of a monochrome picture 201) or three sample arrays (e.g., a luma and two chroma arrays in case of a color picture 201) or any other number and/or kind of arrays depending on the color format applied. The number of samples in the horizontal and vertical direction (or axis) of the block 203 define the size of block 203.

Encoder 200 as shown in FIG. 2 is configured to encode the picture 201 block by block, e.g., the encoding and prediction is performed per block 203.

Residual Calculation

The residual calculation unit 204 is configured to calculate a residual block 205 based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 is configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g., by inverse transform processing unit 212, at a decoder 300 (and the corresponding inverse transform, e.g., by inverse transform processing unit 212 at an encoder 20) and corresponding scaling factors for the forward transform, e.g., by transform processing unit 206, at an encoder 200 may be specified accordingly.

Quantization

The quantization unit 208 is configured to quantize the transform coefficients 207 to obtain quantized transform coefficients 209, e.g., by applying scalar quantization or vector quantization. The quantized transform coefficients 209 may also be referred to as quantized residual coefficients 209. The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g., by inverse quantization 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g., an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g., Summer 214) is configured to add the inverse transform block 213 (i.e., reconstructed residual block 213) to the prediction block 265 to obtain a reconstructed block 215 in the sample domain, e.g., by adding the sample values of the reconstructed residual block 213 and the sample values of the prediction block 265.

Optionally, the buffer unit 216 (or short "buffer" 216), e.g., a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g., intra prediction.

Embodiments of the encoder 200 may be configured such that, e.g., the buffer unit 216 is not only used for storing the reconstructed blocks 215 for intra prediction 254 but also for the loop filter unit 220 (not shown in FIG. 2), and/or such that, e.g., the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g., to smooth pixel transitions, or otherwise improve the video quality. The loop filter unit 220 is intended to represent one or more loop filters, such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 220 is shown in FIG. 2 as being an in-loop filter, in other configurations, the loop filter unit 220 may be implemented as a post-loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 200 (respectively loop filter unit 220) may be configured to output loop filter parameters (such as sample adaptive offset information), e.g., directly or entropy encoded via the entropy encoding unit 270 or any other entropy coding unit, so that, e.g., a decoder 300 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e., decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g., reference samples of the same (current) picture from buffer 216 and/or reference picture data 231 from one or a plurality of previously decoded pictures from decoded picture buffer 230, and to process such data for prediction, i.e., to provide a prediction block 265, which may be an inter-predicted block 245 or an intra-predicted block 255.

Mode selection unit 262 may be configured to select a prediction mode (e.g., an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g., from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e., select the prediction mode which provides a minimum rate distortion optimization or which associated rate distortion at least a fulfills a prediction mode selection criterion.

In the following, the prediction processing (e.g., prediction processing unit 260 and mode selection (e.g., by mode selection unit 262) performed by an example encoder 200 will be explained in more detail. As described above, the encoder 200 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g., non-directional modes like DC (or mean) mode and planar mode, or directional modes, e.g., as defined in H.265, or may comprise 67 different intra-prediction modes, e.g., non-directional modes like DC (or mean) mode and planar mode, or directional modes, e.g., as defined in H.266 under development.

The set of (or possible) inter-prediction modes depend on the available reference pictures (i.e., previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit and motion compensation (MC) unit (not shown in FIG. 2). The motion estimation unit is configured to receive or obtain the picture block 203 (current picture block 203 of the current picture 201) and a decoded picture 331, or at least one or a plurality of previously reconstructed blocks, e.g., reconstructed blocks of one or a plurality of other/different previously decoded pictures 331, for motion estimation. E.g., a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV). Merging is an important motion estimation tool used in HEVC and inherited to VVC. For performing the merge estimation, the first thing should be done is construct a merge candidate list where each of the candidate contains all motion data including the information whether one or two reference picture lists are used as well as a reference index and a motion vector for each list.

The merge candidate list is constructed based on the following candidates: (a) up to four spatial merge candidates that are derived from five spatial neighboring blocks; (b) one temporal merge candidate derived from two temporal, co-located blocks; (c) additional merge candidates including combined bi-predictive candidates and zero motion vector candidates.

The first candidates in the merge candidate list are the spatial neighbors. Up to four candidates are inserted in the merge list by sequentially checking A1, B1, B0, A0 and B2, in that order, according to the right part of FIG. 12.

Instead of just checking whether a coding block is available and contains motion information, some additional redundancy checks are performed before taking all the motion data of the coding block as a merge candidate. These redundancy checks can be divided into two categories for two different purposes: (a) avoid having candidates with redundant motion data in the list; (b) prevent merging two partitions that could be expressed by other means which would create redundant syntax.

When N is the number of spatial merge candidates, a complete redundancy check would consist of $$\frac{N \cdot (N-1)}{2}$$

motion data comparisons. In case of the five potential spatial merge candidates, ten motion data comparisons would be needed to assure that all candidates in the merge list have different motion data. During the development of HEVC, the checks for redundant motion data have been reduced to a subset in a way that the coding efficiency is kept while the comparison logic is significantly reduced. In the final design, no more than two comparisons are performed per candidate resulting in five overall comparisons. Given the order of {A1, B1, B0, A0, B2}, B0 only checks B1, A0 only A1 and B2 only A1 and B1. In an embodiment of the partitioning redundancy check, the bottom PU of a 2N×N partitioning is merged with the top one by choosing candidate B1. This would result in one CU with two PUs having the same motion data which could be equally signaled as a 2N×2N CU. Overall, this check applies for all second PUs of the rectangular and asymmetric partitions 2N×N, 2N×nU, 2N×nD, N×2N, nR×2N and nL×2N. It is noted that for the spatial merge candidates, only the redundancy checks are performed and the motion data is copied from the candidate blocks as it is. Hence, no motion vector scaling is needed here.

The derivation of the motion vectors for the temporal merge candidate is the same as for the TMVP. Since a merge candidate comprises all motion data and the TMVP is only one motion vector, the derivation of the whole motion data only depends on the slice type. For bi-predictive slices, a TMVP is derived for each reference picture list. Depending on the availability of the TMVP for each list, the prediction type is set to bi-prediction or to the list for which the TMVP is available. All associated reference picture indices are set equal to zero. Consequently for uni-predictive slices, only the TMVP for list 0 is derived together with the reference picture index equal to zero.

When at least one TMVP is available and the temporal merge candidate is added to the list, no redundancy check is performed. This makes the merge list construction independent of the co-located picture which improves error resilience. Consider the case where the temporal merge candidate would be redundant and therefore not included in the merge candidate list. In the event of a lost co-located picture, the decoder could not derive the temporal candidates and hence not check whether it would be redundant. The indexing of all subsequent candidates would be affected by this.

For parsing robustness reasons, the length of the merge candidate list is fixed. After the spatial and the temporal merge candidates have been added, it can happen that the list has not yet the fixed length. In order to compensate for the coding efficiency loss that comes along with the non-length adaptive list index signaling, additional candidates are generated. Depending on the slice type, up to two kind of candidates are used to fully populate the list: (a) Combined bi-predictive candidates; (b) Zero motion vector candidates.

In bi-predictive slices, additional candidates can be generated based on the existing ones by combining reference picture list 0 motion data of one candidate with and the list 1 motion data of another one. This is done by copying $\Delta x_0$, $\Delta y_0$, $\Delta t_0$ from one candidate, e.g., the first one, and $\Delta x_1$, $\Delta y_1$, $\Delta t_1$ from another, e.g., the second one. The different combinations are predefined and given in Table 1.1.

TABLE 1.1

| Combination Order | 0 | 1 | 2 | 3 | 4 | 5 | 6 | 7 | 8 | 9 | 10 | 11 |
|---|---|---|---|---|---|---|---|---|---|---|---|---|
| $\Delta x_0$, $\Delta y_0$, $\Delta t_0$ from Cand. | 0 | 1 | 0 | 2 | 1 | 2 | 0 | 3 | 1 | 3 | 2 | 3 |
| $\Delta x_1$, $\Delta y_1$, $\Delta t_1$ from Cand. | 1 | 0 | 2 | 0 | 2 | 1 | 3 | 0 | 3 | 1 | 3 | 2 |

When the list is still not full after adding the combined bi-predictive candidates, or for uni-predictive slices, zero motion vector candidates are calculated to complete the list. All zero motion vector candidates have one zero displacement motion vector for uni-predictive slices and two for bi-predictive slices. The reference indices are set equal to zero and are incremented by one for each additional candidate until the maximum number of reference indices is reached. If that is the case and there are still additional candidates missing, a reference index equal to zero is used to create these. For all the additional candidates, no redundancy checks are performed as it turned out that omitting these checks will not introduce a coding efficiency loss.

For each PU coded in inter-picture prediction mode, a so called merge_flag indicates that block merging is used to derive the motion data. The merge_idx further determines the candidate in the merge list that provides all the motion data needed for the MCP. Besides this PU-level signaling, the number of candidates in the merge list is signaled in the slice header. Since the default value is five, it is represented as a difference to five (five_minus_max_num_merge_cand). That way, the five is signaled with a short codeword for the 0 whereas using only one candidate, is signaled with a longer codeword for the 4. Regarding the impact on the merge candidate list construction process, the overall process remains the same although it terminates after the list contains the maximum number of merge candidates. In the initial design, the maximum value for the merge index coding was given by the number of available spatial and temporal candidates in the list. When e.g., only two candidates are available, the index can be efficiently coded as a flag. But, in order to parse the merge index, the whole merge candidate list has to be constructed to know the actual number of candidates. Assuming unavailable neighboring blocks due to transmission errors, it would not be possible to parse the merge index anymore.

A crucial application of the block merging concept in HEVC is its combination with a skip mode. In previous video coding standards, the skip mode was used to indicate for a block that the motion data is inferred instead of explicitly signaled and that the prediction residual is zero, i.e., no transform coefficients are transmitted. In HEVC, at the beginning of each CU in an inter-picture prediction slice, a skip_flag is signaled that implies the following: (a). the CU only contains one PU (2N×2N partition type); (b). the merge mode is used to derive the motion data (merge_flag equal to 1); (c). no residual data is present in the bitstream.

Figure 6:
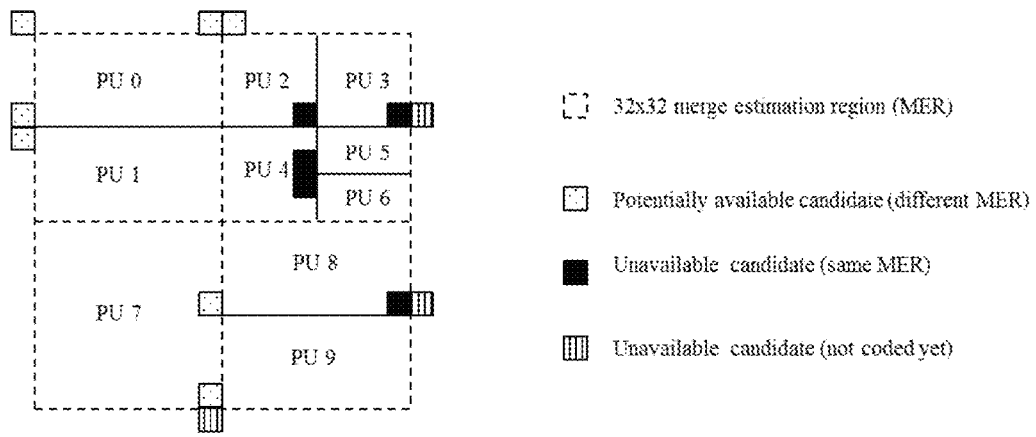
FIG. 6 illustrates an MER based candidate block availability status during a merge estimation.

A parallel merge estimation level was introduced in HEVC that indicates the region in which merge candidate lists can be independently derived by checking whether a candidate block is located in that merge estimation region (MER). A candidate block that is in the same MER is not included in the merge candidate list. Hence, its motion data does not need to be available at the time of the list construction. When this level is e.g., 32, all prediction units in a 32×32 area can construct the merge candidate list in parallel since all merge candidates that are in the same 32×32 MER, are not inserted in the list. As shown in FIG. 6, there is a CTU partitioning with seven CUs and ten PUs. All potential merge candidates for the first PU0 are available because they are outside the first 32×32 MER. For the second MER, merge candidate lists of PUs 2-6 cannot include motion data from these PUs when the merge estimation inside that MER should be independent. Therefore, when looking at a PU5 for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

However, as discussed before, the parallel merge estimation level that is used in HEVC is not efficient anymore, because the VVC introduces more partition modes which results in irregular (no-square) coding blocks hindering the parallel processing for merge estimation of the coding blocks.

The present disclosure provides several solutions to resolve the problems discussed above.

According to a first embodiment, an apparatus is provided for marking availability of a candidate coding block for merge estimation of a current coding block within a coding tree unit, CTU. The candidate (coding) block is marked as available. The candidate block is marked as unavailable when a predefined location of the candidate coding block is included within an extended merge estimation region, MER, wherein the extended MER includes a current MER in which the current coding block is located and at least a portion of another MER, adjacent to the current MER.

This means that the respective block is marked as available for prediction of the current coding block initially, i.e., at the beginning of the merge estimation (e.g., by default). In other words, prior to a construction of a merge candidate list of the current coding block, the candidate block is marked as available.

The term "unavailable" means that an unavailable-marked candidate block is not used for prediction of a current coding block. As a result, there is or is no longer a dependence of the current coding block on the candidate block with respect to a processing order. Hence, by marking a candidate block as unavailable, the dependencies among a candidate and a current block is broken, and the candidate block may be parallel processed.

According to an embodiment, the marking of the candidate coding block includes to obtain the coordinates (X,Y) of a left-top pixel of the current coding block. As the predefined location, the coordinates (X2,Y2) of a specific point in the candidate coding block are obtained. It is then determined if the specific point is located within the extended MER by comparing the coordinates of the specific point and the coordinates of the left-top pixel. The candidate block is marked as unavailable, if the specific point is located within the extended MER.

In this embodiment, the top-left pixel position of the current coding block is used as reference position, as is common in HEVC and/or VVC. However, any other suitable position within the current coding block may be used as reference.

The predefined location of the candidate block may be located at specific positions/locations of the candidate block to optimize the merge estimation and in particular to increase the number of unavailable candidate blocks. This enhances the parallel processing, as discussed in the following embodiments (solutions).

Solution 1

According to an embodiment, the specific point is a top-left pixel of the candidate coding block. The determining if the specific point is located within the extended MER includes mark the candidate coding block as unavailable if any of the conditions is satisfied:
  if [X−1,Y] and [X,Y] are in the current MER, and if X2<X and Y2>=Y; or
  if [X,Y−1] and [X,Y] are in the current MER, and if Y2<Y and X2>=X; or
  if [X−1,Y−1] and [X,Y] are in the current MER, and if Y2<Y and X2<X.

Figure 13:
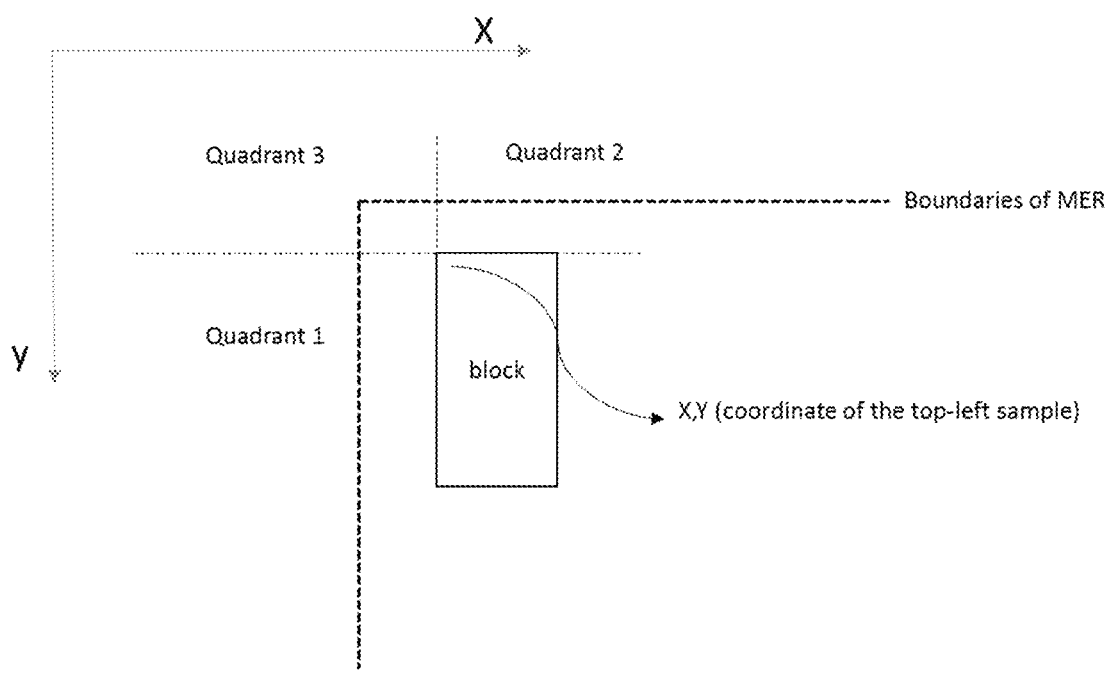
FIG. 13 illustrates a diagram of an example of quadrant partitions for the present disclosure.

This is illustrated in FIG. 13, showing a scenario where the above embodiment is applied. The block shown in the FIG. 13 is a current coding block to be merge estimated. The bold dash line is the boundary of a MER for the current coding block, and the thin dash lines are auxiliary lines used for easily referring the locations in that FIG. 13. In the solution 1, a set of new MER conditions is provided. Before the new MER conditions are applied, it is assumed that the top-left coordinate of the current block is [X, Y], and the top-left coordinate of a second block is [X2, Y2]. The second block is referred also to the candidate (coding) block. The second block is initially marked/set as available for prediction, which means the second block is in the same picture as the current block, and in the same slice, and is an inter-predicted block. This means that the second block/candidate block may be used in general for prediction of the current (coding) block. Then, the above MER conditions are:
  (1) Assume that the [X,Y] are the top-left coordinate of the current block.
  (2) Assume [X2, Y2] are the top-left coordinate of a second block.
  (3) First set second block "available for prediction".
  (4) If [X−1,Y] and [X,Y] are in the same MER, and if X2<X and Y2>=Y, motion information candidates of second block are set unavailable for prediction (quadrant 1).

(5) If [X,Y−1] and [X,Y] are in the same MER, and if Y2<Y and X2>=X, motion information candidates of second block are set unavailable for prediction (quadrant 2).

(6) If [X−1,Y−1] and [X,Y] are in the same MER, and if Y2<Y and X2<X, motion information candidates of second block are set unavailable for prediction (quadrant 3).

The word "same" refers to the current MER, i.e., the MER which includes the current coding block. Further, the quadrants 1, 2, and 3 correspond to the extended MER, and the above conditions test whether or not the candidate/second block is within the extended MER.

It is noted that throughout the application it is assumed that the value of x increases from left to right along the horizontal x-axis. Moreover, the value of y increases from top to bottom along the vertical y-axis (i.e., gravity axis).

By these new MER conditions the dependency with respect to a processing order between the current block and the second block (i.e., candidate) can be broken by setting the second block as unavailable for prediction if one the conditions is met. This allows the current block and the second block to be processed in a parallel way thereby, overcoming the technical problem discussed above.

It is noted that the new MER condition breaks both direct and indirect dependencies between the current block and the second block. In other words, if the processing order of blocks is given by second block-a third block-current block, the new MER condition not only breaks the prediction dependency between the current block and the second block, but breaks also the dependency between the third block and the current block. The following embodiment can exemplify how the new MER conditions work.

Figure 12:
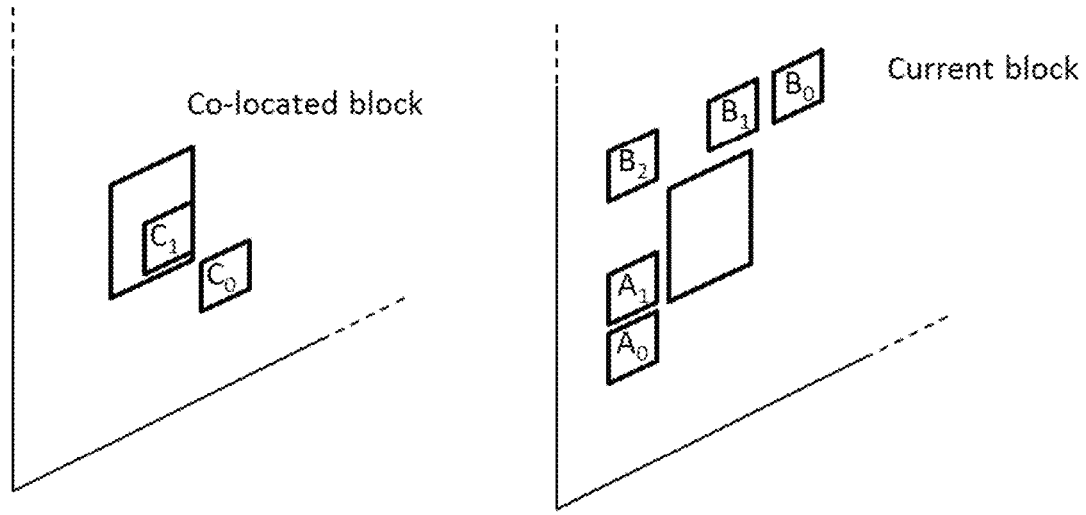
FIG. 12 illustrates potential merge estimation coding blocks in spatial and temporal domains.

In VVC, the merge estimation scheme is mostly inherited from HEVC, and the potential candidate coding blocks in the spatial domain (in the other words, the blocks within the same picture) to be used to derive MVs therefrom to construct a MV candidate list for the inter prediction of a current coding block are substantially the same as those blocks shown in FIG. 12. Namely, during the merge estimation of a current block, blocks A1, A0, B1, B0, and B2 will be checked in turn to construct a candidate list. The basic rule to construct a candidate list for a current block is first constructing a spatial candidate list, then a temporal candidate list, and finally additional merge candidates.

The spatial candidate list is constructed by sequentially checking the blocks A1, B1, B0, A0 and B2, in that order, and up to four spatial merge candidates that are derived from A1, B1, B0, A0 and B2.

More specifically, the spatial candidates list is constructed based on the following rule.

(a). When the current candidate coding block is the coding block A1, check the availability of the coding block A1 based on the solution 1 or the following solutions 2~4, and when the coding block A1 is not marked as unavailable (i.e., A1 is marked as being available), then add the MV of the coding block A1 to the motion vector list;

(b). when the current candidate coding block is the coding block B1, check the availability of the coding block B1 based on the solution 1 or the following solutions 2~4, and when the coding block B1 is not marked as unavailable (i.e., B1 is marked as being available), add the MV of the coding block B1 to the motion vector list;

(c). when the current candidate coding block is the coding block B0, check the availability of the coding block B0 based on the solution 1 or the following solutions 2~4, and when the coding block B0 is not marked as unavailable (i.e., B0 is marked as being available), and the MV is different from the MV of the coding block B1 that has been added to the motion vector list, add the motion vector predictor of the coding block B0 to the motion vector list;

(d). when the current candidate coding block is the coding block A0, check the availability of the coding block A0 based on the solution 1 or the following solutions 2~4, and when the coding block A0 is not marked as unavailable (i.e., A0 is marked as being available), and the MV is different from the MV of the coding block A1 that has been added to the motion vector list, add the MV of the coding block A0 to the motion vector list; and (e). when the current candidate coding block is the coding block B2, check the availability of the coding block B2 based on the solution 1 or the following solutions 2~4, and when the coding block B2 is not marked as unavailable (i.e., B2 is marked as being available), and the MV is different from both the MV of the coding block A1 that has been added to the motion vector list, and the MV of the coding block B1 that has been added to the motion vector list, add MV of the coding block B2 to the motion vector list.

The spatial candidates list is derived from two temporal, co-located blocks.

The additional merge candidates includes combined bi-predictive candidates and zero motion vector candidates.

As long as the merge candidate list is built, a merge estimation is carried based on each of the MV included in the candidate list by using an RDO (Rate Distortion Optimization) rule or another measure to find the optimal MV as the MV or MV predictor of a current coding block, and the index of the MV within the merge candidate list will be added into the bit-stream to have the decoding side know which MV is the one used for inter-predicting the current block. It should be noted that the number of the spatial merge candidates is not limited to 4 as used in HEVC, it can be changed and signaled in the bit stream to the decoding side. Besides, the potential candidate coding blocks used to build the spatial candidate list for a current coding block is not fixed, it can be changed based on any positive gain observed.

Figure 14:
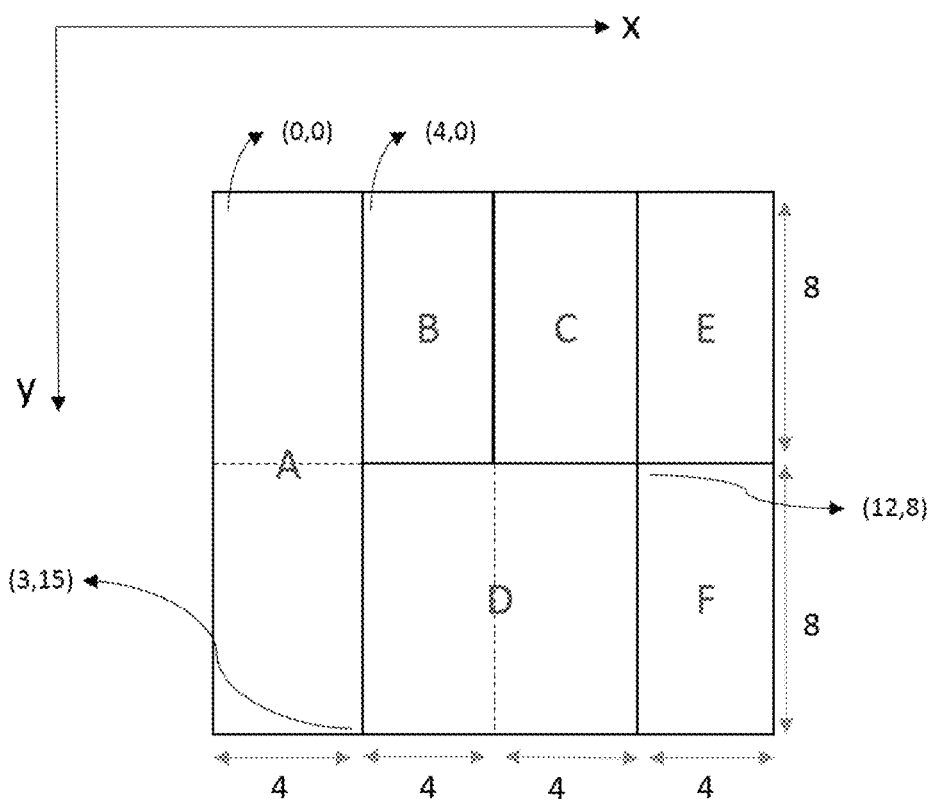
FIG. 14 illustrates a diagram of an example of block partitions an MER where the present disclosure applied.

FIG. 14 shows a partition result of a picture block with a size of 16×16, the dashed line indicate the MER grid which is a size of 8×8. The picture block is partitioned into A~F coding blocks with a processing order of the blocks as A→B→C→D→F). The top-left coordinates of blocks A, B and F are respectively marked in the FIG. 14 as (0, 0), (4, 0), (12, 8). The bottom right coordinate of block A is also marked (3, 15). The widths and heights are also shown in the figure. Based on the new MER conditions of the present disclosure, block B can be now processed in parallel with block A, as the top-left coordinates are in the same MER. This is guaranteed by the fact that the motion information of block A is marked as unavailable for prediction of block B by using the new MER condition. Therefore, the processing of block B does not need to wait for the motion information of block A to become available, so that both blocks can be processed at the same time.

Moreover the blocks C and E can also be processed in parallel according to the rule: "If [X−1,Y] and [X,Y] are in the same MER, and if X2<X and Y2>=Y, motion information candidates of second block are set unavailable for prediction (quadrant 1)." In the rule, due to the processing order, block E is the current block and block C is the second block. Accordingly, both blocks C and D are set unavailable for prediction of block E. Which means block E can now be processed in parallel with block C, since no direct and indirect dependency exists. As a result, several pairs of the blocks A to F can be processed in parallel, which can save the time consumed for the motion estimation, especially, the candidate list construction.

An alternative implementation of the solution 1 can be formulated as follows. The new MER conditions are:
Assume that the [X,Y] are the top-left coordinate of the current block.
Assume [X2, Y2] are the top-left coordinate of a second block.
First set second block "available for prediction".
If [X−1,Y] and [X,Y] are in the same MER, and if X2<X and Y2>=Y, motion information candidates of second block are set unavailable for prediction.
If [X,Y−1] and [X,Y] are in the same MER, and if Y2<Y and X2>=X, motion information candidates of second block are set unavailable for prediction.
If [X−1,Y−1] and [X,Y] are in the same MER, motion information candidates of second block are set unavailable for prediction.

This alternative implementation is logically identical to the previous implementation and results in the same neighboring blocks marked as unavailable for prediction. The reason is, since a neighbor block always precedes a current block, therefore since the conditions Y2>=Y and X2>=X cannot hold true at the same time, this alternative implementation results in the same logical outcome for all possible values of X, X2, Y and Y2.

A third alternative implementation of the solution 1 can be formulated as follows. The new MER conditions are:
Assume that the [X,Y] are the top-left coordinate of the current block.
Assume [X2, Y2] are the top-left coordinate of a second block.
First set second block "available for prediction".
If floor(X2/mer_width) is equal to floor(X/mer_width) and floor(Y2/mer_height)>=floor(Y/mer_height), motion information candidates of second block are set unavailable for prediction.
If floor(Y2/mer_height) is equal to floor(Y/mer_height) and floor(X2/mer_width)>=floor(X/mer_width), motion information candidates of second block are set unavailable for prediction.

The mer_width and mer_height are the width and the height of the merge estimation region. The floor function is a function that takes as input a real number x and gives as output the greatest integer less than or equal to x.

It should be noted that the third alternative implementation is not identical to first two implementations.

Solution 5

Solution 5 provides an option to harmonize the solutions 1~4 with the history-based motion vector prediction. The history based motion vector prediction is proposed in JVET-K0104 which is an input document to Joint Video Experts Team (JVET) of ITU-T SG 16 WP 3 and ISO/IEC JTC 1/SC 29/WG 11, 11th Meeting: Ljubljana, SI, 10-18 Jul. 2018. The history-based MVP (HMVP) method is proposed wherein a HMVP candidate is defined as the motion information of a previously coded block.

A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in the figure above. HMVP candidates could be used in the merge candidate list construction process. All HMVP candidates from the last entry to the first entry in the table are inserted after the TMVP candidate. Pruning is applied on the HMVP candidates.

Once the total number of available merge candidates reaches the signaled maximally allowed merge candidates, the merge candidate list construction process is terminated. Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. K preferably is set to 4.

The HMVP allows for motion vector prediction from non-adjacent spatial neighbor blocks. As an example according to HMVP, it would be possible that block F as shown in FIG. 14 can predict the motion information from block A, since the motion information of block A would be stored in the aforementioned table with HMVP candidates. In this case, the solutions 1-4 apply without a change to the candidates that are stored in the table.

If HMVP candidates can be used for the inter prediction of a block by using a motion vector in the HMVP list. In the document Versatile Video Coding (Draft 7) of Joint Video Experts Team (JVET) of ITU-T SG 16 WP 3 and ISO/IEC JTC 1/SC 29/WG 11 (document number: Document: JVET-P2001-vE), the HMVP list is denoted as HmvpCandList[ ]. The HMVP candidate list can be updated after coding of every coding block (if the coding block is coded using inter prediction). The processing order using the HMVP list is as follows:
1. Construct a list of candidate motion vectors for prediction of coding block A. In an example, the said list might be a merge list.
2. Insert candidates from the HMVP list into the merge list, if there are empty slots in the merge list and if there are existing candidates in the HMVP list (there might be other types of candidates in the merge list).
3. Select one of the candidates from the merge list for inter-prediction of block A.
4. After the prediction of block A, update the HMVP list using the motion vector that is used in the prediction of block A.

The section 8.5.2.16 (Updating process for the history-based motion vector predictor candidate list) in the document JVET-P2001-vE exemplifies the process of updating the HMVP list (which is the step 4 process description). In the document the following steps are applied to update HmvpCandList[ ], which is the list that includes the HMVP candidate motion vectors:
The candidate list HmvpCandList is modified using the candidate hMvpCand by the following ordered steps:
1. The variable identicalCandExist is set equal to FALSE and the variable removeIdx is set equal to 0.
2. When NumHmvpCand is greater than 0, for each index hMvpIdx with hMvpIdx=0 . . . NumHmvpCand−1, the following steps apply until identicalCandExist is equal to TRUE:
When hMvpCand and HmvpCandList[hMvpIdx] have the same motion vectors and the same reference indices, identicalCandExist is set equal to TRUE and removeIdx is set equal to hMvpIdx.

3. The candidate list HmvpCandList is updated as follows:
   If identicalCandExist is equal to TRUE or NumHmvpCand is equal to 5, the following applies:
      For each index i with i=(removeIdx+1) . . . (NumHmvpCand−1), HmvpCandList[i−1] is set equal to HmvpCandList[i].
      HmvpCandList[NumHmvpCand−1] is set equal to hMvpCand.
   Otherwise (identicalCandExist is equal to FALSE and NumHmvpCand is less than 5), the following applies:
      HmvpCandList[NumHmvpCand++] is set equal to hMvpCand.

In the above process hMvpCand is the motion vector of a coding block that is predicted by inter prediction. In other words the hMvpCand is the motion vector that is used for the prediction of the coding block. In the step 1 if the above steps, two parameters identicalCandExist and removeIdx are initialized to initial values. In the second step it is checked whether there is a candidate in HmvpCandList[ ] that is identical to hMvpCand already. If there is an identical candidate already, identicalCandExist is set equal to true, and the removeIdx is set equal to the index of the identical candidate in the list. Finally in the step 3, if there is already an identical candidate in the HmvpCandList[ ], that candidate is removed from the list, all of the preceeding candidates are shifted one slot up, and the hMvpCand is included at the end of HmvpCandList[ ]. If the is no identical candidate in the HmvpCandList[ ] and the candidate list is full, all existing candidates in the HmvpCandList[ ] are shifted one slot up and the hMvpCand is included at the end of HmvpCandList[ ]. If there is no identical candidate and HmvpCandList[ ] is not full, hMvpCand is simply added to the end of the list.

As an embodiment, in addition to the motion information, top-left or bottom right coordinate of the block must also be stored in association with the table entries, in order to apply the rules given in solutions 1 and 2.

Alternatively, the present disclosure discloses further the following embodiments (solutions) which allow more flexibility in parallel processing of merge estimation.

Similar to the previous embodiments, different forms of MER conditions may be used to check whether a specific point of the candidate block is located in the extended MER. This check or the outcome of the respective MER test depends on the positional relation between the specific point and a position (e.g., a corner) of the current coding block. The candidate block is then marked as unavailable depending on whether or not the condition(s) is satisfied. This is further exemplified by the following embodiments.

According to an embodiment, the marking of the candidate coding block includes: obtain coordinates (x, y) of a corner of the current coding block; obtain, as the predefined location, coordinates of a specific point (x+a, y+b), wherein a∈(−1,0,1) and b∈(−1,0,1), and a and b are selected in dependence on the relationship of the relative position between the specific point and the corner; select, for the one candidate coding block, one value from (−1,0,1) as the a, and one value from the (−1,0,1) as the b; and mark the candidate coding block as unavailable, if floor((x+a)/mer_width) is equal to floor(x/mer_width), or if floor((y+b)/mer_width) is equal to floor(y/mer_height), wherein mer_width is a width and mer_height is a height of the current MER.

This means that current and candidate block are spatial neighbors, with reference to one of a corner of the current block and a (a,b)-parametrized position of the candidate block.

According to an embodiment, the candidate coding block neighbors the corner of the current coding block, and
   the corner of the current coding block is a bottom-left corner, and the candidate coding block is located on where there is left to the current coding block, a=−1, b=0; or
   the corner of the current coding block is a bottom-left corner, and the candidate coding block is located on where there is bottom-left to the current coding block, a=−1, b=1; or
   the corner of the current coding block is an upper left-corner, and the candidate coding block is located on where there is upper-left to the current coding block, a=−1, b=−1; or
   the corner of the current coding block is an upper-right corner, and the candidate coding block is located on where there is upper-right to the current coding block, a=1, b=−1; or
   the corner of the current coding block is an upper-right corner, and the candidate coding block located on where there is upper to the current coding block, a=0, b=−1.

The values of (a,b) of the candidate depend therefore on whether the position of the current block is the bottom-left or upper-right corner and how the candidate block is located relative to that corner.

The various positional relations between the candidate and current block may be illustrated as shown in the following. As a common basis, the following assumption is made for easily understanding the present disclosure by exemplifying embodiments.

Figure 19:
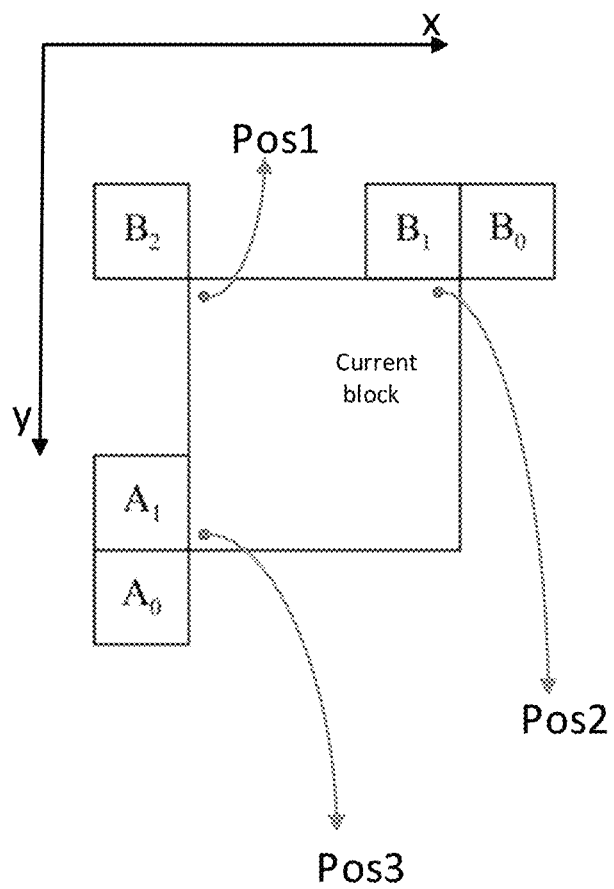
FIG. 19 illustrates an example about a current block and its spatial neighbor blocks.

As shown in FIG. 19, a current block and its spatial neighbors are illustrated as an example. The formal definitions of the spatial neighboring blocks are as follows. Note that here Coord1 refers to the current coding block and Coord2 refers to the candidate block.

Assume that the top-left (top-left corner), top-right (top-right corner) and bottom-left (bottom-left corner) coordinate of the current block are denoted by Pos1=(x1, y1), Pos2=(x2, y2) and Pos3=(x3, y3) respectively, wherein (x,y) are the coordinates in the −x and −y direction. Pos1.x denotes the −x coordinate of Pos1 and Pos1.y denotes the −y coordinate of Pos1.

The left spatial neighbor block ($A_1$) is defined as the block that contains the point $PosA_1$=(x3−1, y3). The left-bottom spatial neighbor block (A0) is defined as the block that contains the point $PosA_0$=(x3−1, y3+1). The above-left spatial neighbor block (B2) is defined as the block that contains the point $PosB_2$=(x1−1, y1−1). The above spatial neighbor block ($B_1$) is defined as the block that contains the point $PosB_1$=(x2, y2−1). The above-right spatial neighbor block ($B_0$) is defined as the block that contains the point $PosB_0$=(x2+1, y2−1).

According to an embodiment, the marking of the candidate coding block includes: obtain coordinates (x, y) of a corner of the current coding block; obtain, as the predefined location, coordinates (x+a, y+b) of a specific point, wherein the potential candidate coding block neighbors a corner of the current coding block and a∈(−1,0,1), b∈(−1,0,1), wherein a and b are not both equal to 0 or 1 and are selected in dependence on the relationship of the relative position between the specific point and the corner; select for the one candidate coding block, one value from (−1,0,1) as the a, and one value from the (−1,0,1) as the b; and mark the candidate coding block as unavailable if floor((x+a)/mer_width) is equal to floor (x/mer_width), and floor((y+b)/mer_height)>=floor (y/mer_height), or if floor((y+b)/mer_height) is equal to floor (y/mer_height) and floor((x+a)/mer_width)>=floor (x/mer_width), wherein mer_height is a height and mer_width is a width of the current MER.

Figure 20:
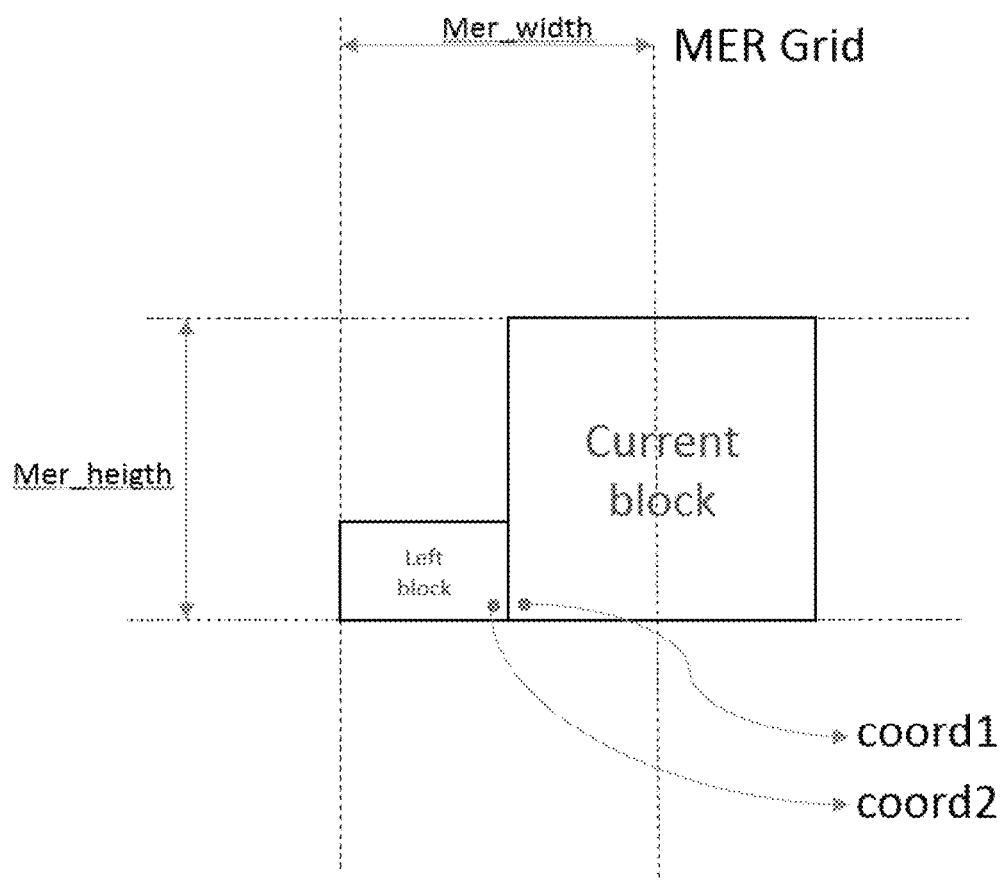
FIG. 20 illustrates an example about the sixth solution.

Based on the assumption shown in FIG. 19, the sixth solution is as follows accompanying with FIG. 20.

Solution 9

Solution 9 comes for adopt the restriction of CTU (coding tree unit) partitions. According to the draft video coding standard "Versatile Video Coding (Draft 2)", it is possible to partition a picture frame into blocks using quadtree split, binary split, or ternary split (document: JVET-K1001-v4 which is accessible @ http://phenix.it-sudparis.eu/jvet). The split operation starts with a CTB (Coding Tree Block) and the CTB is hierarchically partitioned into coding blocks using quadtree split, binary split, or ternary split. Definitions are as follows:

quadtree: A tree in which a parent node can be split into four child nodes, each of which may become parent node for another split.

multi-type tree: A tree in which a parent node can be split either into two child nodes using a binary split or into three child nodes using a ternary split, each of which may become parent node for another split into either two or three child nodes.

A restriction is imposed in the document that a binary split or a ternary split cannot be followed by a quadtree split in the child node.

Quadtree partition depth, or cqtDepth is incremented in the child node of a parent node, if quadtree splitting is performed to generate the child node. Similarly, mttDepth is incremented if binary or ternary split is performed.

In the solution 9, the following is new neighboring block availability checking rule is provided.

New MER conditions:

Depending on the neighboring block that is going to be checked;

If neighbor block is $A_1$, Coord1 is set equal to pos3, Coord2 is set equal to Pos$A_1$.

If neighbor block is $A_0$, Coord1 is set equal to pos3, Coord2 is set equal to Pos$A_0$.

If neighbor block is $B_0$, Coord1 is set equal to pos2, Coord2 is set equal to Pos$B_0$.

If neighbor block is $B_1$, Coord1 is set equal to pos2, Coord2 is set equal to Pos$B_1$.

If neighbor block is $B_2$, Coord1 is set equal to pos1, Coord2 is set equal to Pos$B_2$.

If both of the following conditions are true, the neighboring block is set unavailable for prediction by current block.

Coord2 and Coord 1 are inside the same MER.

cqtDepth of the current block is greater than or equal to a threshold (qtDepthThr).

Note: threshold is an integer number such as 0, 1, 2 . . . .

Figure 22:
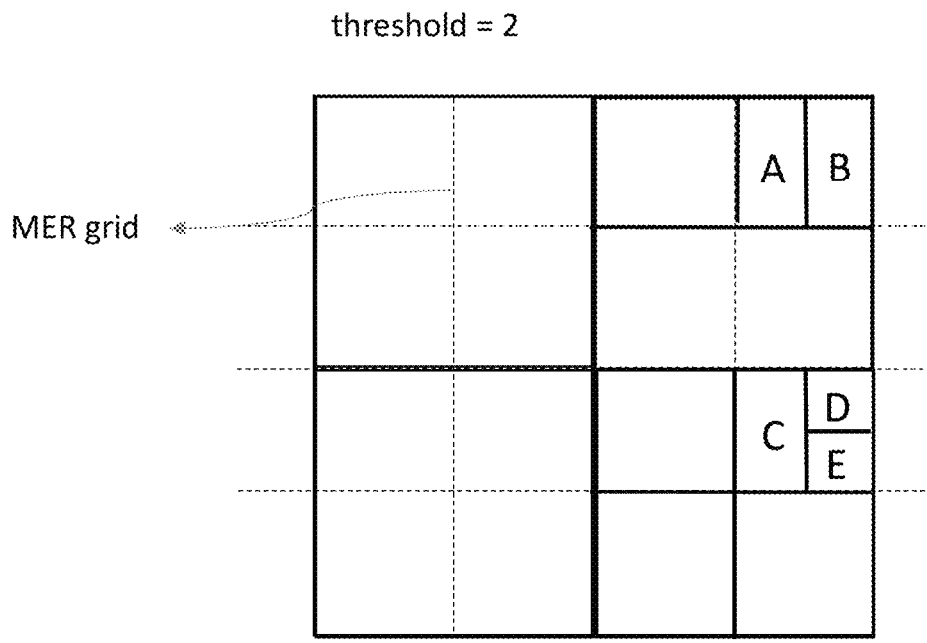
FIG. 22 illustrates an example of determining the availability of neighboring blocks

An exemplary embodiment of solution 9 is provided as follows accompanying FIG. 22. For blocks A and B, cqtDepth is equal to 1 and mttdepth is equal to 3, since 1 quadtree split followed by 3 binary split are performed to generate blocks A and B. For block C, cqtDepth is equal to 2 and mttdepth is equal to 1, since 2 quadtree splits followed by 1 binary split are performed to generate block C. For blocks D and E, cqtDepth is equal to 2 and mttdepth is equal to 2, since 2 quadtree splits followed by 2 binary split are performed to generate blocks D and E.

According to the example, the threshold is set equal to 2. This means that at least 2 quadtree splits need to be performed (cqtDepth>=2) in order for the current block and a neighbor block to be processed in parallel.

In the example on the left, block B (current block) cannot be processed in parallel to block A (neighbor block) although cqtDepth of block B is 1, since blocks A and B are inside the same MER.

Block E (current block) can be processed in parallel to block C and D (neighbor blocks), since the cqtDepth of block E is equal to 2, which is equal to the threshold. Note: As mentioned earlier, the JVET-K1001 prohibits quadtree splits after binary or ternary split.

Solution 10 is a harmonizing solution to have the solution 9 adapted to history-based motion vector prediction as disclosed in "CE4-related: History-based Motion Vector Prediction", it might be possible that some of the neighbor blocks might not be spatially adjacent to the current block. In other words, the method described in the referenced technology constructs a list of motion vectors from blocks that might not be adjacent to the current block.

Solution 10

New MER Conditions:

Depending on the neighboring block that is going to be checked;

If neighbor block belongs to the history-based candidate list, Coord2 is set equal to the top-left coordinate of the neighbor block, Coord1 is set equal to the top-left coordinate of the current block. Alternatively, Coord2 is set equal to the bottom-right coordinate of the neighbor block, Coord1 is set equal to the top-left coordinate of the current block.

If the following conditions are true, the neighboring block is set unavailable for prediction of the current block.

Coord2 and Coord 1 are inside the same MER.

cqtDepth of the current block is greater than or equal to a threshold (qtDepthThr).

Advantageously in solutions 9 and 10, the quadtree depth threshold (qtDepthThr) and the size of the MER (Merge Estimation Region) are preferably obey the following equations:

Width of MER=(width of CTB)/$2^{qtDepthThr}$

Height of MER=(height of CTB)/$2^{qtDepthThr}$

Advantageously, the width and height of the MER is equal to each other according to the above equations in solutions 1 to 10, since the width and height of the Coding Tree Block are defined to be equal in the document JVET-K1001-v4.

Advantageously in solutions 9 and 10:

qtDepthThr and/or size of the MER can be signaled in a parameter set such as Sequence Parameter Set, Picture Parameter Set, slice header etc.

Advantageously, in the solutions 1 to 10, a neighbor block is set unavailable for prediction by the current block, if the current block is coded using merge mode.

Advantageously, in the solutions 1 to 10, a neighbor block is set unavailable for prediction by the current block, if the current block is coded using affine merge mode.

Advantageously in the solutions 1 to 10, a neighbor block is set unavailable for prediction by the current block, if the current block is coded using an inter prediction mode where motion vector difference is not signaled. Please note that the motion vector used for inter prediction of a current block is given by the summation of a motion vector predictor and motion vector difference. According to present application, a neighbor block is set unavailable for prediction by the current block if the current block is coded using an inter prediction mode where motion vector difference is not signaled and inferred to be zero in length.

Advantageously in the solutions 1 to 10, a neighbor block is set unavailable for prediction by the current block if the current block is coded using an inter prediction mode where the motion vector difference can only have predefined values. For example, one such inter prediction mode is exemplified in document JVET-K0115, "CE4 Ultimate motion vector expression in J0024 (Test 4.2.9)" of Joint Video Experts Team (JVET) of ITU-T SG 16 WP 3 and ISO/IEC JTC 1/SC 29/WG 11, 11th Meeting: Ljubljana, SI, 10-18 Jul. 2018. In this document, an inter prediction mode is exemplified where the motion vector difference cannot have any arbitrary value. Instead, the motion vector difference can only assume specific predefined values. If the current coding block is coded using this inter prediction mode, it is advantageous to apply solutions 1 to 10. In the document JVET-K0115 it is also mentioned that the proposed method is applied when the current block is coded using merge mode.

Solutions 2, 3, 4, 6, 7, 8, 11 and 12 are intentionally left out of this document.

Problem with HMVP Candidates.

As described in the background section, inter-prediction of a coding block is performed according to a list of HMVP candidates (In an example, the list of HMVP candidates is denoted as HmvpCandList in the document JVET-P2001-vE), since candidates in the HMVP list can be inserted in the merge list of the coding block.

The HMVP list is updated after inter-prediction of each coding block, in order to start inter-prediction of a preceeding block, the inter prediction of the preceding block must be completed, and hence the updating of the HMVP list must be completed.

Due to HMVP list updating process, inter-prediction of a coding block depends on coding of all preceding coding blocks. If HMVP is used, parallel processing of the current block and the preceding blocks is not possible.

Solution 14

For inter prediction of a block (e.g., a coding block), HMVP (History-based Motion Vector Predictor) candidates are prohibited to be used if cqtDepth of the said coding block is greater than a threshold. If cqtDepth of the said coding block is smaller than or equal to the threshold, HMVP candidates might be used (are allowed to be used) for inter prediction of the said block. cqtDepth is a parameter that decides the quad-tree partition depth of a coding block. In other words cqtDepth determines how many quad-tree splitting operations are performed (starting from the biggest coding block) to obtain the said coding block.

In other words according to solution 14, the HMVP candidates are only allowed to be used for the inter prediction of a coding block if the cqtDepth of the said coding block is smaller than a threshold; otherwise, HMVP candidates are not allowed to be used.

In one implementation, if cqtDepth of a block is greater than a threshold, entries of HmvpCandList cannot be used in the prediction of the block. Otherwise (cqtDepth is smaller than or equal to the threshold), candidates in the HmvpCandList list can be used in the inter prediction of the block.

The threshold can be signaled in bitstream or can be predefined or hardcoded. The threshold can be a number that is greater than or equal to zero. In an example, the threshold indicate a size of the MER region. A typical value of the threshold can be a number between 0 to 5.

For example if the threshold is set equal to 3, according to embodiments of the application, HMVP candidates cannot be used in the inter-prediction of a coding block if the said coding block is obtained after splitting of the biggest coding block (a coding tree block) at least 3 times.

The comparison can be formulated as "threshold value is equal to 3 and cqtDepth that is greater than or equal to 3" or similarly as "threshold value is equal to 2 and cqtDepth that is greater than 3". The two formulations are identical although the comparison operation and the threshold is different.

The size of the MER region can be calculated as a function of the threshold and the biggest coding block size. For example, the size of the MER region can be calculated as CTBsize>>qtThreshold, where CTBsize defines the size of the biggest coding block and qtThreshold is the said threshold, and the >> is the bitwise downshift operation that is defined elsewhere in this document.

In this embodiment, if the QT depth of a block is greater than a threshold, history based motion vector candidates are not used in the prediction of the said block, therefore the said block can be processed in parallel to the preceding coding blocks in coding order. On the other hand, the HMVP candidates can be used, if the QT depth is smaller or equal to the said threshold.

Figure 24:
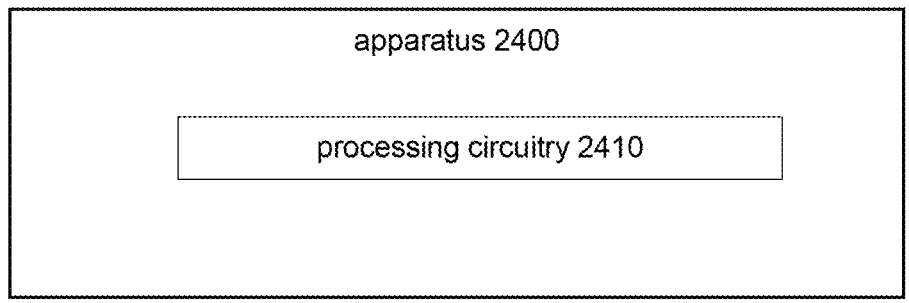
FIG. 24 shows an apparatus for inter prediction of a current block according to an embodiment.

Accordingly, it is provided an apparatus 2400 for inter prediction of a current coding block as illustrated in FIG. 24. The apparatus 2400 comprises a processing circuitry 2410 that is configured for obtaining a value of a parameter for the current coding block, wherein the value of the parameter indicates a partition depth of the current coding block and performing an inter prediction process for the current coding block. Furthermore, the processing circuitry 2410 of the apparatus 2400 is configured for not using any Motion Vector Predictor candidate comprising a motion vector of a coded block of the picture that is not spatially adjacent (i.e., not directly neighbored) to the current coding block for the current coding block in the inter prediction process or a merge mode inter prediction process comprised in the inter prediction process, when the value of the parameter for the current coding block is greater than a threshold.

Figure 25:
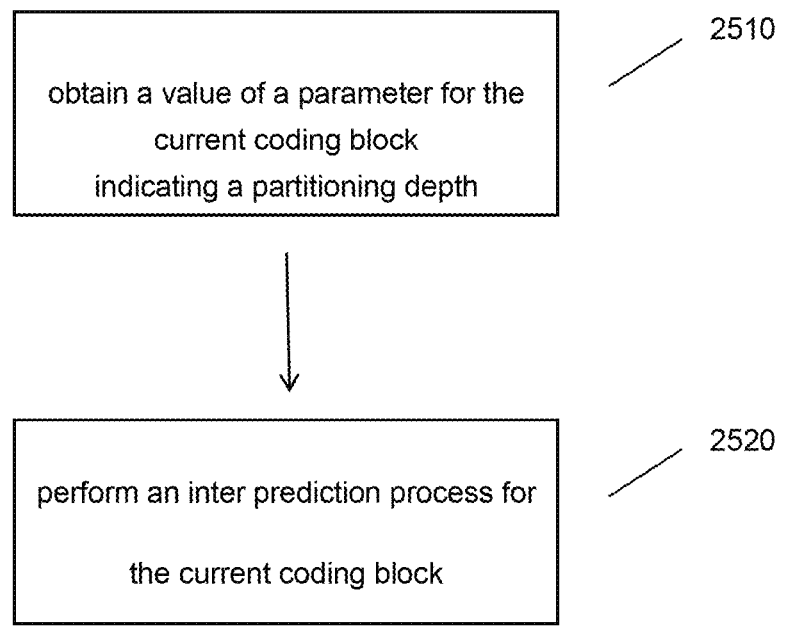
FIG. 25 illustrates a method for inter prediction of a current coding block of a picture according to an embodiment.

Similarly, it is provided a method for inter prediction of a current coding block of a picture as illustrated in FIG. 25. This method comprises the steps of obtaining 2510 a value of a parameter for the current coding block, wherein the value of the parameter indicates a partition depth of the current coding block and performing 2520 an inter prediction process for the current coding block. No Motion Vector Predictor candidate comprising a motion vector of a coded block of the picture that is not spatially adjacent to the current coding block for the current coding block is used in the inter prediction process or a merge mode inter prediction process comprised in the inter prediction process, when the value of the parameter for the current coding block is greater than a threshold.

Figure 26:
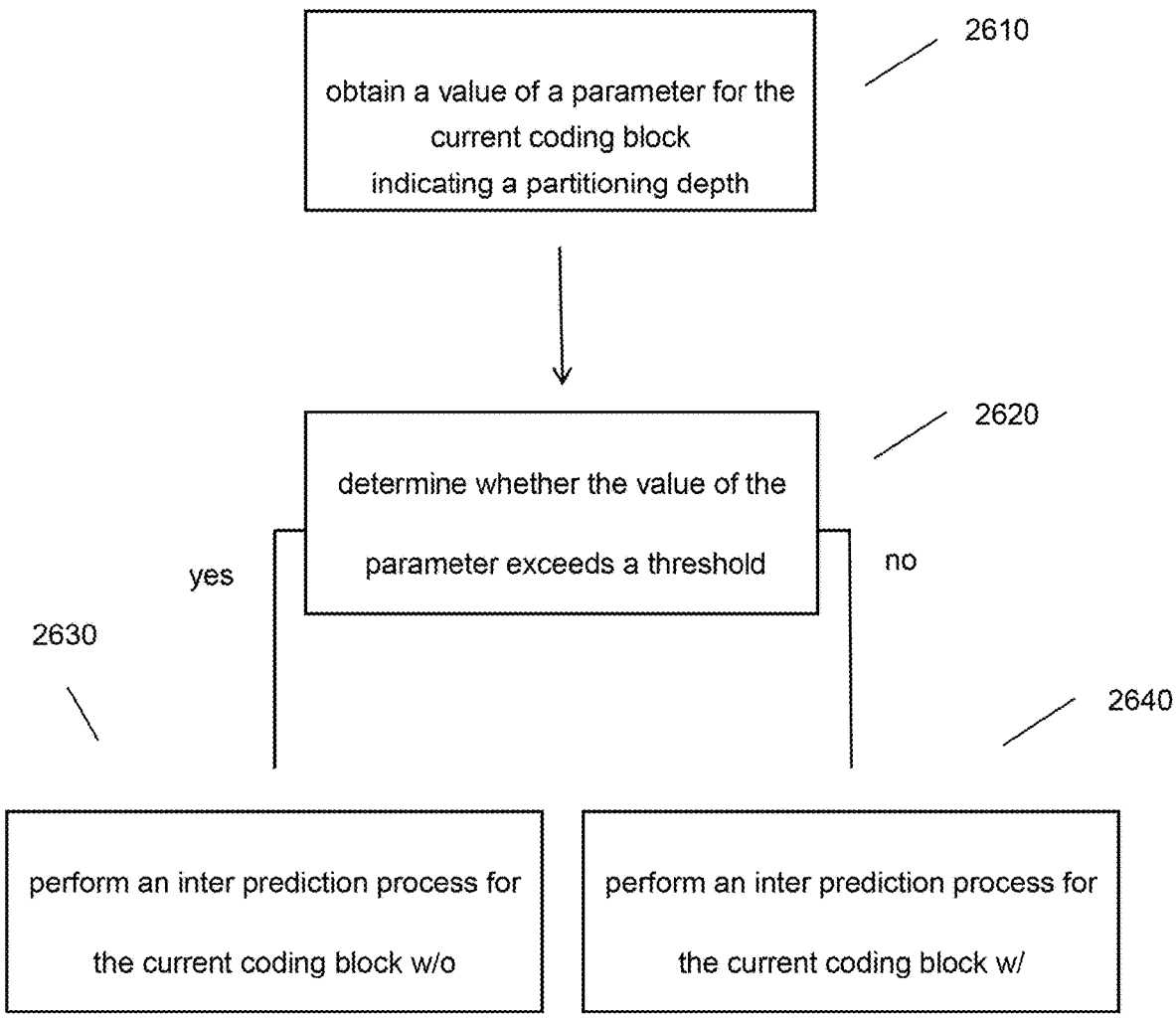
FIG. 26 illustrates a method for inter prediction of a current coding block of a picture according to another embodiment.

According to an embodiment, a method for inter prediction of a current coding block of a picture comprises the steps shown in FIG. 26. In step 2610 a value of a parameter for the current coding block is obtained, wherein the value of the parameter indicates a partition depth of the current coding block. It is determined 2620 whether the value of the parameter for the current coding block is greater than a threshold. If it is determined that the value of the parameter for the current coding block is greater than the threshold, an inter prediction process for the current coding block is performed 2630 wherein no Motion Vector Predictor candidate comprising a motion vector of a coded block of the picture that is not spatially adjacent to the current coding block for the current coding block is used in the inter prediction process or a merge mode inter prediction process comprised in the inter prediction process. If it is determined that the value of the parameter for the current coding block not greater than the threshold, an inter prediction process for the current coding block is performed 2640 wherein at least one Motion Vector Predictor candidate comprising a motion vector of a coded block of the picture that is not spatially adjacent to the current coding block for the current coding block is used.

The methods illustrated in FIG. 25 and FIG. 26 may be implemented in the apparatus 2400 shown in FIG. 24. The apparatus 2400 shown in FIG. 24 may be comprised in the source device 12 or the destination device 14 of the coding system 10 shown in FIG. 1A, the video encoder 20 or the video decoder 30 of the video coding system 40 shown in FIG. 1B, the encoder 200 shown in FIG. 2, the decoder 300 shown in FIG. 3, the coding module 470 of the network device 400 shown in FIG. 4 or the apparatus 500 shown in FIG. 5.

In some embodiments, the following conditions can be used to enable usage of HMVP candidates.
Alternative 1:
HMVP candidates can be used in inter prediction of a coding block if one of the below 2 conditions are satisfied:
(condition 1) cqtDepth of the block is smaller than pMQTTreshold,
or
(condition 2) cqtDepth is equal to pMQTTreshold and (cbWidth==PMSize) and cbHeight==PMSize);
Otherwise (both of the above conditions 1 and 2 are not satisfied), the HMVP candidates cannot be used.

Where the pMQTTreshold is a threshold, this threshold is used to compare with the QT depth of the coding block. The cbWidth and cbHeight are the width and the height of the coding block, respectively. PMSize is a size of a motion estimation region, MER. PMSize can be signaled in the bitstream or derived based on pMQTTreshold. In one example, PMsize can be derived based on maximum coding block size and pMQTTreshold, e.g., by dividing the maximum coding block size by 2 repeatedly pMQTTreshold times.

pMQTTreshold can be signaled in the bitstream, or derived according to an indicator in the bitstream. Alternatively it can be predefined or hardcoded.
Alternative 2:
HMVP candidates can be used in inter prediction of a coding block if at least one of the conditions 1 and 2 are satisfied:
(condition 1) cqtDepth of the block is smaller than pMQTTreshold,
or
(condition 2) cqtDepth is equal to or greater than pMQTTreshold, and the top-left coordinate of the coding block coincides with the top-left coordinate of a MER. Otherwise (if both condition 1 and 2 are not satisfied), the HMVP candidates cannot be used.

pMQTTreshold can be signaled in the bitstream, or derived according to an indicator in the bitstream. Alternatively it can be predefined or hardcoded.

In an embodiment, whether the top-left coordinate of the block coincides with the top-left coordinate of a MER can be performed according to following condition,
(xCb>>log 2PMSize)<<log 2PMSize is equal to xCb and (yCb>>log 2PMSize)<<log 2PMSize is equal to yCb.
If the above condition is satisfied, then the top-left coordinate of the said coding block coincides with the top-left coordinate of a MER.

Alternatively, whether the top-left coordinate of the block coincides with the top-left coordinate of a MER can be performed according to following condition,
(xCb>>(log 2PMSize−1))<<(log 2PMSize−1) is equal to xCb and (yCb>>(log 2PMSize−1))<<(log 2PMSize−1) is equal to yCb.

In the above equations, xCb and yCb are the top-left coordinates of the coding block, and log 2PMSize is the logarithm (in base 2) of the parallel merge estimation region size (PMSize).

In the alternative 2, it is checked whether a coding block is the first coding block inside a MER in coding order (by checking the above condition). If the coding block is the first coding block in a MER, HMVP candidates can be used in the inter prediction; if the coding block is not the first coding block in a MER, HMVP candidates cannot be used. A second coding block that is inside the same MER as the first coding block cannot use HMVP candidates, hence the seconding coding block can be processed in parallel to the first coding block. Therefore, according to the solution in the alternative 2, coding block inside a MER can be processed in parallel.
Solution 15
For inter prediction of a block (e.g., a coding block), HMVP (History-based Motion Vector Predictor) candidates are not used, if either width or height of the block is smaller than a threshold. If both width and height of the block is greater than or equal to a threshold, HMVP candidates might be used for the inter prediction of the block.

Alternatively, the solution 15 can be implemented as follows:
HMVP candidates can be used in the inter prediction of a coding block if one of the below 2 conditions are satisfied:
(condition 1) Width of the block is greater than or equal to PMSize, and height of the block is greater than or equal to PMSize.
Or
(condition 2) the top-left coordinate of the block coincides with the top-left coordinate of a MER.
Otherwise (if both conditions 1 and 2 are not satisfied) the HMVP candidates cannot be used.

As another alternative to solution 15, HMVP candidates can be used in the inter prediction of a coding block if the following condition is satisfied:
the top-left coordinate of the block coincides with the top-left coordinate of a MER.
Otherwise (if the condition is not satisfied), the HMVP candidates cannot be used.
In this alternative implementation of solution 15, it is not check the width and height of the coding block to determine whether HMVP candidates can be used.

In an embodiment, whether the top-left coordinate of the block coincides with the top-left coordinate of a MER can be performed according to the following condition,
(xCb>>log 2PMSize)<<log 2PMSize is equal to xCb and (yCb>>log 2PMSize)<<log 2PMSize is equal to yCb.
If the above condition is satisfied, then the top-left coordinate of the said coding block coincides with the top-left coordinate of a MER.

The PMSize can be signaled in the bitstream as an indicator or can be a predefined number. For example PMSize might be 16, correspondingly the log 2PMSize is 4 (logarithm of 16 in base 2), which would indicate that the size of the MER is 16×16 in width and height. PMSize or log 2PMSize can be signaled in the bitstream or derived based on an indicator in the bitstream.

In the embodiments of the application, if HMVP candidates cannot be used for inter prediction of a coding block, the HMVP candidates are not inserted in the motion vector predictor list of the coding block.

Alternatively in all of the above embodiments the HMVP cannot be used for merge inter-prediction of the coding block, but it can still be used for other types of inter prediction. In this case of HMVP candidates cannot be used for merge inter prediction, then the HMVP candidates are not inserted in the merge list of the coding block (but might be inserted into other motion vector predictor candidate lists). It is noted that merge mode (or skip mode) are special types of inter prediction modes. In merge or skip modes a coding block is predicted by a motion vector that is obtained from a motion vector candidate list without modifying the said motion vector candidate. In other inter prediction modes (other than merge or skip), a delta motion vector might be added to a motion vector candidate before inter prediction. This is the main difference between the merge (or skip) inter prediction mode and the other types of inter prediction modes.

In embodiments of the application, a picture of a video sequence is partitioned into a grid of rectangular regions, each of which are called MER or Merge Estimation Region. The MER is a rectangular (and preferably a square) region that has width and height equal to PMSize, in the case of square MER. In other words the picture is partitioned into equally sized regions, and each region define a group of coding units (that are inside the said region) that can be processed in parallel. For example, if a picture has a size of 200×200 samples, and the MER size is 10×10 samples, the picture is partitioned into 20×20=400 equally sized MERs, each of which define a region for parallel processing. It is advantageous for fast encoder implementation that all coding units that fall into the same MER can be processed in parallel.

In solutions 14 and 15, a picture of a video sequence may be partitioned into a grid of rectangular regions, each of which are called MER or Merge Estimation Region. The MER may be a rectangular (and preferably a square) region that has width and height equal to PMSize, in the case of square MER. In other words the picture may be partitioned into equally sized regions, and each region define a group of coding units (that are inside the said region) that can be processed in parallel. For example, if a picture has a size of 200×200 samples, and the MER size is 10×10 samples, the picture may be partitioned into 20×20=400 equally sized MERs, each of which define a region for parallel processing. It is advantageous for fast encoder implementation that all coding units that fall into the same MER can be processed in parallel.

In solutions 14 and 15, it is checked "if the top-left coordinate of a coding block coincides with the top-left coordinate of a MER". Due to the z-scan coding order of coding blocks that is employed in state of the art codecs, if the said condition is satisfied, then the coding block is the first coding block (in coding order) of a MER.

According to embodiments of the application, the target is to be able to process 2 coding blocks that are inside the same MER in parallel. It is not necessary (and is not targeted) to process to coding units in parallel if they belong to 2 different MERs.

Therefore if the condition "if the top-left coordinate of a coding block coincides with the top-left coordinate of a MER" is satisfied, the candidates in the HMVP candidate list all correspond to coding blocks that are inside a different MER than the current MER. As a result if the said condition is satisfied, it is not necessary to prohibit usage of HMVP candidates for prediction of current coding block. In the alternatives of solution 14 and 15, usage of HMVP candidates are allowed in order to increase the compression efficiency.

It is noted that Parallel merge estimation is typically applied only to merge inter prediction, and not the other inter prediction modes.

The embodiments of the application can be implemented in the document (JVET-P2001) by controlling the value of enableHMVP parameter (which controls if the usage of HMVP candidates are enabled or disabled for a coding block). For example if according to one of the embodiments above HMVP candidates are allowed to be used for a coding block, the value of enableHMVP is set equal to true, otherwise the value is set equal to false.

According to solution 15, 2 coding blocks in same MER can be inter-predicted in parallel.

The solution 14 includes an additional checking step related to the cqtDepth, therefore in solution 14, the parallel processing is only possible if cqtDepth is greater than or equal to a threshold. In certain implementations solution 14 might be beneficial since parallel processing can be controlled by the amount of quad tree splitting operations (if parallel processing is not necessary, binary tree or ternary tree can be used to split a coding block instead of quad tree). In other words, in solution 14, an encoder can control when parallel processing is activated by the amount of quad tree splits. Apart from the additional QT-depth condition, the solutions 14 and 15 are similar and can solve the problem related to the HMVP candidates.

Solution 16:

HMVP candidates list (e.g., HmvpCandList[ ]) is not updated after inter prediction of a coding block, if either width or height of the block is smaller than a threshold (e.g., PMSize). If both width and height of the block is greater than or equal to a threshold (e.g., PMSize), HMVP candidates list might be updated after the inter prediction of the block.

The inter prediction in the embodiments of this application might be merge (or skip) inter prediction, which is a special case of inter prediction.

Updating of the HMVP candidates list might include checking whether the motion vector that is used in the inter prediction of a block is already included in HMVP candidate list (e.g., checking if an identical motion vector exists in the HMVP candidate list). Depending on the output of checking, the motion vector of the block might be included in the HMVP Candidate list or not, which means that the entries in the HMVP Candidates list might change after inter prediction of the block. When the entries in the HMVP candidate list change, the motion vectors included in the candidate list might change, or the order of the candidate motion vectors in the list might change. An example about updating process of HMVP candidate list according to the document JVET-P2001-vE is exemplified in the above sections of this document.

When the HMVP candidates list is updated, the updated version is used in the inter-prediction of the coding blocks that are later than the current block in coding order.

Solution 17:

HMVP candidates list (e.g., HmvpCandList[ ]) may be updated after inter prediction of a coding block if one of the below 2 conditions are satisfied:

(condition 1) Width of the block is greater than or equal to PMSize, and height of the block is greater than or equal to PMSize.

Or (condition 2) the bottom-right coordinate of the block coincides with the bottom-right coordinate of a MER.

Otherwise (if both conditions 1 and 2 are not satisfied), the HMVP candidates list is not be updated.

In embodiments of the application, a picture of a video sequence is partitioned into a grid of rectangular regions, each of which are called Merge Estimation Region, MER. The MER is a rectangular (and preferably a square) region that has width and height equal to PMSize, in the case of square MER. In other words, the picture is partitioned into equally sized regions, and each region define a group of coding units (that are inside the said region) that can be processed in parallel. For example, if a picture has a size of 200×200 samples, and the MER size is 10×10 samples, the picture is partitioned into 20×20=400 equally sized MERs, each of which define a region for parallel processing. It is advantageous for fast encoder implementation that all coding units that fall into the same MER can be processed in parallel.

The checking of "the bottom-right coordinate of the block coincides with the bottom-right coordinate of a MER" corresponds to checking whether the bottom-right coordinate of the coding block coincides with the bottom-right coordinate of one of the MERs of a picture.

Solution 18:

HMVP candidates list (e.g., HmvpCandList[ ]) is not updated after inter prediction of a coding block if the condition below is not satisfied:

the bottom-right coordinate of the block coincides with the bottom-right coordinate of a MER.

Otherwise (if the above condition is satisfied), the HMVP candidates list might be updated.

Solution 19

HMVP candidates list (e.g., HmvpCandList[ ]) is not updated after inter prediction of a coding block, if cqtDepth of the said coding block is greater than a threshold; If cqtDepth of the said coding block is smaller than or equal to the threshold, HMVP candidates list might be updated after inter prediction of the coding block. Wherein the cqtDepth is a parameter that decides the quad-tree partition depth of a coding block. In other words, cqtDepth is used to represents how many quad-tree splitting operations are performed (starting from the biggest coding block) to obtain the said coding block.

The threshold can be signaled in bitstream or can be predefined or hardcoded. The threshold can be an integer that is greater than or equal to zero. In an example, the threshold indicate a size of the MER region. A value of the threshold can be an integer between 0 to 5 (includes 0 and 5).

For example, if the threshold is set equal to 3, according to embodiments of the application, HMVP candidates list is not updated after the inter-prediction of a coding block, if the said coding block is obtained after splitting of the biggest coding block (a coding tree block) at least 3 times. The HMVP candidates list is updated after the inter prediction of the said coding block, if the threshold is set equal to 4.

The comparison can be formulated as "threshold value is equal to 3 and cqtDepth that is greater than or equal to 3" or similarly as "threshold value is equal to 2 and cqtDepth that is greater than 3". The two formulations are identical although the comparison operation and the threshold is different.

The size of the MER region can be calculated as a function of the threshold and the biggest coding block size. For example, the size of the MER region can be calculated as CTBsize>>qtThreshold, where CTBsize defines the size of the biggest coding block and qtThreshold is the said threshold, and the >> is the bitwise downshift operation that is defined elsewhere in this document.

In this embodiment, if the QT depth of a block (block A) is greater than a threshold, history based motion vector candidates list is not updated after the prediction of block A, therefore block A can be processed in parallel with a coding block that is in the same MER and that precedes block A in coding order. In other words, since HMVP candidate list is not updated after inter prediction of block A, the inter prediction of block B (block B is a block that is predicted after block A) does not depend on the inter prediction of block A if block B and A are in the same MER.

Figure 27:
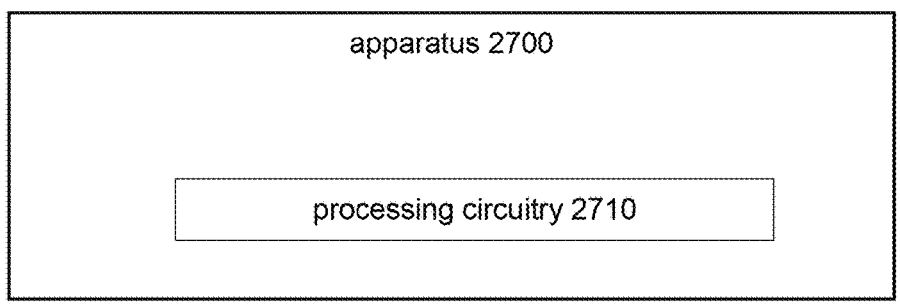
FIG. 27 shows an apparatus for inter prediction of a current block according to an embodiment.

Accordingly, it is provided an apparatus 2700 for inter prediction of a current coding block as illustrated in FIG. 27. The apparatus 2700 comprises a processing circuitry 2710 that is configured for obtaining a value of a parameter for the current coding block, wherein the value of the parameter indicates a partition depth of the current coding block and performing an inter prediction process for the current coding block. The processing circuitry is further configured for after performing the inter prediction process, not updating a Motion Vector Predictor candidates list comprising Motion Vector Predictor candidates from previously coded blocks of the picture that are not spatially adjacent to the current coding block, when the value of the parameter for the current coding block is greater than a threshold. Other Motion Vector Predictor candidates lists may be updated in this case.

Figure 28:
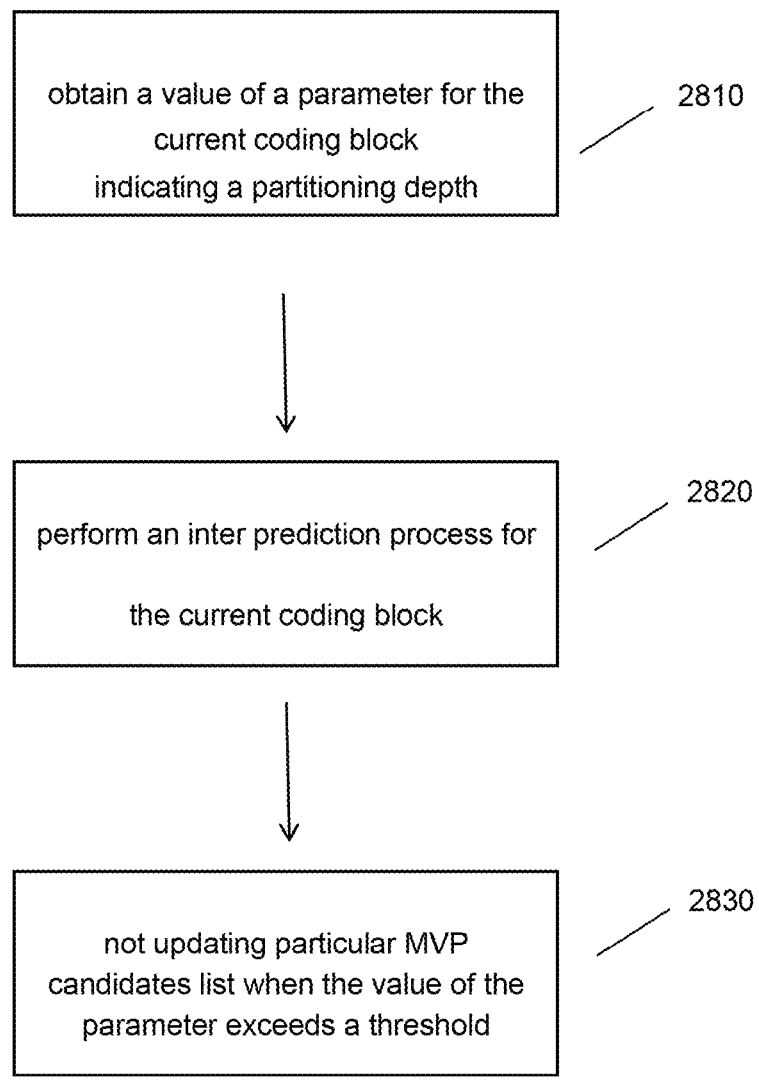
FIG. 28 illustrates a method for inter prediction of a current coding block of a picture according to another embodiment.

Similarly, it is provided a method for inter prediction of a current coding block of a picture as illustrated in FIG. 28. This method comprises the steps of obtaining 2810 a value of a parameter for the current coding block, wherein the value of the parameter indicates a partition depth of the current coding block and performing an inter prediction process for the current coding block 2820. After performing the inter prediction process, a Motion Vector Predictor candidates list comprising Motion Vector Predictor candidates from previously coded blocks of the picture that are not spatially adjacent to the current coding block is not updated 2830, when the value of the parameter for the current coding block is greater than a threshold. Other Motion Vector Predictor candidates lists may be updated in this case.

The method illustrated in FIG. 28 may be implemented in the apparatus 2700 shown in FIG. 27. The apparatus 2700 shown in FIG. 27 may be comprised in the source device 12 or the destination device 14 of the coding system 10 shown in FIG. 1A, the video encoder 20 or the video decoder 30 of the video coding system 40 shown in FIG. 1B, the encoder 200 shown in FIG. 2, the decoder 300 shown in FIG. 3, the coding module 470 of the network device 400 shown in FIG. 4 or the apparatus 500 shown in FIG. 5.

Solution 20

HMVP candidates list (e.g., HmvpCandList[ ]) may be updated after inter prediction of a coding block if one of the below 2 conditions is satisfied:

(condition 1) cqtDepth of the block is smaller than pMQTTreshold, or (condition 2) cqtDepth is equal to pMQTTreshold and (cbWidth==PMSize) and cbHeight==PMSize);

Otherwise (both of the above conditions 1 and 2 are not satisfied), the HMVP candidates list is not updated after the inter prediction of the block.

Solution 21

HMVP candidates list can be updated after the inter prediction of a coding block, if at least one of the conditions 1 and 2 is satisfied:

(condition 1) cqtDepth of the block is smaller than pMQTTreshold, or (condition 2) cqtDepth is equal to or greater than pMQTTreshold, and the bottom-right coordinate of the coding block coincides with the bottom-right coordinate of a MER.

Otherwise (if both condition 1 and 2 are not satisfied), the HMVP candidates list is not updated after the inter prediction of the coding block.

According to embodiments of the application, 2 coding blocks that are inside the same MER may be processed in parallel. It is not necessary to process to coding units in parallel if they belong to 2 different MERs.

Therefore if the condition "if the bottom-right coordinate of a first coding block coincides with the bottom-right coordinate of a MER" is satisfied, a second coding block that precedes the first one will be inside a different MER due to the coding order (z-scan coding order). In other words, the second coding block must lie to the right and bottom of the first coding block and must be in another MER. Therefore since first and the second blocks are in two different MERs, it is not necessary to process them in parallel (as a result it is allowed to update the HMVP candidate list after prediction of first coding block). On the other hand, if the condition is not satisfied (if the bottom-right coordinate of a first coding block does not coincide with the bottom-right coordinate of a MER), there might be a second coding block in the same MER as the first coding block, and it is desirable to process the two blocks in parallel. Therefore, in this case HMVP candidate list is prohibited to be updated after inter prediction of first coding block, therefore prediction of the second coding block (which might use the candidates in the HMVP list) does not depend on the prediction of first coding block.

pMQTTreshold is a threshold, this threshold is used to compare with the QT depth of the coding block. The cbWidth and cbHeight are the width and the height of the coding block, respectively. PMSize is a size of a motion estimation region, MER. PMSize can be signaled in the bitstream or derived based on pMQTTreshold. In one example, PMsize can be derived based on maximum coding block size and pMQTTreshold, e.g., by dividing the maximum coding block size by 2 repeatedly pMQTTreshold times.

pMQTTreshold can be signaled in the bitstream, or derived according to an indicator in the bitstream. Alternatively it can be predefined or hardcoded.

Checking whether the bottom-right coordinate of the block coincides with the bottom-right coordinate of a MER can be performed according to the following condition, ((xCb+width)>>log 2PMSize)<<log 2PMSize is equal to (xCb+width) and ((yCb+height)>>log 2PMSize)<<log 2PMSize is equal to (yCb+height).

If the above condition is satisfied, then the bottom-right coordinate of the said coding block coincides with the bottom-right coordinate of a MER.

It is noted that the above condition is just an example, and other ways can be implemented to check if the bottom-right coordinate of the said coding block coincides with the bottom-right coordinate of a MER.

Alternatively, checking whether the bottom-right coordinate of the block coincides with the bottom-right coordinate of a MER can be performed according to the following condition (xCb+width) & ((1<<log 2PMSize)−1) is equal to 0 and (yCb+height) & ((1<<log 2PMSize)−1) is equal to 0.

Alternatively, checking whether the top-left coordinate of the block coincides with the top-left coordinate of a MER can be performed according to the following condition xCb & ((1<<log 2PMSize)−1) is equal to 0 and yCb & ((1<<log 2PMSize)−1) is equal to 0.

In the above equations the "&" operator is a bit-wise AND operation, "<<" is a bit-wise left-shift operand, ">>" is the bit-wise downshift operand and log 2PMSize is the logarithm (in base 2) of the size of the parallel merge estimation region.

The PMSize can be signaled in the bitstream as an indicator or can be a predefined number. For example PMSize might be 16, correspondingly the log 2PMSize is 4 (logarithm of 16 in base 2), which would indicate that the size of the MER is 16×16 in width and height. PMSize or log 2PMSize can be signaled in the bitstream or derived based on an indicator in the bitstream.

In the embodiments, if HMVP candidates list (e.g., HmvpCandList[ ]) is not updated after inter prediction of a coding block, the motion vector that is used for the inter-prediction of the said coding block cannot be inserted into HMVP candidates list.

Alternatively, in all of the above embodiments, the HMVP candidates list is not updated after merge inter-prediction of the coding block, but it can still be updated after other types of inter prediction. Since the target of parallelism is for merge inter prediction (hence the name Merge Estimation Region), if merge mode (or skip mode) is not used for the inter-prediction of a coding block, the HMVP candidates list can be updated as usual, (without any additional conditions as described in this document). In the embodiments of the application, the parallel merge estimation (that is characterized by a MER size which is not equal to 0) can be switched off completely by an indicator in the bitstream. If the said indicator indicates that parallel merge estimation is switched off, the conditions described in the embodiments are not checked. In this case, HMVP candidate list might be updated after inter prediction of every block, or HMVP candidates can be used for inter-prediction of all of the blocks, irrespective of the size or coordinates of the block.

According to an embodiment, an encoder is provided for encoding a current coding block within a coding tree unit, CTU, comprising a candidate list generator for generating a list of prediction candidates, including the apparatus for marking availability of a candidate coding block for merge estimation of the current coding block within the CTU according to any of the previous embodiments; a prediction unit for determining prediction of the current coding block according to at least one prediction candidate out of the generated list; and a compression unit for encoding the current coding block by using the prediction of the current coding block.

According to an embodiment, a decoder is provided for decoding a current coding block within a coding tree unit, CTU, comprising a candidate list generator for generating a list of prediction candidates, including the apparatus for marking availability of a candidate coding block for merge estimation of the current coding block within the CTU according to any of the previous embodiments; a prediction unit for determining prediction of the current coding block according to at least one prediction candidate out of the generated list; and a decompression unit for decoding the current coding block by using the prediction of the current coding block.

According to the encoder and/or decoder according to any of the previous embodiments, the list of prediction candidates is a list of motion vectors, MVs.

According to an embodiment, a method is provided for marking availability of a candidate coding block for merge estimation of a current coding block within a coding tree unit, CTU, comprising the steps of: marking the candidate coding block as available marking the candidate coding block as unavailable when a predefined location of the candidate coding block is included within an extended merge estimation region, MER, wherein the extended MER includes a current MER in which the current coding block is located and at least a portion of another MER, adjacent to the current MER.

According to an embodiment, a method is provided for marking availability of a candidate coding block for merge estimation of a current coding block within a coding tree unit, CTU, comprising the steps of: marking the candidate coding block as available labelling coding blocks of a CTU, including the current coding block and the candidate coding block, based on a processing order; forming a group of coding blocks by applying a slid window with a length of K; determining if the candidate coding block and the current coding block belong to the same one group of coding blocks; and marking the candidate coding block as unavailable if the candidate coding block and the current coding block belong to the same one group of coding blocks.

According to an embodiment, a computer-readable non-transitory medium is provided for storing a program, including instructions which when executed on a processor cause the processor to perform the method according to any of the above embodiments.

Figure 15:
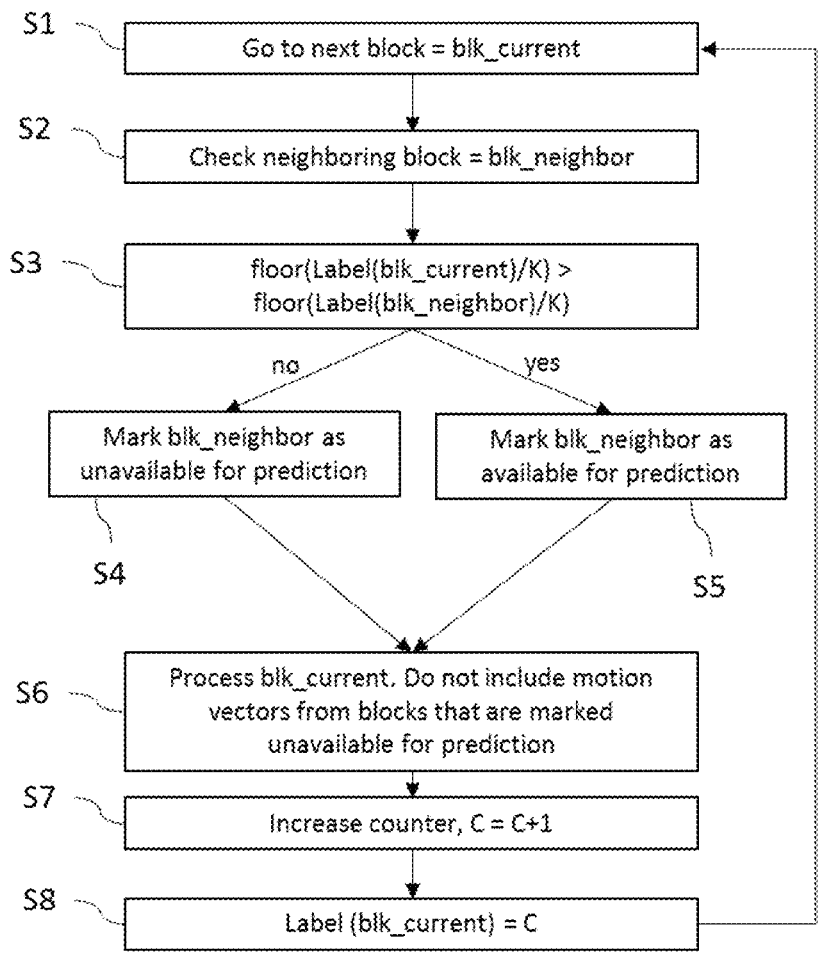
FIG. 15 is a working flow showing availability checking for a potential merge estimation coding block according to the present disclosure.
Figure 16:
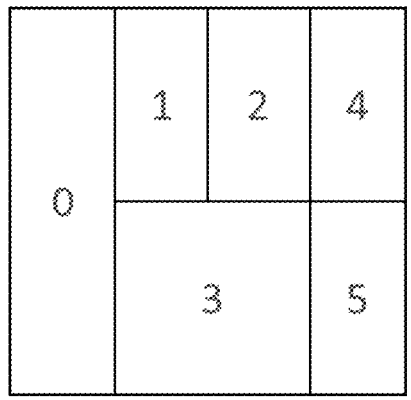
FIG. 16 illustrates a diagram of an example of labeled block partitions where the availability checking
Figure 17:
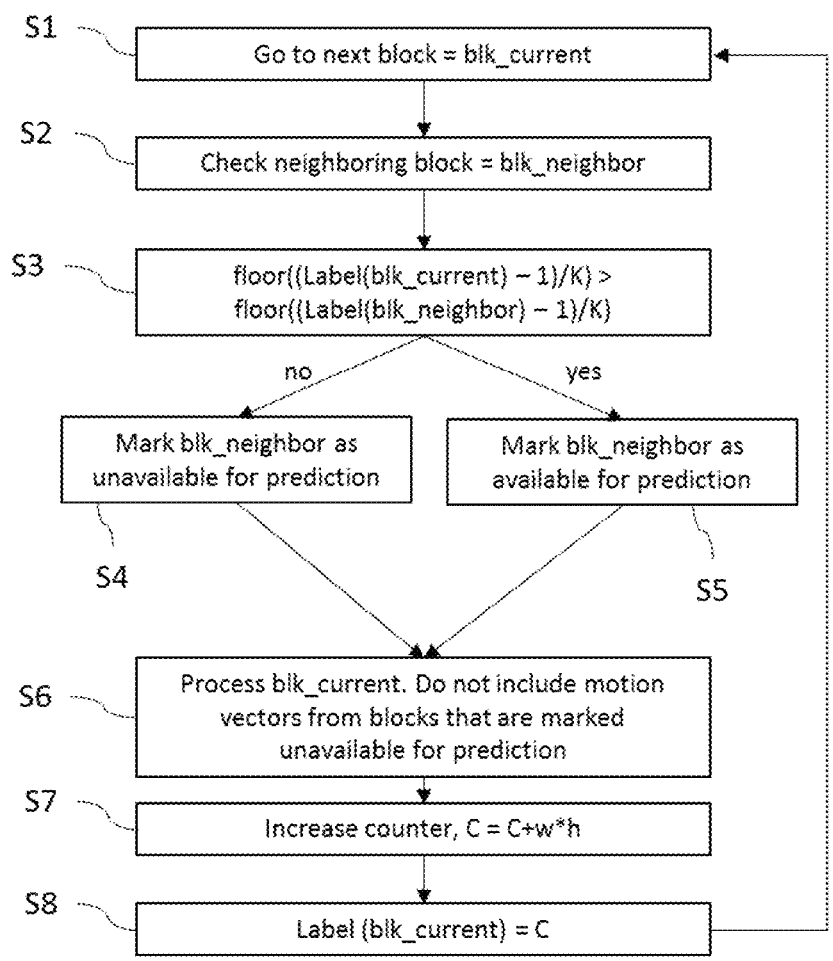
FIG. 17 is a working flow showing availability checking for a potential merge estimation coding block according to the present disclosure.
Figure 20A:
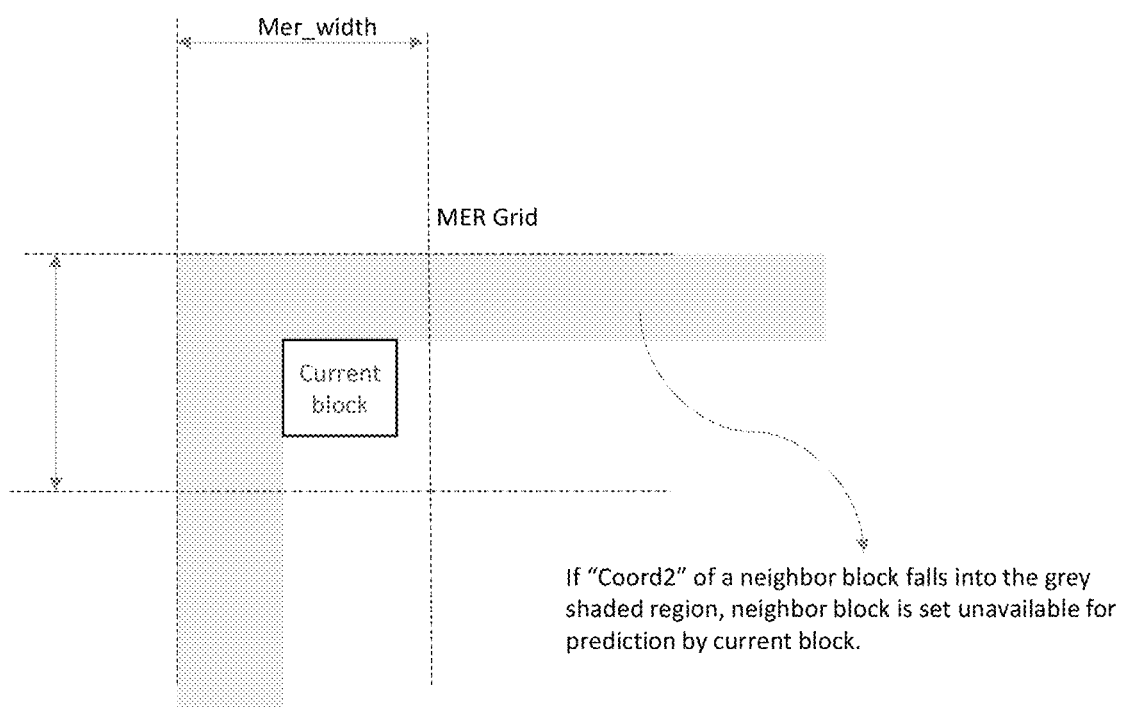
FIG. 20A illustrates an example of where a neighbor block falls into around the current block will be marked unavailable.
Figure 20B:
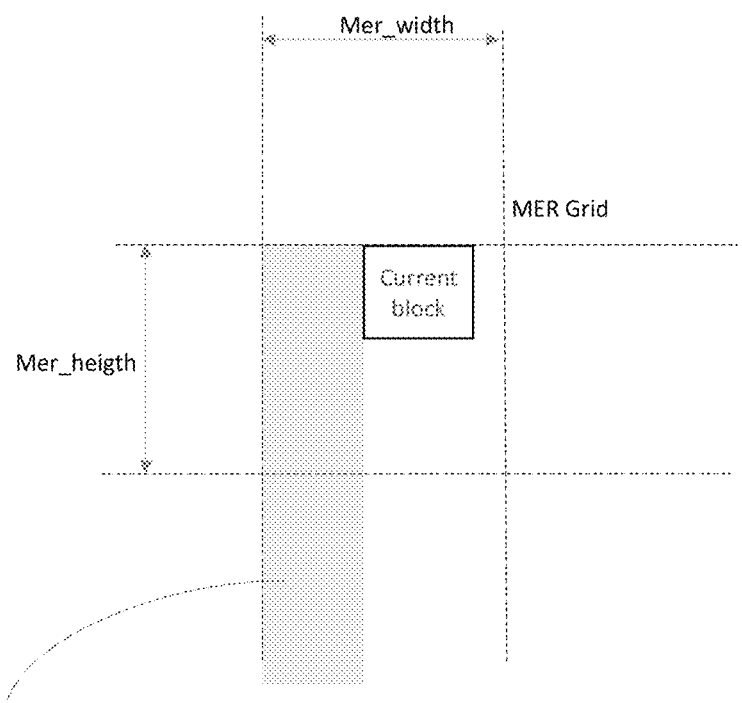
FIG. 20B illustrates another example of where a neighbor block falls into around the current block will be marked unavailable.
Figure 21:
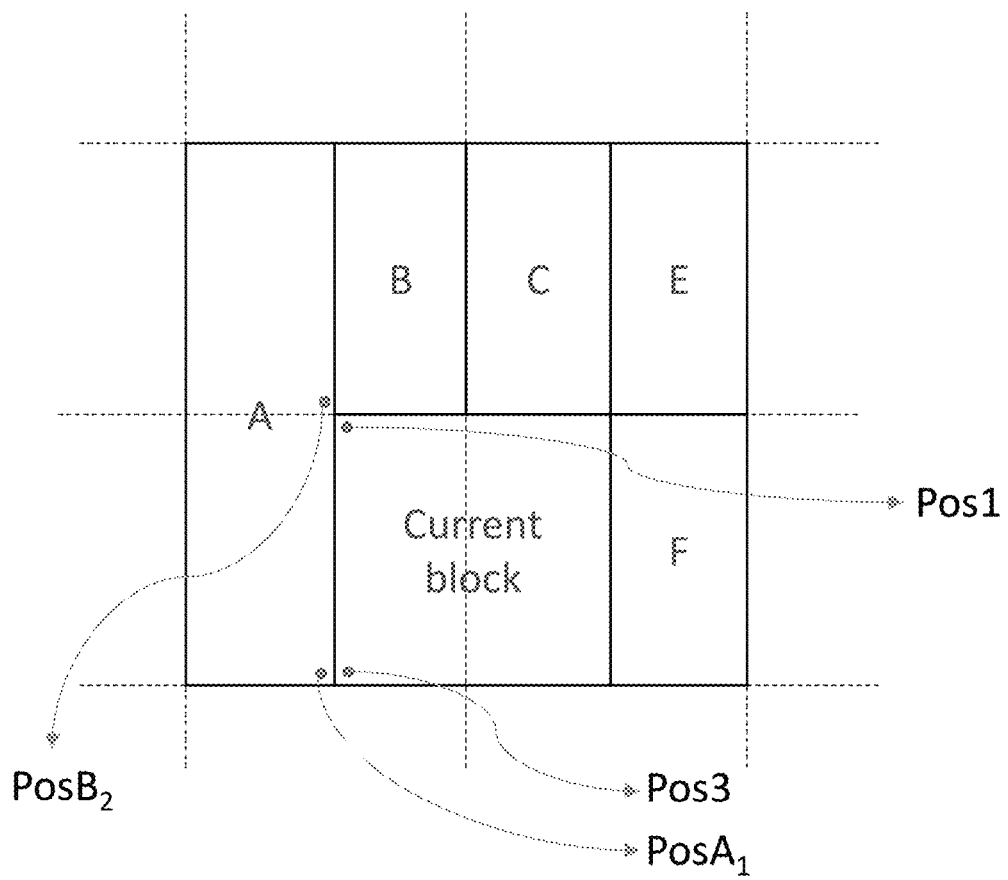
FIG. 21 illustrates an example of doing merge estimation to remove the parallel processing restriction.
Figure 23:
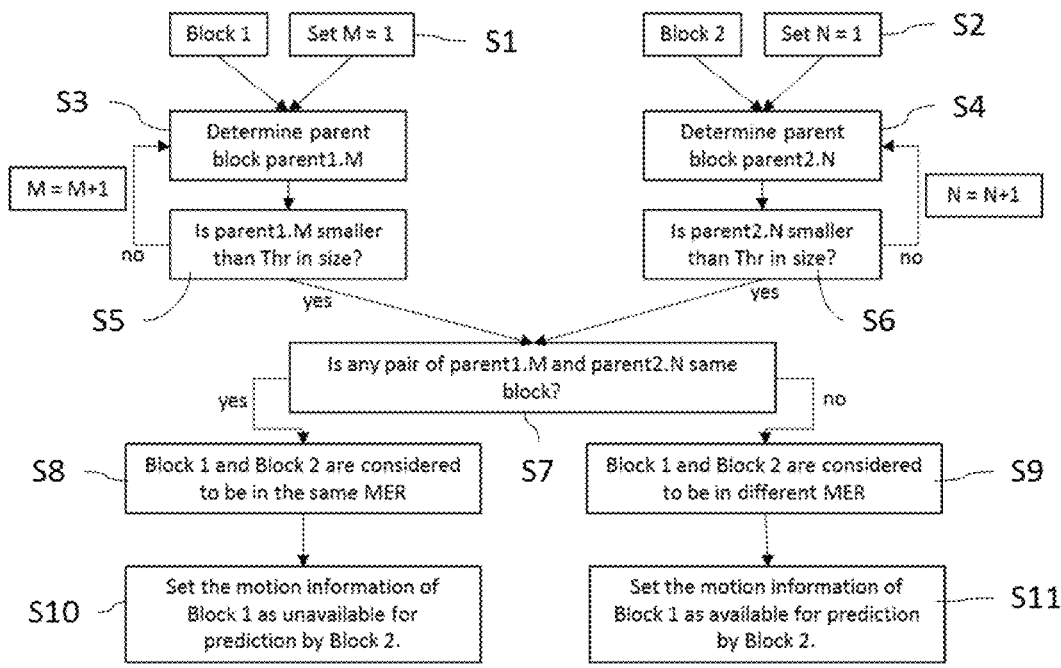
FIG. 23 illustrates an example of the flowchart of the solution 12.

In FIG. 15 a flow chart illustrating a process of checking for a potential merge estimation coding block is illustrated wherein MVs from blocks that are marked unavailable are not included in the merge estimation/prediction process. In FIG. 16 an example of labeled block partitions is shown. In FIG. 17 a flow chart illustrating a process of checking for a potential merge estimation coding block is illustrated that is modified as compared to the process illustrated in FIG. 15. In FIG. 20A and FIG. 20B examples of setting a neighbor block of a current block unavailable for prediction of the current block. In FIG. 21 merge estimation to remove parallel processing restriction is illustrated. In FIG. 23 a process of checking for a potential merge estimation coding block according to another example is illustrated.

According to an aspect of the present disclosure, an apparatus is provided for marking availability of a candidate coding block for merge estimation of a current coding block within a coding tree unit, CTU, wherein the apparatus comprises: a processing circuitry configured to: mark the candidate coding block as available; mark the candidate coding block as unavailable when a predefined location of the candidate coding block is included within an extended merge estimation region, MER, wherein the extended MER includes a current MER in which the current coding block is located and at least a portion of another MER, adjacent to the current MER.

This may provide an advantage of performing merge estimation for a candidate block even if a CTU is partitioned into irregular patterns (non-square coding blocks) as result of using BT and/or TT, so that a candidate block may be processed in parallel when marked as unavailable. Further, the use of an extended MER may provide an advantage that a candidate block in the extended MER may cover the current MER of the current block partially. This makes the merge estimation more flexible, in particular when QT is mixed with BT and/or TT partitioning.

In one exemplary implementation, the candidate coding block may be marked initially as available. This means that prior to the merge estimation, all candidate coding blocks are available for prediction of the current coding block (default setting/initialization). In other words, prior to a construction of a merge candidate list of the current coding block, the candidate block is marked as available.

In another exemplary implementation, the marking the candidate block as available relates to a conditional marking. This means that a condition for marking a candidate block as unavailable (MER condition(s)) is not satisfied, the candidate block is marked as available.

The above two exemplary implementations are alternatives for the order in which the marking of a candidate block as available or unavailable is performed. The first exemplary embodiment is an option to mark a candidate block as available by default before the subsequent check of the MER condition(s). The second exemplary embodiment is an option for making the available-unavailable marking of a candidate block in dependence of whether or not one or more MER condition(s) are satisfied.

In a third exemplary implementation, a candidate block may be marked initially as available or unavailable. In this case, an initially available-marked candidate block may be marked unavailable if the MER conditions(s) are satisfied. In turn, an initially unavailable-marked candidate block may be marked as available if the MER condition(s) are not satisfied.

According to an aspect of the present disclosure, the marking of the candidate coding block includes: obtain coordinates (X,Y) of a left-top pixel of the current coding block; obtain, as the predefined location, coordinates (X2, Y2) of a specific point in the candidate coding block; determine if the specific point is located within the extended MER by comparing the coordinates of the specific point and the coordinates of the left-top pixel, and mark the candidate coding block as unavailable, if the specific point is located within the extended MER.

The coordinates of the specific point and/or a corner of the candidate block and/or the current block may be along a horizontal axis (x direction/axis), going from left (negative x) to right (positive x) and a vertical axis (y direction/axis, gravity axis), going from up (negative y) to down (positive y). The coordinates x, y may be in units of pixels. A pixel refers also to a sample. This means that a value of x=10 and/or y=−5 corresponds to 10 pixels/samples along the positive x axis (right) and 5 pixels/samples along the negative y axis (upward).

According to an aspect of the present disclosure, the specific point is a top-left pixel of the candidate coding block, and the determining if the specific point is located within the extended MER includes: mark the candidate coding block as unavailable if any of the conditions is satisfied: if [X−1,Y] and [X,Y] are in the current MER, and if X2<X and Y2>=Y; or if [X,Y−1] and [X,Y] are in the current MER, and if Y2<Y and X2>=X; or if [X−1,Y−1] and [X,Y] are in the current MER, and if Y2<Y and X2<X.

According to an aspect of the present disclosure, the specific point is a bottom-right pixel of the candidate coding block, and the determining if the specific point is located within the extended MER includes: mark the candidate coding block as unavailable if any of the conditions is satisfied: if [X−1,Y] and [X,Y] are in the current MER, and if X2<X and Y2>=Y; or if [X,Y−1] and [X,Y] are in the current MER, and if Y2<Y and X2>=X; or if [X−1,Y−1] and [X,Y] are in the current MER, and if Y2<Y and X2<X.

This may provide an advantage of performing the merge estimation more accurately, since the MER condition(s) check not only the positional relation between the specific point and the current block corner, but also between the current block corner (X,Y) and its by one pixel/sample shifted position. Moreover, the use of the top-left or the bottom-right pixel as specific point may provide an advantage of making the merge estimation more flexible.

The same or similar advantages may be provided by any of the following aspects of the present application.

According to an aspect of the present disclosure, the marking of the candidate coding block includes: obtain coordinates (x, y) of a corner of the current coding block; obtain, as the predefined location, coordinates of a specific point (x+a, y+b), wherein a∈(−1,0,1) and b∈(−1,0,1), and a and b are selected in dependence on the relationship of the relative position between the specific point and the corner, select, for the one candidate coding block, one value from (−1,0,1) as the a, and one value from the (−1,0,1) as the b; and mark the candidate coding block as unavailable, if floor((x+a)/mer_width) is equal to floor(x/mer_width), or if floor((y+b)/mer_width) is equal to floor(y/mer_height), wherein mer_width is a width and mer_height is a height of the current MER.

The floor function takes as input a real number X and gives as output the greatest integer less than or equal to X.

According to an aspect of the present disclosure, the candidate coding block neighbors the corner of the current coding block, and the corner of the current coding block is a bottom-left corner, and the candidate coding block is located on where there is left to the current coding block, a=−1, b=0; or the corner of the current coding block is a bottom-left corner, and the candidate coding block is located on where there is bottom-left to the current coding block, a=−1, b=1; or the corner of the current coding block is an upper left-corner, and the candidate coding block is located on where there is upper-left to the current coding block, a=−1, b=−1; or the corner of the current coding block is an upper-right corner, and the candidate coding block is located on where there is upper-right to the current coding block, a=1, b=−1; or the corner of the current coding block is an upper-right corner, and the candidate coding block located on where there is upper to the current coding block, a=0, b=−1.

According to an aspect of the present disclosure, the marking of the candidate coding block includes: obtain coordinates (x, y) of a corner of the current coding block; obtain, as the predefined location, coordinates (x+a, y+b) of a specific point, wherein the potential candidate coding block neighbors a corner of the current coding block and a∈(−1,0,1), b∈(−1,0,1), wherein a and b are not both equal to 0 or 1 and are selected in dependence on the relationship of the relative position between the specific point and the corner, select for the one candidate coding block, one value from (−1,0,1) as the a, and one value from the (−1,0,1) as the b; and mark the candidate coding block as unavailable if floor((x+a)/mer_width) is equal to floor(x/mer_width), and floor((y+b)/mer_height)>=floor(y/mer_height), or if floor ((y+b)/mer_height) is equal to floor(y/mer_height) and floor ((x+a)/mer_width)>=floor(x/mer_width), wherein mer_height is a height and mer_width is a width of the current MER.

This may provide an advantage of improving the accuracy of the merge estimation by selecting the values of a and/or b in dependence on the positional relation between the candidate block neighboring the current block. Moreover, the MER conditions in relation to the one or two axial directions may provide an advantage of making the merge estimation more flexible. This means that the merge estimation may be tuned, for example, whether or not a CTU is divided horizontally or vertically in a homogeneous or non-homogeneous manner, as relevant for BT and/or TT partitions.

According to an aspect of the present disclosure, the marking of the candidate coding block includes: obtain coordinates (x, y) of a corner of the current coding block; obtain, as the predefined location, coordinates of a specific point (x1, y1), wherein the specific point is a bottom-right corner or a top-left corner of the candidate coding block; and mark the candidate coding block as unavailable, if floor(x1/mer_width) is equal to floor(x/mer_width); or if floor(y1/mer_height) is equal to floor(y/mer_height), wherein mer_height is a height and mer_width is a width of the current MER.

According to an aspect of the present disclosure, the marking of the candidate coding block includes: obtain coordinates (x, y) of a corner of the current coding block; obtain, as the predefined location, coordinates of a specific point (x1, y1), wherein the specific point is a bottom-right corner or a top-left corner of the candidate coding block; and mark the candidate coding block as unavailable, if floor(x1/mer_width) is equal to floor(x/mer_width) and floor(y1/mer_height)>=floor(y/mer_height); or if floor (y1/mer_height) is equal to floor(y/mer_height) and floor (x1/mer_width)>=floor(x/mer_width), wherein mer_height is a height and mer_width is a width of the current MER.

According to an aspect of the present disclosure, the marking of the candidate coding block includes: obtain coordinates (X, Y) of a corner of the current coding block; obtain, as a predefined location, coordinates of a specific point (X2, Y2), wherein the specific point is a bottom-right corner of the candidate coding block; and mark the candidate coding block as unavailable, if any of the following condition is satisfied: if floor(X2/mer_width) is equal to floor(X/mer_width) and floor(Y2/mer_height)>=floor(Y/mer_height), and/or if floor(Y2/mer_height) is equal to floor(Y/mer_height) and floor(X2/mer_width)>=floor(X/mer_width); wherein mer_height is a height and mer_width is a width of the current MER.

According to an aspect of the present disclosure, the marking of the candidate coding block includes: obtain coordinates (X, Y) of a corner of the current coding block; obtain, a the predefined location, coordinates (X2, Y2) of a specific point, wherein the specific point is a bottom-right corner of the candidate coding block; and mark the candidate coding block as unavailable if any of the following condition is satisfied: if X2/mer_width is equal to X/mer_width and Y2/mer_height>=Y/mer_height; and/or if Y2/mer_height is equal to Y/mer_height and X2/mer_width>=X/mer_width, wherein mer_height is a height and mer_width is a width of the current MER.

According to an aspect of the present disclosure, the marking of the candidate coding block includes: obtain coordinates (X, Y) of a corner of the current coding block; obtain, as the predefined location, coordinates (X2, Y2) of a specific point, wherein the specific point is a bottom-right corner of the candidate coding block; and mark the candidate coding block as unavailable if any of the following condition is satisfied: if X2>>log 2_mer_width is equal to X>>log 2_mer_width and Y2>>log 2_mer_height>=Y>>log 2_mer_height; and/or if Y2>>log 2_mer_height is equal to Y>>log 2_mer_height and X2>>log 2_mer_width>=X>>log 2_mer_width; wherein log 2_mer_height and log 2_mer_width are the binary logarithm of a height and a width of the current MER.

The operator >> specifies the arithmetic right-shift operation. The various forms of MER conditions of the above different aspects of the present disclosure may provide an advantage of adapting and optimizing the merge estimation to the used partitioning pattern, using QT, TT, and/or BT in particular when there are used in a mixed manner.

According to an aspect of the present disclosure, an apparatus is provided for marking availability of a candidate coding block for merge estimation of a current coding block within a coding tree unit, CTU, wherein the apparatus comprises: a processing circuitry configured to: mark the candidate coding block as available; label coding blocks of a CTU, including the current coding block and the candidate coding block, based on a processing order; form a group of coding blocks by applying a sliding window with a length of K; determine if the candidate coding block and the current coding block belong to the same one group of coding blocks; and mark the candidate coding block as unavailable if the candidate coding block and the current coding block belong to the same one group of coding blocks.

The marking of a candidate block as available refers to marking the block initially as available. This means that all candidate blocks may be by default marked as available for prediction of the current coding block at the beginning of the merge estimation.

According to an aspect of the present disclosure, the labelling includes label the coding blocks incrementally using an integer number equal to or larger than zero, and K relates to the processing order.

For example, assuming a processing order of A→B→C→D→E→F, the six coding blocks may be labelled in increments of 1 as {0, 1, 2, 3, 4, 5} with increasing integer number. For a sliding window of length K=3, for example, the six coding blocks may be divided into two groups based on the integer labels and K, with the first group including coding blocks {0, 1, 2} and the second group including blocks {3, 4, 5}.

This may provide an advantage of performing the merge estimation for a candidate block in a fast manner by use of the processing order of the coding blocks. Hence, this is an alternative way of performing merge estimation for coding blocks in parallel in VVC, when a CTU is irregularly partitioned due to the use of BT and/or TT.

In this case, the MER region is based on a group comprising one or more coding blocks, which as a group form a MER region formed based on a processing order labeling.

According to an aspect of the present disclosure, the labelling includes label the coding blocks incrementally using the spanning area of the coding blocks, wherein the spanning area is counted based on the number of samples the coding blocks contain, and K relates to an area.

Figure 18:
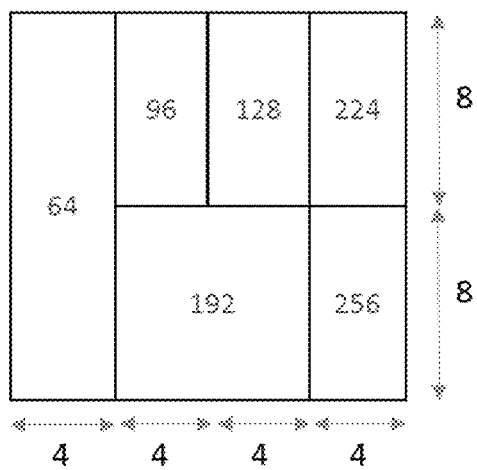
FIG. 18 illustrates a diagram of an example of labeled block partitions where the availability checking

With reference to the above example, this means that the length of the sliding window K is now related to an area, for example, K=128 corresponding to the number of pixels/samples of an area. Using as an example the (pixel/sample) area as the labels of each of the coding blocks shown in FIG. 18 for the coding blocks in conjunction With the processing order of A→B→C→D→E→F, the coding blocks with labels 64, 96, and 128 form the first group, and the blocks with labels 192, 224, and 256 form the second group.

In this case, the MER region is based on a group comprising one or more coding blocks, which as a group form a MER region formed based on (pixel) area labeling. This may provide an advantage that the MER regions are more balanced with regard to the covered areas. This means that by using the sliding window of length K with reference to a pixel area parallel processed regions are created which contain about the same number of samples. However, the number of samples in the regions may not be always exactly the same. Thus, the use of an "area" K may provide an advantage of a simpler and therefore, cheaper hardware implementation.

According to an aspect of the present disclosure, the processing circuitry is further configured to: derive motion vector candidates, MVCs, from the candidate coding block marked as available; and code the current coding block by referring to the MVCs.

According to an aspect of the present disclosure, an encoder is provided or encoding a current coding block within a coding tree unit, CTU, comprising a candidate list generator for generating a list of prediction candidates, including the apparatus for marking availability of a candidate coding block for merge estimation of the current coding block within the CTU according to any of the above aspects of the present disclosure; a prediction unit for determining prediction of the current coding block according to at least one prediction candidate out of the generated list; and a compression unit for encoding the current coding block by using the prediction of the current coding block.

According to an aspect of the present disclosure, a decoder is provided for decoding a current coding block within a coding tree unit, CTU, comprising a candidate list generator for generating a list of prediction candidates, including the apparatus for marking availability of a candidate coding block for merge estimation of the current coding block within the CTU according to any of the above aspects of the present disclosure; a prediction unit for determining prediction of the current coding block according to at least one prediction candidate out of the generated list; and a decompression unit for decoding the current coding block by using the prediction of the current coding block.

According to an aspect of the present disclosure, the encoder and/or decoder according to any of the above aspects of the present disclosure, the list of prediction candidates is a list of motion vectors, MVs.

The list may be a list of intra-prediction modes (directional with a certain direction, planar, and/or DC).

According to an aspect of the present disclosure, a method is provided or marking availability of a candidate coding block for merge estimation of a current coding block within a coding tree unit, CTU, comprising the steps of: marking the candidate coding block as available; marking the candidate coding block as unavailable when a predefined location of the candidate coding block is included within an extended merge estimation region, MER, wherein the extended MER includes a current MER in which the current coding block is located and at least a portion of another MER, adjacent to the current MER.

According to an aspect of the present disclosure, a method is provided or marking availability of a candidate coding block for merge estimation of a current coding block within a coding tree unit, CTU, comprising the steps of: marking the candidate coding block as available; labelling coding blocks of a CTU, including the current coding block and the candidate coding block, based on a processing order; forming a group of coding blocks by applying a slid window with a length of K; determining if the candidate coding block and the current coding block belong to the same one group of coding blocks; and marking the candidate coding block as unavailable if the candidate coding block and the current coding block belong to the same one group of coding blocks.

According to an aspect of the present disclosure, a computer-readable non-transitory medium is provided for storing a program, including instructions which when executed on a processor cause the processor to perform the method according to any of the previous methods.

In particular, the following embodiments are provided

1. An apparatus for merge estimation of a current coding block, wherein the apparatus comprises:
   a processing circuitry configured to:
   obtaining a value of a parameter (cqtDepth) for the current coding block, wherein the value of the parameter (cqtDepth) is used to decide a partition (e.g., a quad-tree partition) depth of the current coding block;
   performing inter prediction process for the current coding block;
   characterized in that, at least one History-based Motion Vector Predictor candidate for the current coding block is not used in the inter prediction process, when the value of the parameter (cqtDepth) for the current coding block is greater than a threshold.

2. The apparatus according to embodiment 1, wherein the at least one History-based Motion Vector Predictor candidate for the current coding block is used in the inter prediction process, when the value of the parameter (cqtDepth) for the current coding block is smaller than or equal to the threshold.

3. The apparatus according to embodiment 1 or 2, wherein the threshold is an integer, a value range for the threshold is from 0 to 5, includes 0 and 5.

4. An apparatus for merge estimation of a current coding block, wherein the apparatus comprises:
   a processing circuitry configured to:
   obtaining a value of a parameter (cqtDepth) for the current coding block, wherein the value of the parameter (cqtDepth) is used to decide a partition (e.g., a quad-tree partition) depth of the current coding block;
   performing inter prediction process for the current coding block;
   characterized in that, at least one History-based Motion Vector Predictor candidate for the current coding block is used in the inter prediction process, when the value of the parameter (cqtDepth) for the current coding block is smaller than a threshold (pMQTTreshold);
   or
   at least one History-based Motion Vector Predictor candidate for the current coding block is used in the inter prediction process, when the value of the parameter (cqtDepth) for the current coding block is equal to a first threshold (pMQTTreshold), and when a width of the current coding block equal to a second threshold (PMsize), and when a height of the current coding block equal to the second threshold (PMsize).

5. The apparatus according to embodiment 4, wherein the at least one History-based Motion Vector Predictor candidate for the current coding block is not used in the inter prediction process, when the value of the parameter (cqtDepth) for the current coding block is greater than a threshold (pMQTTreshold);
   Or wherein the at least one History-based Motion Vector Predictor candidate for the current coding block is not used in the inter prediction process, when the value of the parameter (cqtDepth) for the current coding block is equal to a threshold (pMQTTreshold) and when a width of the current coding block is not equal to a second threshold (PMsize);
   Or wherein the at least one History-based Motion Vector Predictor candidate for the current coding block is not used in the inter prediction process, when the value of the parameter (cqtDepth) for the current coding block is equal to a threshold (pMQTTreshold) and when a height of the current coding block is not equal to a second threshold (PMsize).

6. The apparatus according to embodiment 4 or 5, wherein the second threshold (PMsize) is equal to a value of a size of a motion estimation region.

7. The apparatus according to any one of embodiments 4 to 6, wherein the second threshold (PMsize) is determined according to the first threshold(pMQTTreshold).

8. An apparatus for merge estimation of a current coding block, wherein the apparatus comprises:
   a processing circuitry configured to:
   obtaining a value of a parameter (cqtDepth) for the current coding block, wherein the value of the parameter (cqtDepth) is used to decide a partition (e.g., a quad-tree partition) depth of the current coding block;
   performing inter prediction process for the current coding block;
   characterized in that, at least one History-based Motion Vector Predictor candidate for the current coding block is used in the inter prediction process, when the value of the parameter (cqtDepth) for the current coding block is smaller than a threshold (pMQTTreshold);
   or
   at least one History-based Motion Vector Predictor candidate for the current coding block is used in the inter prediction process, when the value of the parameter (cqtDepth) for the current coding block is greater than or equal to a threshold (pMQTTreshold), and when the top-left coordinate of the current coding block coincides with the top-left coordinate of a motion estimation region.

9. The apparatus according to embodiment 8, wherein the at least one History-based Motion Vector Predictor candidate for the current coding block is not used in the inter prediction process, when the value of the parameter (cqtDepth) for the current coding block is greater than or equal to a threshold (pMQTTreshold), and when the top-left coordinate of the current coding block is not coincides with the top-left coordinate of a motion estimation region.

10. An apparatus for merge estimation of a current coding block, wherein the apparatus comprises:
    a processing circuitry configured to:
    performing inter prediction process for the current coding block;

characterized in that,
  at least one History-based Motion Vector Predictor candidate for the current coding block is used in the inter prediction process, when a width of the current coding block is greater than or equal to a threshold (PMsize), and when a height of the current coding block is greater than or equal to the threshold (PMsize);
  or
  at least one History-based Motion Vector Predictor candidate for the current coding block is used in the inter prediction process, when the top-left coordinate of the current coding block coincides with the top-left coordinate of a motion estimation region.

11. The apparatus according to embodiment 10, wherein the at least one History-based Motion Vector Predictor candidate for the current coding block is not used in the inter prediction process, when the width of the current coding block is smaller than the threshold (PMsize), and when the top-left coordinate of the current coding block is not coincides with the top-left coordinate of the motion estimation region;
or wherein the at least one History-based Motion Vector Predictor candidate for the current coding block is not used in the inter prediction process, when the height of the current coding block is smaller than the threshold (PMsize), and when the top-left coordinate of the current coding block is not coincides with the top-left coordinate of the motion estimation region.

12. A method for merge estimation of a current coding block, wherein the method comprises:
  obtaining a value of a parameter (cqtDepth) for the current coding block, wherein the value of the parameter (cqtDepth) is used to decide a partition (e.g., a quad-tree partition) depth of the current coding block;
  performing inter prediction process for the current coding block;
  characterized in that, at least one History-based Motion Vector Predictor candidate for the current coding block is not used in the inter prediction process, when the value of the parameter (cqtDepth) for the current coding block is greater than a threshold.

13. The method according to embodiment 12, wherein the at least one History-based Motion Vector Predictor candidate for the current coding block is used in the inter prediction process, when the value of the parameter (cqtDepth) for the current coding block is smaller than or equal to the threshold.

14. The method according to embodiment 12 or 13, wherein the threshold is an integer, a value range for the threshold is from 0 to 5, includes 0 and 5.

15. A method for merge estimation of a current coding block, wherein the method comprises:
  obtaining a value of a parameter (cqtDepth) for the current coding block, wherein the value of the parameter (cqtDepth) is used to decide a partition (e.g., a quad-tree partition) depth of the current coding block;
  performing inter prediction process for the current coding block;
  characterized in that, at least one History-based Motion Vector Predictor candidate for the current coding block is used in the inter prediction process, when the value of the parameter (cqtDepth) for the current coding block is smaller than a threshold (pMQTTreshold);
  or
  at least one History-based Motion Vector Predictor candidate for the current coding block is used in the inter prediction process, when the value of the parameter (cqtDepth) for the current coding block is equal to a first threshold (pMQTTreshold), and when a width of the current coding block equal to a second threshold (PMsize), and when a height of the current coding block equal to the second threshold (PMsize).

16. The method according to embodiment 15, wherein the at least one History-based Motion Vector Predictor candidate for the current coding block is not used in the inter prediction process, when the value of the parameter (cqtDepth) for the current coding block is greater than a threshold (pMQTTreshold);
or
wherein the at least one History-based Motion Vector Predictor candidate for the current coding block is not used in the inter prediction process, when the value of the parameter (cqtDepth) for the current coding block is equal to a threshold (pMQTTreshold) and when a width of the current coding block is not equal to a second threshold (PMsize);
or
wherein the at least one History-based Motion Vector Predictor candidate for the current coding block is not used in the inter prediction process, when the value of the parameter (cqtDepth) for the current coding block is equal to a threshold (pMQTTreshold) and when a height of the current coding block is not equal to a second threshold (PMsize).

17. The method according to embodiment 15 or 16, wherein the second threshold (PMsize) is equal to a value of a size of a motion estimation region.

18. The method according to any one of embodiments 15 to 17, wherein the second threshold (PMsize) is determined according to the first threshold(pMQTTreshold).

19. A method for merge estimation of a current coding block, wherein the method comprises:
  obtaining a value of a parameter (cqtDepth) for the current coding block, wherein the value of the parameter (cqtDepth) is used to decide a partition (e.g., a quad-tree partition) depth of the current coding block;
  performing inter prediction process for the current coding block;
  characterized in that, at least one History-based Motion Vector Predictor candidate for the current coding block is used in the inter prediction process, when the value of the parameter (cqtDepth) for the current coding block is smaller than a threshold (pMQTTreshold);
  or
  at least one History-based Motion Vector Predictor candidate for the current coding block is used in the inter prediction process, when the value of the parameter (cqtDepth) for the current coding block is greater than or equal to a threshold (pMQTTreshold), and when the top-left coordinate of the current coding block coincides with the top-left coordinate of a motion estimation region.

20. The method according to embodiment 19, wherein the at least one History-based Motion Vector Predictor candidate for the current coding block is not used in the inter prediction process, when the value of the parameter (cqtDepth) for the current coding block is greater than or equal to a threshold (pMQTTreshold), and when the top-left coordinate of the current coding block is not coincides with the top-left coordinate of a motion estimation region.

21. A method for merge estimation of a current coding block, wherein the method comprises:
performing inter prediction process for the current coding block;
characterized in that,
at least one History-based Motion Vector Predictor candidate for the current coding block is used in the inter prediction process, when a width of the current coding block is greater than or equal to a threshold (PMsize), and when a height of the current coding block is greater than or equal to the threshold (PMsize);
or
at least one History-based Motion Vector Predictor candidate for the current coding block is used in the inter prediction process, when the top-left coordinate of the current coding block coincides with the top-left coordinate of a motion estimation region.

22. The method according to embodiment 21, wherein the at least one History-based Motion Vector Predictor candidate for the current coding block is not used in the inter prediction process, when the width of the current coding block is smaller than the threshold (PMsize), and when the top-left coordinate of the current coding block is not coincides with the top-left coordinate of the motion estimation region;
or
wherein the at least one History-based Motion Vector Predictor candidate for the current coding block is not used in the inter prediction process, when the height of the current coding block is smaller than the threshold (PMsize), and when the top-left coordinate of the current coding block is not coincides with the top-left coordinate of the motion estimation region.

23. An apparatus for merge estimation of a current coding block, wherein the apparatus comprises:
a processing circuitry configured to:
obtaining a width of the current coding block and/or a height of the current coding block (e.g., in number of samples);
performing inter prediction process for the current coding block;
characterized in that, at least one History-based Motion Vector Predictor candidate for the current coding block is not used in the inter prediction process, when the width or the height of the current coding block is smaller than a threshold.

24. The apparatus according to embodiment 23, wherein the at least one History-based Motion Vector Predictor candidate for the current coding block is used in the inter prediction process, when the value of the width and height of the current coding block are both greater than or equal to the threshold.

25. The apparatus according to embodiment 23 or 24, wherein the threshold is an integer, a value range for the threshold is from 8 to 128, includes 8 and 128.

26. An apparatus for merge estimation of a current coding block, wherein the apparatus comprises:
a processing circuitry configured to:
obtaining a width of the current coding block and a height of the current coding block (e.g., in number of samples);
performing inter prediction process for the current coding block;
characterized in that, at least one History-based Motion Vector Predictor candidate for the current coding block is used in the inter prediction process, when the width and the height of the current coding block are both greater than or equal to a threshold.
or
at least one History-based Motion Vector Predictor candidate for the current coding block is used in the inter prediction process, when the top-left coordinate of the current coding block coincides with the top-left coordinate of a motion estimation region.

27. The apparatus according to embodiment 26, wherein the at least one History-based Motion Vector Predictor candidate for the current coding block is not used in the inter prediction process, when the width or height of the current coding block is smaller than a threshold (PM-Size) and the top-left coordinate of the current coding block does not coincide with the top-left coordinate of a merge estimation region.

28. A method for merge estimation of a current coding block, wherein the method comprises:
obtaining a width of the current coding block and/or a height of the current coding block (e.g., in number of samples);
performing inter prediction process for the current coding block;
characterized in that, at least one History-based Motion Vector Predictor candidate for the current coding block is not used in the inter prediction process, when the width or the height of the current coding block is smaller than a threshold.

29. The method according to embodiment 28, wherein the at least one History-based Motion Vector Predictor candidate for the current coding block is used in the inter prediction process, when the value of the width and height of the current coding block are both greater than or equal to the threshold.

30. The method according to embodiment 23 or 24, wherein the threshold is an integer, a value range for the threshold is from 8 to 128, includes 8 and 128.

31. A method for merge estimation of a current coding block, wherein the method comprises:
obtaining a width of the current coding block and a height of the current coding block (e.g., in number of samples);
performing inter prediction process for the current coding block;
characterized in that, at least one History-based Motion Vector Predictor candidate for the current coding block is used in the inter prediction process, when the width and the height of the current coding block are both greater than or equal to a threshold.
or
at least one History-based Motion Vector Predictor candidate for the current coding block is used in the inter prediction process, when the top-left coordinate of the current coding block coincides with the top-left coordinate of a motion estimation region.

32. The method according to embodiment 31, wherein the at least one History-based Motion Vector Predictor candidate for the current coding block is not used in the inter prediction process, when the width or height of the current coding block is smaller than a threshold (PM-Size) and the top-left coordinate of the current coding block does not coincide with the top-left coordinate of a merge estimation region.

33. A method for merge estimation of a current coding block, wherein the method comprises:
   performing inter prediction process for the current coding block;
   characterized in that,
   at least one History-based Motion Vector Predictor candidate for the current coding block is used in the inter prediction process, when the top-left coordinate of the current coding block coincides with the top-left coordinate of a motion estimation region.

34. The method according to embodiment 33, wherein the at least one History-based Motion Vector Predictor candidate for the current coding block is not used in the inter prediction process, when the top-left coordinate of the current coding block does not coincide with the top-left coordinate of the motion estimation region;

35. An apparatus for merge estimation of a current coding block, wherein the apparatus comprises:
   a processing circuitry configured to:
   obtaining a coordinate of the top-left sample of the current coding block (e.g., horizontal and vertical coordinates);
   performing inter prediction process for the current coding block;
   characterized in that, at least one History-based Motion Vector Predictor candidate for the current coding block is used in the inter prediction process, when the top-left coordinate of the current coding block coincides with the top-left coordinate of a motion estimation region.

36. The apparatus according to embodiment 35, wherein the at least one History-based Motion Vector Predictor candidate for the current coding block is not used in the inter prediction process, when the top-left coordinate of the current coding block does not coincide with the top-left coordinate of a merge estimation region.

37. A computer-readable non-transitory medium storing a program, including instructions which when executed on a processor cause the processor to perform the method according to any of embodiments 12 to 22 and 28 to 36.

The motion compensation unit is configured to obtain, e.g., receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 300 in decoding the picture blocks of the video slice.

The intra prediction unit 254 is configured to obtain, e.g., receive, the picture block 203 (current picture block) and one or a plurality of previously reconstructed blocks, e.g., reconstructed neighbor blocks, of the same picture for intra estimation. The encoder 200 may, e.g., be configured to select an intra prediction mode from a plurality of (predetermined) intra prediction modes.

The arithmetic right shift operation is defined as follows:
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

The binary logarithm can be defined as follows:
the binary logarithm $\log_2(n)$ is the power to which the number 2 must be raised to obtain the value n.
If $x=\log_2(n)$, then $2^x=n$ According to above definitions, the following equality holds:
floor (X/mer_width)=X>log 2_mer_width, where log 2_mer_width is the binary logarithm of mer_width.

Embodiments of the encoder 200 may be configured to select the intra-prediction mode based on an optimization criterion, e.g., minimum residual (e.g., the intra-prediction mode providing the prediction block 255 most similar to the current picture block 203) or minimum rate distortion.

The intra prediction unit 254 is further configured to determine based on intra prediction parameter, e.g., the selected intra prediction mode, the intra prediction block 255. In any case, after selecting an intra prediction mode for a block, the intra prediction unit 254 is also configured to provide intra prediction parameter, i.e., information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g., in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 200 can be used to encode the video stream. For example, a non-transform based encoder 200 can quantize the residual signal directly without the transform processing unit 206 for certain blocks or frames. In another implementation, an encoder 200 can have the quantization unit 208 and the inverse quantization unit 210 combined into a single unit.

FIG. 3 shows an exemplary video decoder 300 that is configured to implement the techniques of this present application. The video decoder 300 configured to receive encoded picture data (e.g., encoded bitstream) 271, e.g., encoded by encoder 200, to obtain a decoded picture 331. During the decoding process, video decoder 300 receives video data, e.g., an encoded video bitstream that represents picture blocks of an encoded video slice and associated syntax elements, from video encoder 200.

In the example of FIG. 3, the decoder 300 comprises an entropy decoding unit 304, an inverse quantization unit 310, an inverse transform processing unit 312, a reconstruction unit 314 (e.g., a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 300 may, in some examples, perform a decoding pass generally reciprocal to the encoding pass described with respect to video encoder 200 from FIG. 2.

The entropy decoding unit 304 is configured to perform entropy decoding to the encoded picture data 271 to obtain, e.g., quantized coefficients 309 and/or decoded coding parameters (not shown in FIG. 3), e.g., (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 300 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g., from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g., motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 300 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g., Summer 314) is configured to add the inverse transform block 313 (i.e., reconstructed residual block 313) to the prediction block 365 to obtain a reconstructed block 315 in the sample domain, e.g., by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g., to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 300 is configured to output the decoded picture 311, e.g., via output 312, for presentation or viewing to a user.

Other variations of the video decoder 300 can be used to decode the compressed bitstream. For example, the decoder 300 can produce the output video stream without the loop filtering unit 320. For example, a non-transform based decoder 300 can inverse-quantize the residual signal directly without the inverse-transform processing unit 312 for certain blocks or frames. In another implementation, the video decoder 300 can have the inverse-quantization unit 310 and the inverse-transform processing unit 312 combined into a single unit.

Figure 4:
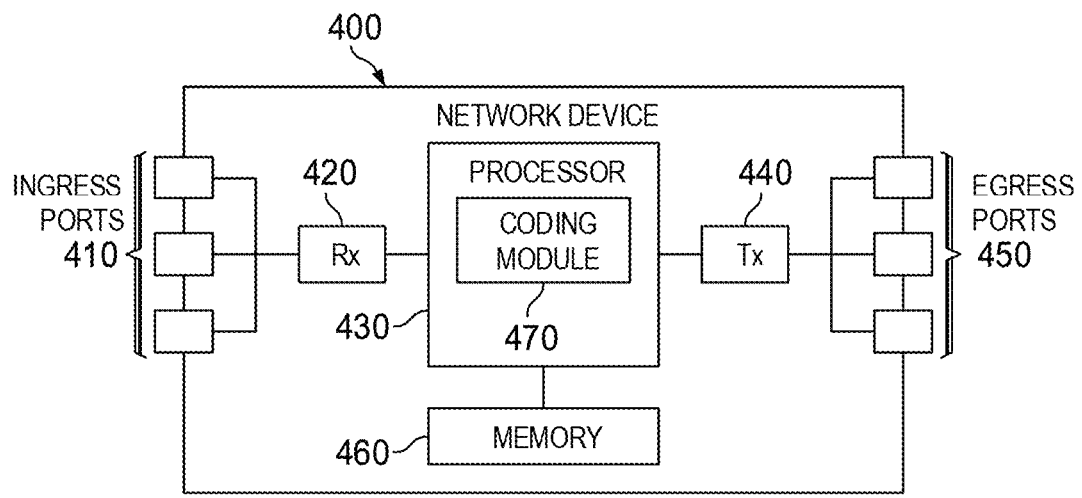
FIG. 4 is a schematic diagram of a network device.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as video decoder 300 of FIG. 1A or an encoder such as video encoder 200 of FIG. 1A. In an embodiment, the network device 400 may be one or more components of the video decoder 300 of FIG. 1A or the video encoder 200 of FIG. 1A as described above.

The network device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
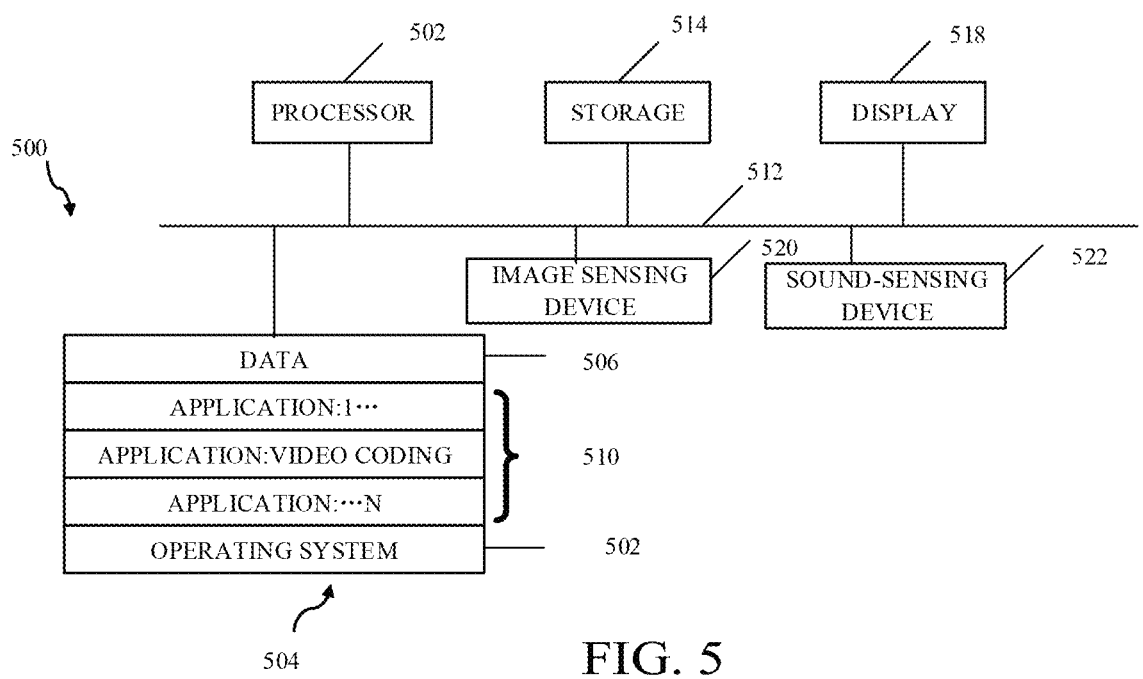
FIG. 5 is a simplified block diagram of an apparatus 500 that may be used as either or both of the source device 12 and the destination device 14 from FIG. 1A according to an exemplary embodiment.

FIG. 5 is a simplified block diagram of an apparatus 500 that may be used as either or both of the source device 12 and the destination device 14 from FIG. 1A according to an exemplary embodiment. The apparatus 500 can implement techniques of this present application. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Particularly, the following (newly enumerated) embodiments are provided herein.

1. An apparatus for inter prediction of a current coding block, wherein the apparatus comprises:
    a processing circuitry configured for:
        obtaining a value of a parameter (cqtDepth) for the current coding block, wherein the value of the parameter (cqtDepth) indicates a partition depth of the current coding block;
        performing inter prediction process for the current coding block;
        characterized in that no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is greater than a threshold.

Here and in the following embodiments by a coded block that is not spatially adjacent to the current coding block a coded block of the same picture as the current block is meant.

2. The apparatus according to embodiment 1, wherein at least one Motion Vector Predictor candidate comprising a motion vector of a coded block that is not spatially adjacent to the current coding block for the current coding block is used in the inter prediction process, when the value of the parameter (cqtDepth) for the current coding block is smaller than or equal to the threshold.

3. The apparatus according to embodiment 1 or 2, wherein the threshold is in the range from 0 to 5.

4. An apparatus for inter prediction of a current coding block, wherein the apparatus comprises:
    a processing circuitry configured for:
        obtaining a value of a parameter (cqtDepth) for the current coding block, wherein the value of the parameter (cqtDepth) indicates a partition depth of the current coding block;
        performing inter prediction process for the current coding block;
        characterized in that, at least one Motion Vector Predictor candidate comprising a motion vector of a coded block that is not spatially adjacent to the current coding block for the current coding block is used in the inter prediction process, when the value of the parameter (cqtDepth) for the current coding block is smaller than a first threshold (pMQTTreshold);
        or
        at least one Motion Vector Predictor candidate comprising a motion vector of a coded block that is not spatially adjacent to the current coding block for the current coding block is used in the inter prediction process, when the value of the parameter (cqtDepth) for the current coding block is equal to the first threshold (pMQTTreshold), and when a width of the current coding block is equal to a second threshold (PMsize) and a height of the current coding block is equal to the second threshold (PMsize).

5. The apparatus according to embodiment 4, wherein no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is greater than the first threshold (pMQTTreshold);
or wherein no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is equal to the first threshold (pMQTTreshold) and when a width of the current coding block is not equal to the second threshold (PMsize); or wherein the at least one Motion Vector Predictor candidate comprising a motion vector of a coded block that is not spatially adjacent to the current coding block for the current coding block is not used in the inter prediction process, when the value of the parameter (cqtDepth) for the current coding block is equal to the first threshold (pMQTTreshold) and when a height of the current coding block is not equal to the second threshold (PMsize).

6. The apparatus according to embodiment 4 or 5, wherein the second threshold (PMsize) is equal to a value of a width and/or a height or to a value related to an area of a motion estimation region.

7. The apparatus according to any one of embodiments 4 to 6, wherein the second threshold (PMsize) is determined according to the first threshold (pMQTTreshold).

8. An apparatus for inter prediction of a current coding block, wherein the apparatus comprises:
    a processing circuitry configured for:
        obtaining a value of a parameter (cqtDepth) for the current coding block, wherein the value of the parameter (cqtDepth) indicates a partition depth of the current coding block;
        performing inter prediction process for the current coding block;
        characterized in that, at least one Motion Vector Predictor candidate comprising a motion vector of a coded block that is not spatially adjacent to the current coding block for the current coding block is used in the inter prediction process, when the value of the parameter (cqtDepth) for the current coding block is smaller than a threshold (pMQTTreshold);
        or at least one Motion Vector Predictor candidate comprising a motion vector of a coded block that is not spatially adjacent to the current coding block for the current coding block is used in the inter prediction process, when the value of the parameter (cqtDepth) for the current coding block is greater than or equal to the threshold (pMQTTreshold), and when the top-left coordinate of the current coding block coincides with the top-left coordinate of a motion estimation region.

9. The apparatus according to embodiment 8, wherein no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is greater than or equal to the threshold (pMQTTreshold), and when the top-left coordinate of the current coding block does not coincide with the top-left coordinate of the motion estimation region.

10. An apparatus for inter prediction of a current coding block, wherein the apparatus comprises:
    a processing circuitry configured for:
        performing inter prediction process for the current coding block;
        characterized in that,
        at least one Motion Vector Predictor candidate comprising a motion vector of a coded block that is not spatially adjacent to the current coding block for the current coding block is used in the inter prediction process, when a width of the current coding block is greater than or equal to a threshold (PMsize), and when a height of the current coding block is greater than or equal to the threshold (PMsize);
        or
        at least one Motion Vector Predictor candidate comprising a motion vector of a coded block that is not spatially adjacent to the current coding block for the current coding block is used in the inter prediction process, when the top-left coordinate of the current coding block coincides with the top-left coordinate of a motion estimation region.

11. The apparatus according to embodiment 10, wherein no Motion Vector Predictor candidate comprising a motion vector of a coded block that is not spatially adjacent to the current coding block for the current coding block is used in the inter prediction process or a merge mode inter prediction process, when the width of the current coding block is smaller than the threshold (PMsize), and when the top-left coordinate of the current coding block does not coincide with the top-left coordinate of the motion estimation region; or wherein no Motion Vector Predictor candidate comprising a motion vector of a coded block that is not spatially adjacent to the current coding block for the current coding block is used in the inter prediction process or a merge mode inter prediction process, when the height of the current coding block is smaller than the threshold (PMsize), and when the top-left coordinate of the current coding block does not coincide with the top-left coordinate of the motion estimation region.

12. A method for inter prediction of a current coding block, wherein the method comprises:
   obtaining a value of a parameter (cqtDepth) for the current coding block, wherein the value of the parameter (cqtDepth) indicates a partition depth of the current coding block;
   performing inter prediction process for the current coding block;
   characterized in that no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is greater than a threshold.

13. The method according to embodiment 12, wherein at least one Motion Vector Predictor candidate comprising a motion vector of a coded block that is not spatially adjacent to the current coding block for the current coding block is used in the inter prediction process, when the value of the parameter (cqtDepth) for the current coding block is smaller than or equal to the threshold.

14. The method according to embodiment 12 or 13, wherein the threshold is in the range from 0 to 5.

15. A method for inter prediction of a current coding block, wherein the method comprises:
   obtaining a value of a parameter (cqtDepth) for the current coding block, wherein the value of the parameter (cqtDepth) indicates a partition depth of the current coding block;
   performing inter prediction process for the current coding block;
   characterized in that, at least one Motion Vector Predictor candidate comprising a motion vector of a coded block that is not spatially adjacent to the current coding block for the current coding block is used in the inter prediction process, when the value of the parameter (cqtDepth) for the current coding block is smaller than a first threshold (pMQTTreshold);
   or
   at least one Motion Vector Predictor candidate comprising a motion vector of a coded block that is not spatially adjacent to the current coding block for the current coding block is used in the inter prediction process, when the value of the parameter (cqtDepth) for the current coding block is equal to the first threshold (pMQTTreshold), and when a width of the current coding block is equal to a second threshold (PMsize) and a height of the current coding block is equal to the second threshold (PMsize).

16. The method according to embodiment 15, wherein no Motion Vector Predictor candidate comprising a motion vector of a coded block that is not spatially adjacent to the current coding block for the current coding block is not used in the inter prediction process or a merge mode inter prediction process, when the value of the parameter (cqtDepth) for the current coding block is greater than the first threshold (pMQTTreshold);
   or
   wherein no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is equal to the first threshold (pMQTTreshold) and when a width of the current coding block is not equal to the second threshold (PMsize);
   or wherein the at least one Motion Vector Predictor candidate comprising a motion vector of a coded block that is not spatially adjacent to the current coding block for the current coding block is not used in the inter prediction process, when the value of the parameter (cqtDepth) for the current coding block is equal to the first threshold (pMQTTreshold) and when a height of the current coding block is not equal to the second threshold (PMsize).

17. The method according to embodiment 15 or 16, wherein the second threshold (PMsize) is equal to a value of a width and/or a height or to a value related to an area of a motion estimation region.

18. The method according to any one of embodiments 15 to 17, wherein the second threshold (PMsize) is determined according to the first threshold (pMQTTreshold).

19. A method for inter prediction of a current coding block, wherein the method comprises:
   obtaining a value of a parameter (cqtDepth) for the current coding block, wherein the value of the parameter (cqtDepth) indicates a partition depth of the current coding block;
   performing inter prediction process for the current coding block;
   characterized in that, at least one Motion Vector Predictor candidate comprising a motion vector of a coded block that is not spatially adjacent to the current coding block for the current coding block is used in the inter prediction process, when the value of the parameter (cqtDepth) for the current coding block is smaller than a threshold (pMQTTreshold);
   or at least one Motion Vector Predictor candidate comprising a motion vector of a coded block that is not spatially adjacent to the current coding block for the current coding block is used in the inter prediction process, when the value of the parameter (cqtDepth) for the current coding block is greater than or equal to the threshold (pMQTTreshold), and when the top-left coordinate of the current coding block coincides with the top-left coordinate of a motion estimation region.

20. The method according to embodiment 19, wherein no Motion Vector Predictor candidate comprising a motion vector of a coded block that is not spatially adjacent to the current coding block for the current coding block is used in the inter prediction process or a merge mode inter prediction process, when the value of the parameter (cqtDepth) for the current coding block is greater than or equal to the threshold (pMQTTreshold), and when the top-left coordinate of the current coding block does not coincide with the top-left coordinate of the motion estimation region.

21. A method for inter prediction of a current coding block, wherein the method comprises:

performing inter prediction process for the current coding block;

characterized in that, at least one Motion Vector Predictor candidate comprising a motion vector of a coded block that is not spatially adjacent to the current coding block for the current coding block is used in the inter prediction process, when a width of the current coding block is greater than or equal to a threshold (PMsize), and when a height of the current coding block is greater than or equal to the threshold (PMsize);

or at least one Motion Vector Predictor candidate comprising a motion vector of a coded block that is not spatially adjacent to the current coding block for the current coding block is used in the inter prediction process, when the top-left coordinate of the current coding block coincides with the top-left coordinate of a motion estimation region.

22. The method according to embodiment 21, wherein no Motion Vector Predictor candidate comprising a motion vector of a coded block that is not spatially adjacent to the current coding block for the current coding block is not used in the inter prediction process or a merge mode inter prediction process, when the width of the current coding block is smaller than the threshold (PMsize), and when the top-left coordinate of the current coding block does not coincide with the top-left coordinate of the motion estimation region;

or wherein no Motion Vector Predictor candidate comprising a motion vector of a coded block that is not spatially adjacent to the current coding block for the current coding block is not used in the inter prediction process or a merge mode inter prediction process, when the height of the current coding block is smaller than the threshold (PMsize), and when the top-left coordinate of the current coding block does not coincide with the top-left coordinate of the motion estimation region.

23. An apparatus for inter prediction of a current coding block, wherein the apparatus comprises:

a processing circuitry configured for:

obtaining a width of the current coding block and/or a height of the current coding block;

performing inter prediction process for the current coding block;

characterized in that, no Motion Vector Predictor candidate comprising a motion vector of a coded block that is not spatially adjacent to the current coding block for the current coding block is used in the inter prediction process or a merge mode inter prediction process, when the width or the height of the current coding block is smaller than a threshold.

24. The apparatus according to embodiment 23, wherein at least one Motion Vector Predictor candidate comprising a motion vector of a coded block that is not spatially adjacent to the current coding block for the current coding block is used in the inter prediction process, when the width and height of the current coding block are both greater than or equal to the threshold.

25. The apparatus according to embodiment 23 or 24, wherein the threshold is in the range from 8 to 128.

26. A method for inter prediction of a current coding block, wherein the method comprises:

obtaining a width of the current coding block and/or a height of the current coding block;

performing inter prediction process for the current coding block;

characterized in that no Motion Vector Predictor candidate comprising a motion vector of a coded block that is not spatially adjacent to the current coding block for the current coding block is used in the inter prediction process or a merge mode inter prediction process, when the width or the height of the current coding block is smaller than a threshold.

27. The method according to embodiment 26, wherein at least one Motion Vector Predictor candidate comprising a motion vector of a coded block that is not spatially adjacent to the current coding block for the current coding block is used in the inter prediction process, when the width and height of the current coding block are both greater than or equal to the threshold.

28. The method according to embodiment 26 or 27, wherein the threshold is in the range from 8 to 128.

29. A method for inter prediction of a current coding block, wherein the method comprises:

performing inter prediction process for the current coding block;

characterized in that, at least one Motion Vector Predictor candidate comprising a motion vector of a coded block that is not spatially adjacent to the current coding block for the current coding block is used in the inter prediction process, when the top-left coordinate of the current coding block coincides with the top-left coordinate of a motion estimation region.

30. The method according to embodiment 29, wherein no Motion Vector Predictor candidate comprising a motion vector of a coded block that is not spatially adjacent to the current coding block for the current coding block is used in the inter prediction process, when the top-left coordinate of the current coding block does not coincide with the top-left coordinate of the motion estimation region.

31. An apparatus for inter prediction of a current coding block, wherein the apparatus comprises:

a processing circuitry configured for:

obtaining a coordinate of the top-left sample of the current coding block;

performing inter prediction process for the current coding block;

characterized in that, at least one Motion Vector Predictor candidate comprising a motion vector of a coded block that is not spatially adjacent to the current coding block for the current coding block is used in the inter prediction process, when the top-left coordinate of the current coding block coincides with the top-left coordinate of a motion estimation region.

32. The apparatus according to embodiment 31, wherein no Motion Vector Predictor candidate comprising a motion vector of a coded block that is not spatially adjacent to the current coding block for the current coding block is used in the inter prediction process or a merge mode inter prediction process, when the top-left coordinate of the current coding block does not coincide with the top-left coordinate of the motion estimation region.

33. An apparatus for inter prediction of a current coding block, wherein the apparatus comprises:
a processing circuitry configured for:
performing inter prediction process for the current coding block;
characterized in that the processing circuitry is further configured for:
not updating a Motion Vector Predictor candidates list comprising Motion Vector Predictor candidates from previously coded blocks that are not spatially adjacent to the current coding block after performing the inter prediction process, when the width or the height of the current coding block is smaller than a threshold (PMSize).

34. The apparatus according to embodiment 33, wherein the processing circuitry is further configured for updating the Motion Vector Predictor candidates list after performing the inter prediction process, when the width and the height of the current coding block is greater than or equal to the threshold (PMSize).

35. The apparatus according to embodiment 34 or 35, wherein the inter prediction process is a merge mode inter prediction process.

36. An apparatus for inter prediction of a current coding block, wherein the apparatus comprises:
a processing circuitry configured for:
performing inter prediction process for the current coding block;
characterized in that the processing circuitry is further configured for:
updating a Motion Vector Predictor candidates list comprising Motion Vector Predictor candidates from previously coded blocks that are not spatially adjacent to the current coding block after performing the inter prediction process,
when a width of the current coding block is greater than or equal to a threshold (PMsize) and a height of the current coding block is greater than or equal to the threshold (PMsize);
or when the bottom-right coordinate of the current coding block coincides with the bottom-right coordinate of a motion estimation region.

37. The apparatus according to embodiment 36, wherein the processing circuitry is further configured for not updating the Motion Vector Predictor candidates list after performing the inter prediction process, when the width or the height of the current coding block is smaller than the threshold (PMSize) and the bottom-right coordinate of the current coding block does not coincide with the bottom-right coordinate of the motion estimation region.

38. The apparatus according to embodiment 36 or 37, wherein the inter prediction process is a merge mode inter prediction process.

39. An apparatus for inter prediction of a current coding block, wherein the apparatus comprises:
a processing circuitry configured for:
performing inter prediction process for the current coding block;
characterized in that the processing circuitry is further configured for:
not updating a Motion Vector Predictor candidates list comprising Motion Vector Predictor candidates from previously coded blocks that are not spatially adjacent to the current coding block after performing the inter prediction process, when the bottom-right coordinate of the current coding block does not coincide with the bottom-right coordinate of a motion estimation region.

40. The apparatus according to embodiment 39, wherein the processing circuitry is further configured for updating the Motion Vector Predictor candidates list after performing the inter prediction process, when the bottom-right coordinate of the current coding block coincides with the bottom-right coordinate of a motion estimation region.

41. The apparatus according to embodiment 39 or 40, wherein the inter prediction process is a merge mode inter prediction process.

42. An apparatus for inter prediction of a current coding block, wherein the apparatus comprises:
a processing circuitry configured for:
obtaining a value of a parameter (cqtDepth) for the current coding block, wherein the value of the parameter (cqtDepth) indicates a partition depth of the current coding block;
performing inter prediction process for the current coding block;
characterized in that the processing circuitry is further configured for:
not updating a Motion Vector Predictor candidates list comprising Motion Vector Predictor candidates from previously coded blocks that are not spatially adjacent to the current coding block after performing the inter prediction process, when the value of the parameter (cqtDepth) for the current coding block is greater than a threshold (pMQTTreshold).

43. The apparatus according to embodiment 42, wherein the processing circuitry is further configured for updating the Motion Vector Predictor candidates list after performing the inter prediction process, when the value of the parameter (cqtDepth) for the current coding block is smaller than or equal to the threshold (pMQTTreshold).

44. The apparatus according to embodiment 42 or 43, wherein the inter prediction process is a merge mode inter prediction process.

45. An apparatus for inter prediction of a current coding block, wherein the apparatus comprises:
a processing circuitry configured for:
obtaining a value of a parameter (cqtDepth) for the current coding block, wherein the value of the parameter (cqtDepth) indicates a partition depth of the current coding block;
performing inter prediction process for the current coding block;
characterized in that the processing circuitry is further configured for:
updating a Motion Vector Predictor candidates list comprising Motion Vector Predictor candidates from previously coded blocks that are not spatially adjacent to the current coding block after performing the inter prediction process,
when the value of the parameter (cqtDepth) for the current coding block is smaller than a first threshold (pMQTTreshold); or
the value of the parameter (cqtDepth) for the current coding block is equal to the first threshold (pMQTTreshold) and a width of the current coding block is equal to a second threshold (PMsize) and a height of the current coding block is equal to the second threshold (PMsize).

46. The apparatus according to embodiment 45, wherein the processing circuitry is further configured for not updating the Motion Vector Predictor candidates list after performing the inter prediction process, when a) the value of the parameter (cqtDepth) for the current coding block is greater than the first threshold (pMQTTreshold) or b) the value of the parameter (cqtDepth) for the current coding block is equal to the first threshold (pMQTTreshold) and the width or the height of the current coding block is not equal to the second threshold (PMSize).

47. The apparatus according to embodiment 45 or 46, wherein the inter prediction process is a merge mode inter prediction process.

48. An apparatus for inter prediction of a current coding block, wherein the apparatus comprises:
a processing circuitry configured for:
obtaining a value of a parameter (cqtDepth) for the current coding block, wherein the value of the parameter (cqtDepth) indicates a partition depth of the current coding block;
performing inter prediction process for the current coding block;
characterized in that the processing circuitry is further configured for:
updating a Motion Vector Predictor candidates list comprising Motion Vector Predictor candidates from previously coded blocks that are not spatially adjacent to the current coding block after performing the inter prediction process,
when the value of the parameter (cqtDepth) for the current coding block is smaller than a first threshold (pMQTTreshold); or
when the value of the parameter (cqtDepth) for the current coding block is greater than or equal to the first threshold (pMQTTreshold) and the bottom-right coordinate of the current coding block coincides with the bottom-right coordinate of a motion estimation region.

49. The apparatus according to embodiment 48, wherein the processing circuitry is further configured for not updating the Motion Vector Predictor candidates list after performing the inter prediction process, when the value of the parameter (cqtDepth) for the current coding block is greater than or equal to the first threshold (pMQTTreshold) and the bottom-right coordinate of the current coding block does not coincide with the bottom-right coordinate of the motion estimation region.

50. The apparatus according to embodiment 48 or 49, wherein the inter prediction process is a merge mode inter prediction process.

51. A method for inter prediction of a current coding block, wherein the method comprises:
performing inter prediction process for the current coding block;
characterized by:
not updating a Motion Vector Predictor candidates list comprising Motion Vector Predictor candidates from previously coded blocks that are not spatially adjacent to the current coding block after performing the inter prediction process, when the width or the height of the current coding block is smaller than a threshold (PMSize).

52. The method according to embodiment 51, further comprising updating the Motion Vector Predictor candidates list after performing the inter prediction process, when the width and the height of the current coding block is greater than or equal to the threshold (PMSize).

53. The method according to embodiment 51 or 52, wherein the inter prediction process is a merge mode inter prediction process.

54. A method for inter prediction of a current coding block, wherein the method comprises:
performing inter prediction process for the current coding block;
characterized by:
updating a Motion Vector Predictor candidates list comprising Motion Vector Predictor candidates from previously coded blocks that are not spatially adjacent to the current coding block after performing the inter prediction process using the Motion Vector Predictor candidate used for performing the inter prediction process,
when a width of the current coding block is greater than or equal to a threshold (PMsize), and when a height of the current coding block is greater than or equal to the threshold (PMsize);
or when the bottom-right coordinate of the current coding block coincides with the bottom-right coordinate of a motion estimation region.

55. The method according to embodiment 54, further comprising not updating the Motion Vector Predictor candidates list after performing the inter prediction process, when the width or the height of the current coding block is smaller than the threshold (PMSize) and the bottom-right coordinate of the current coding block does not coincide with the bottom-right coordinate of a motion estimation region.

56. The method according to embodiment 54 or 55, wherein the inter prediction process is a merge mode inter prediction process.

57. A method for inter prediction of a current coding block, wherein the method comprises:
performing inter prediction process for the current coding block;
characterized by:
not updating a Motion Vector Predictor candidates list comprising Motion Vector Predictor candidates from previously coded blocks that are not spatially adjacent to the current coding block after performing the inter prediction process, when the bottom-right coordinate of the current coding block does not coincide with the bottom-right coordinate of a motion estimation region.

58. The method according to embodiment 57, further comprising updating the Motion Vector Predictor candidates list after performing the inter prediction process, when the bottom-right coordinate of the current coding block coincides with the bottom-right coordinate of a motion estimation region.

59. The method according to embodiment 57 or 58, wherein the inter prediction process is a merge mode inter prediction process.

60. A method for inter prediction of a current coding block, wherein the method comprises:
obtaining a value of a parameter (cqtDepth) for the current coding block, wherein the value of the parameter (cqtDepth) indicates a partition depth of the current coding block;
performing inter prediction process for the current coding block;
characterized by:
not updating a Motion Vector Predictor candidates list comprising Motion Vector Predictor candidates from previously coded blocks that are not spatially adjacent to the current coding block after performing the inter prediction process, when the value of the parameter (cqtDepth) for the current coding block is greater than a threshold (pMQTTreshold).

61. The method according to embodiment 60, further comprising updating the Motion Vector Predictor candidates list after performing the inter prediction process, when the value of the parameter (cqtDepth) for the current coding block is smaller than or equal to the threshold (pMQTTreshold).

62. The method according to embodiment 60 or 61, wherein the inter prediction process is a merge mode inter prediction process.

63. A method for inter prediction of a current coding block, wherein the method comprises:

obtaining a value of a parameter (cqtDepth) for the current coding block, wherein the value of the parameter (cqtDepth) indicates a partition depth of the current coding block;

performing inter prediction process for the current coding block;

characterized by:

updating a Motion Vector Predictor candidates list comprising Motion Vector Predictor candidates from previously coded blocks that are not spatially adjacent to the current coding block after performing the inter prediction process, when the value of the parameter (cqtDepth) for the current coding block is smaller than a first threshold (pMQTTreshold); or the value of the parameter (cqtDepth) for the current coding block is equal to the first threshold (pMQTTreshold) and a width of the current coding block is equal to a second threshold (PMsize) and a height of the current coding block is equal to the second threshold (PMsize).

64. The method according to embodiment 63, further comprising not updating the Motion Vector Predictor candidates list after performing the inter prediction process, when a) the value of the parameter (cqtDepth) for the current coding block is greater than the first threshold (pMQTTreshold) or b) the value of the parameter (cqtDepth) for the current coding block is equal to the first threshold (pMQTTreshold) and the width or the height of the current coding block is not equal to the second threshold (PMSize).

65. The method according to embodiment 63 or 64, wherein the inter prediction process is a merge mode inter prediction process.

66. A method for inter prediction of a current coding block, wherein the method comprises:

obtaining a value of a parameter (cqtDepth) for the current coding block, wherein the value of the parameter (cqtDepth) indicates a partition depth of the current coding block;

performing inter prediction process for the current coding block;

characterized by:

updating a Motion Vector Predictor candidates list comprising Motion Vector Predictor candidates from previously coded blocks that are not spatially adjacent to the current coding block after performing the inter prediction process, when the value of the parameter (cqtDepth) for the current coding block is smaller than a first threshold (pMQT-Treshold); or when the value of the parameter (cqtDepth) for the current coding block is greater than or equal to the first threshold (pMQTTreshold) and the bottom-right coordinate of the current coding block coincides with the bottom-right coordinate of a motion estimation region.

67. The method according to embodiment 66, further comprising not updating the Motion Vector Predictor candidates list after performing the inter prediction process, when the value of the parameter (cqtDepth) for the current coding block is greater than or equal to the first threshold (pMQT-Treshold) and the bottom-right coordinate of the current coding block does not coincide with the bottom-right coordinate of the motion estimation region.

68. The method according to embodiment 66 or 67, wherein the inter prediction process is a merge mode inter prediction process.

69. The method according to any of the embodiments 12 to 20 and 60 to 68, wherein the partition depth is a partition depth of a quad tree partitioning.

70. The method according to any of the embodiments 12 to 22, 26 to 30 and 51 to 69, wherein the inter prediction process comprises merge estimation.

71. The apparatus according to any of the embodiments 1 to 9 and 42 to 50, wherein the partition depth is a partition depth of a quad tree partitioning.

72. The apparatus according to any of the embodiments 1 to 11, 23 to 25 and 31 to 50 and 71, wherein the inter prediction process comprises merge estimation.

73. A video encoding device comprising the apparatus according to any of the embodiments 1 to 11, 23 to 25, 31 to 50 and 71 to 72.

74. A video decoding device comprising the apparatus according to any of the embodiments 1 to 11, 23 to 25, 31 to 50 and 71 to 72.

75. A video encoding device comprising processing circuitry configured for performing the method according to any of the embodiments 12 to 22, 26 to 30 and 51 to 70.

76. A video encoding device comprising processing circuitry configured for performing the method according to any of the embodiments 12 to 22, 26 to 30 and 51 to 70.

77. A computer-readable non-transitory medium storing a program, including instructions which when executed on a processor cause the processor to perform the method according to any of embodiments 12 to 22, 26 to 30 and 51 to 70.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Summarizing, the present disclosure relates to an apparatus and method for marking availability of a candidate coding block for merge estimation of a current coding block within a coding tree unit, CTU, which includes multiple coding blocks. Initially, the candidate coding block is marked as available. The candidate coding block is marked as unavailable when a predefined location of the candidate coding block is included within an extended merge estimation region, MER. The extended MER includes a current MER in which the current coding block is located and at least a portion of another MER, adjacent to the current MER. The predefined location may be a top-left or bottom-right (pixel) position of a corner of the candidate coding block. Whether the candidate coding block is located within the extended MER is determined in dependence on the positional relation between the predefined location and a position of a corner of the current coding block, with the corner being any of the upper-left, bottom-left, or bottom-right. The coding blocks may be labelled based on a processing order and grouped using a slid window. When the candidate and current coding blocks are in the same group, the candidate coding block is marked as unavailable.

LIST OF REFERENCE SIGNS

FIG. 1A
10 video coding system
12 source device
13 communication channel
14 destination device
16 picture source
17 picture data
18 pre-processor
19 pre-processed picture data
20 video encoder
21 encoded picture data
22 communication interface
28 communication interface
30 video decoder
31 decoded picture data
32 post processor
33 post-processed picture data
34 display device
FIG. 1B
40 video coding system
41 imaging device(s)
42 antenna
43 processor(s)
44 memory store(s)
45 display device
46 processing circuitry
20 video encoder
30 video decoder
FIG. 2
17 picture (data)
19 pre-processed picture (data)
20 encoder
21 encoded picture data
201 input (interface)
204 residual calculation [unit or step]
206 transform processing unit
208 quantization unit
210 inverse quantization unit
212 inverse transform processing unit
214 reconstruction unit
220 loop filter unit
230 decoded picture buffer (DPB)
260 mode selection unit
270 entropy encoding unit
272 output (interface)

244 inter prediction unit
254 intra prediction unit
262 partitioning unit
203 picture block
205 residual block
213 reconstructed residual block
215 reconstructed block
221 filtered block
231 decoded picture
265 prediction block
266 syntax elements
207 transform coefficients
209 quantized coefficients
211 dequantized coefficients
FIG. 3
21 encoded picture data
30 video decoder
304 entropy decoding unit
309 quantized coefficients
310 inverse quantization unit
311 dequantized coefficients
312 inverse transform processing unit
313 reconstructed residual block
314 reconstruction unit
315 reconstructed block
320 loop filter
321 filtered block
330 decoded picture buffer DBP
331 decoded picture
360 mode application unit
365 prediction block
366 syntax elements
344 inter prediction unit
354 intra prediction unit
FIG. 4
400 video coding device
410 ingress ports/input ports
420 receiver units Rx
430 processor
440 transmitter units Tx
450 egress ports/output ports
460 memory
470 coding module
FIG. 5
500 source device or destination device
502 processor
504 memory
506 code and data
508 operating system
510 application programs
512 bus
518 display

What is claimed is:

1. An apparatus for inter prediction of a current coding block of a picture, wherein the apparatus comprises:
a processing circuitry configured for:
obtaining a value of a parameter for the current coding block, wherein the value of the parameter indicates a partition depth of the current coding block; and
performing an inter prediction process for the current coding block;
wherein no Motion Vector Predictor candidate comprising a motion vector of a coded block of the picture that is not spatially adjacent to the current coding block for the current coding block is used in the inter prediction process or a merge mode inter prediction process comprised in the inter prediction process, when the value of the parameter for the current coding block is greater than a threshold.

2. The apparatus according to claim 1, wherein at least one Motion Vector Predictor candidate comprising a motion vector of a coded block of the picture that is not spatially adjacent to the current coding block for the current coding block is used in the inter prediction process, when the value of the parameter for the current coding block is smaller than or equal to the threshold.

3. The apparatus according to claim 1, wherein the threshold is in the range from 0 to 5.

4. A method for inter prediction of a current coding block of a picture, wherein the method comprises:
obtaining a value of a parameter for the current coding block, wherein the value of the parameter indicates a partition depth of the current coding block; and
performing an inter prediction process for the current coding block;
wherein no Motion Vector Predictor candidate comprising a motion vector of a coded block of the picture that is not spatially adjacent to the current coding block for the current coding block is used in the inter prediction process or a merge mode inter prediction process comprised in the inter prediction process, when the value of the parameter for the current coding block is greater than a threshold.

5. The method according to claim 4, wherein at least one Motion Vector Predictor candidate comprising a motion vector of a coded block of the picture that is not spatially adjacent to the current coding block for the current coding block is used in the inter prediction process, when the value of the parameter for the current coding block is smaller than or equal to the threshold.

6. The method according to claim 4, wherein the threshold is in the range from 0 to 5.

7. An apparatus for inter prediction of a current coding block of a picture, wherein the apparatus comprises:
a processing circuitry configured for:
obtaining a value of a parameter for the current coding block, wherein the value of the parameter indicates a partition depth of the current coding block;
performing an inter prediction process for the current coding block; and
after performing the inter prediction process, not updating a Motion Vector Predictor candidates list comprising Motion Vector Predictor candidates from previously coded blocks of the picture that are not spatially adjacent to the current coding block, when the value of the parameter for the current coding block is greater than a threshold.

8. The apparatus according to claim 7, wherein the processing circuitry is further configured for updating the Motion Vector Predictor candidates list after performing the inter prediction process, when the value of the parameter for the current coding block is smaller than or equal to the threshold.

9. The apparatus according to claim 7, wherein the inter prediction process is a merge mode inter prediction process using a Motion Vector Predictor selected from a list comprising the Motion Vector Predictor candidates list.

10. The apparatus according to claim 7, wherein the processing circuitry is further configured for using the Motion Vector Predictor candidates list for inter prediction of a subsequent coding block.

11. A method for inter prediction of a current coding block of a picture, wherein the method comprises:
- obtaining a value of a parameter for the current coding block, wherein the value of the parameter indicates a partition depth of the current coding block;
- performing an inter prediction process for the current coding block; and
- after performing the inter prediction process, not updating a Motion Vector Predictor candidates list comprising Motion Vector Predictor candidates from previously coded blocks of the picture that are not spatially adjacent to the current coding block, when the value of the parameter for the current coding block is greater than a threshold.

12. The method according to claim 11, further comprising updating the Motion Vector Predictor candidates list after performing the inter prediction process, when the value of the parameter for the current coding block is smaller than or equal to the threshold.

13. The method according to claim 11, wherein the inter prediction process is a merge mode inter prediction process using a Motion Vector Predictor selected from a list comprising the Motion Vector Predictor candidates list.

14. The method according to claim 11, and further comprising performing inter prediction of a subsequent coding block using the Motion Vector Predictor candidates list.

15. The method according to claim 4, wherein the partition depth is a partition depth of a quad tree partitioning.

16. The method according to claim 4, wherein the inter prediction process comprises a merge estimation process.

17. The apparatus according to claim 1, wherein the partition depth is a partition depth of a quad tree partitioning.

18. The apparatus according to claim 1, wherein the inter prediction process comprises a merge estimation process.

* * * * *